(12) United States Patent
Nagai et al.

(10) Patent No.: US 7,304,452 B2
(45) Date of Patent: Dec. 4, 2007

(54) MOTOR CONTROL DEVICE

(75) Inventors: Kazunobu Nagai, Aichi-gun (JP);
Tsuyoshi Shinohara, Yokohama (JP);
Hiromi Oka, Yokohama (JP);
Toshikazu Sekihara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 11/372,216

(22) Filed: Mar. 10, 2006

(65) Prior Publication Data
US 2006/0290312 A1 Dec. 28, 2006

(30) Foreign Application Priority Data

| Mar. 11, 2005 | (JP) | ............................. 2005-069214 |
| Apr. 11, 2005 | (JP) | ............................. 2005-113512 |
| Nov. 7, 2005 | (JP) | ............................. 2005-322341 |

(51) Int. Cl.
H02P 23/00 (2006.01)

(52) U.S. Cl. .................... 318/811; 318/254; 318/138; 318/439; 318/432; 318/433; 318/434

(58) Field of Classification Search ................ 318/811, 318/254, 138, 439, 432, 433, 434
See application file for complete search history.

(56) References Cited

U.S. PATENT DOCUMENTS

2005/0275362 A1* 12/2005 Yamamoto et al. ......... 318/254

2006/0001392 A1* 1/2006 Ajima et al. ................ 318/432

FOREIGN PATENT DOCUMENTS

| JP | 64-8890 | 1/1989 |
| JP | 64-39358 | 2/1989 |
| JP | 9-74790 | 3/1997 |
| JP | 10-75597 | 3/1998 |
| JP | 10-290592 | 10/1998 |
| JP | 2003-339143 | 11/2003 |
| JP | 2004-242417 | 8/2004 |

* cited by examiner

Primary Examiner—Karen Masih
(74) Attorney, Agent, or Firm—Pillsbury Winthrop Shaw Pittman, LLP

(57) ABSTRACT

A motor control device for controlling a permanent magnet motor includes a current detector detecting current flowing through three-phase windings, an induced voltage computing unit obtaining voltage induced at each phase from the detected three-phase winding current based on a phase voltage equation, a position detector detecting a rotational position of the rotor from the induced voltage of each phase computed by the induced current computing unit, the rotational position of the rotor having a 6n resolution where n is an integer equal to or larger than 1, an energization phase control unit determining a phase to be energized based on the rotational position of the rotor and a phase command, an energization signal forming unit forming a 6n-resolution three-phase energization signal, and an energizing unit carrying out PWM modulation for the three-phase energization signal, supplying voltage according to the modulated three-phase energization signal to each of the three-phase windings.

12 Claims, 49 Drawing Sheets

| SIGNAL sP | SIGNAL sB | PHASE DATA D2 |
|---|---|---|
| 0 | 0 | 0 | 00 |
| 0 | 1 | 0 | 01 |
| 1 | 0 | 0 | 02 |
| 0 | 0 | 1 | 00 |
| 0 | 1 | 1 | 23 |
| 1 | 0 | 1 | 22 |

FIG.15

| FIG.24A | FIG.24B |

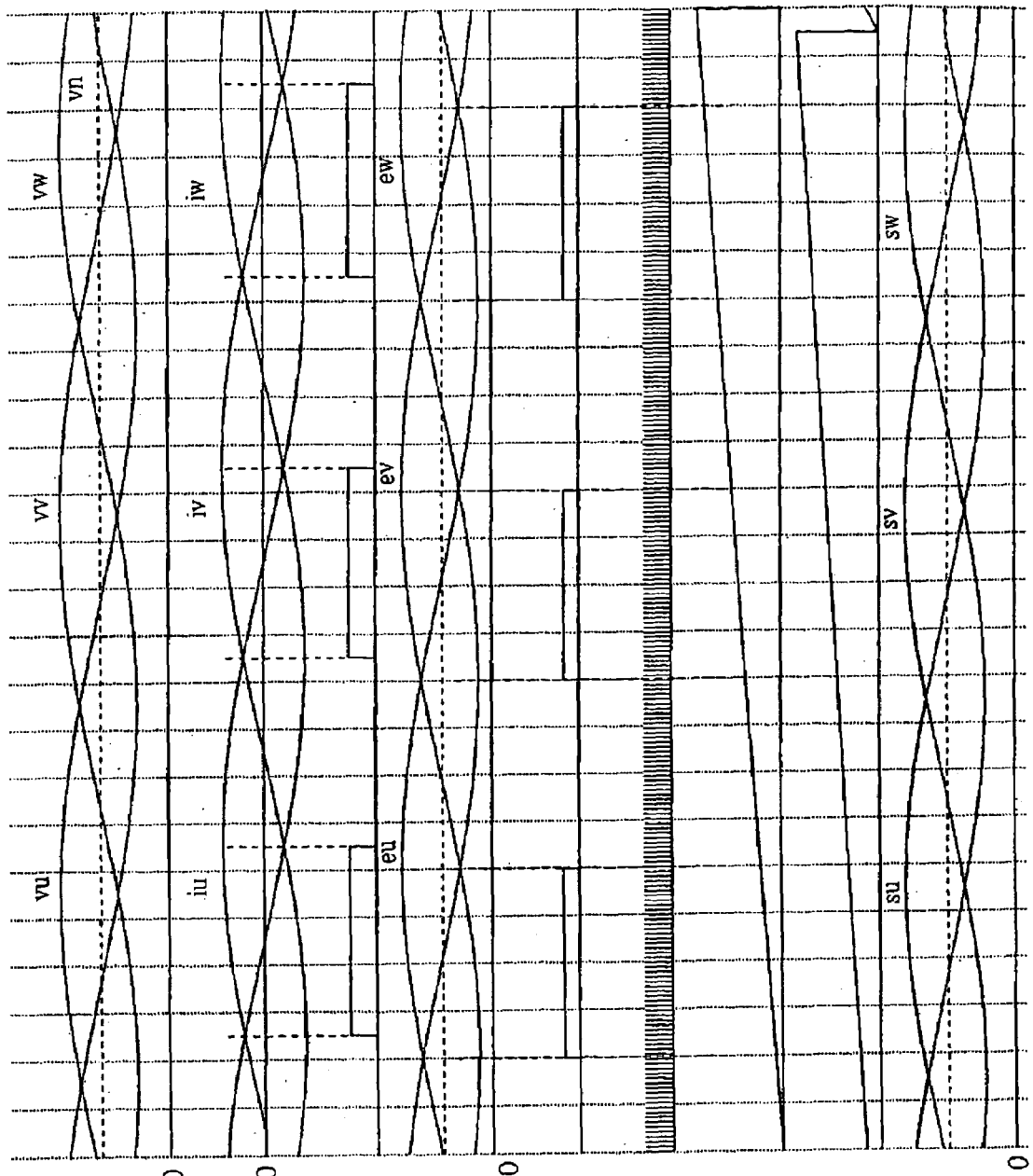

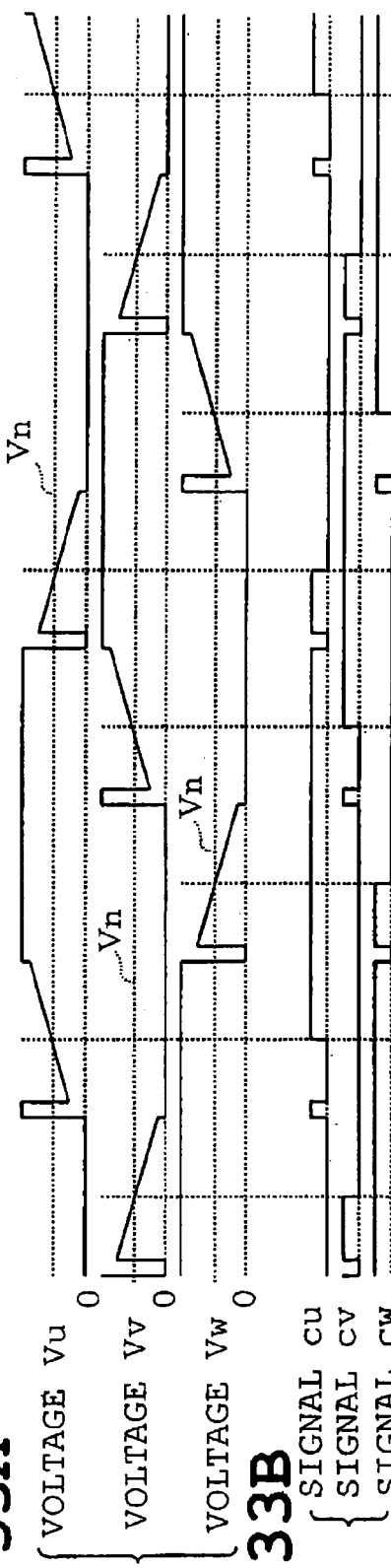

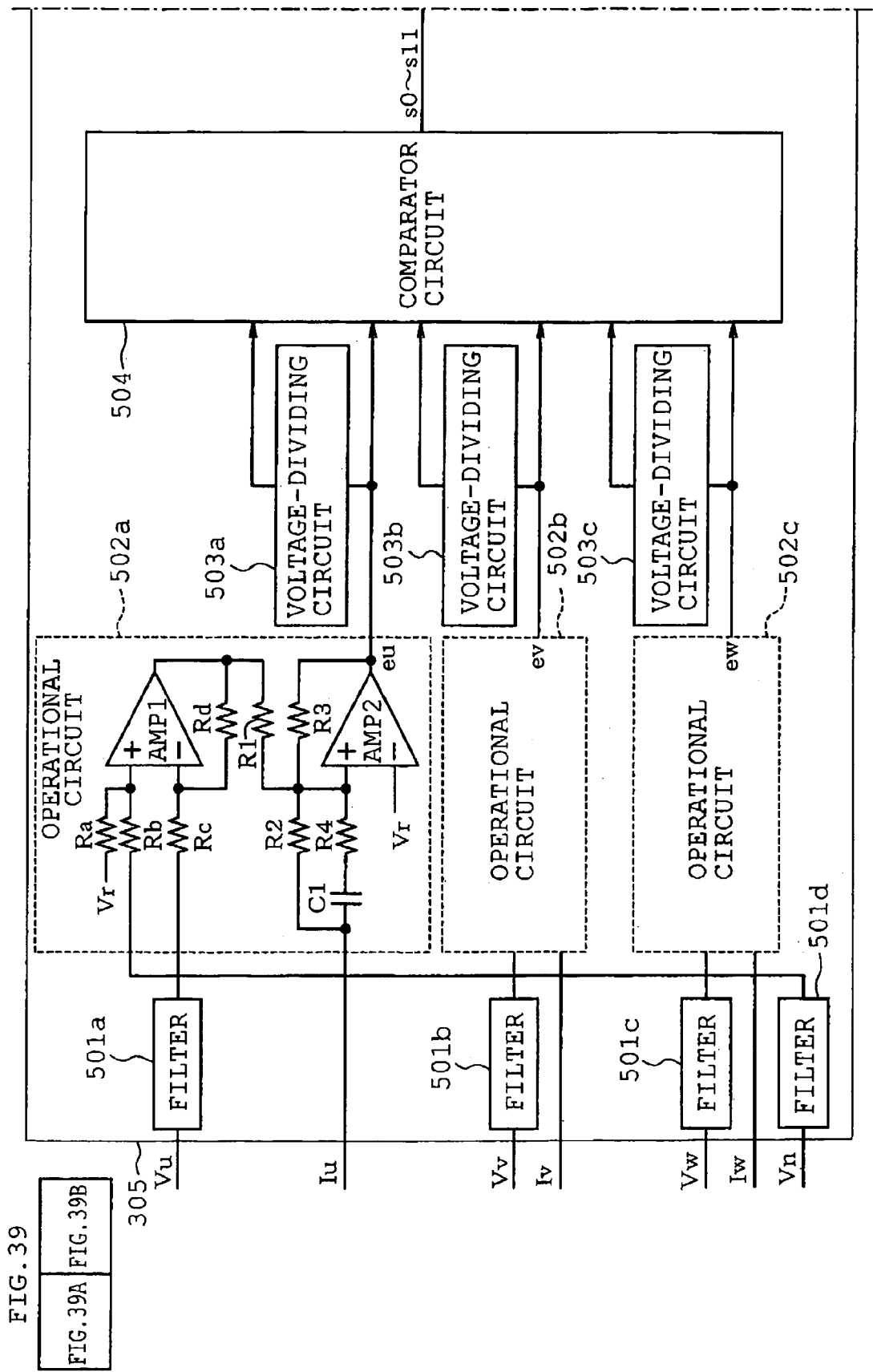

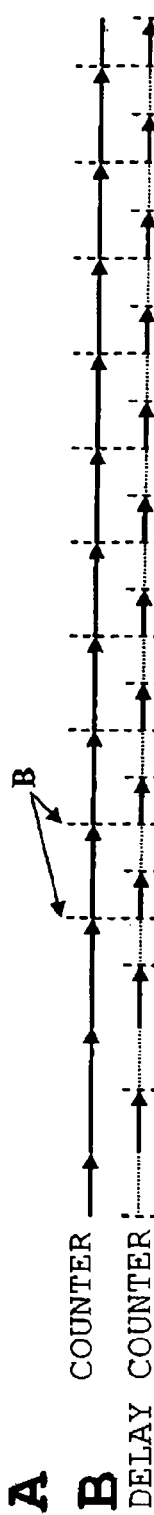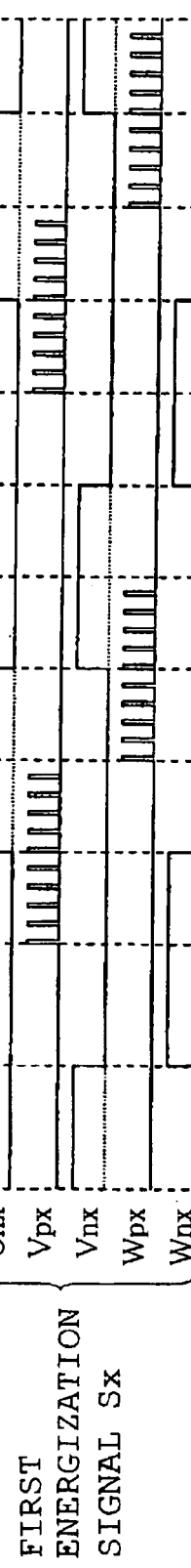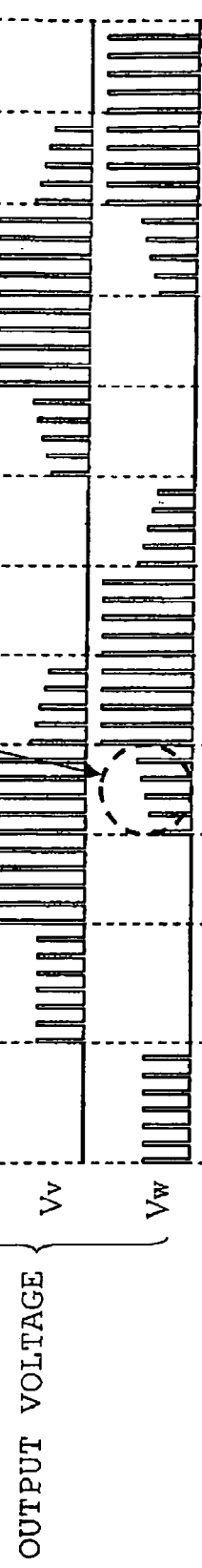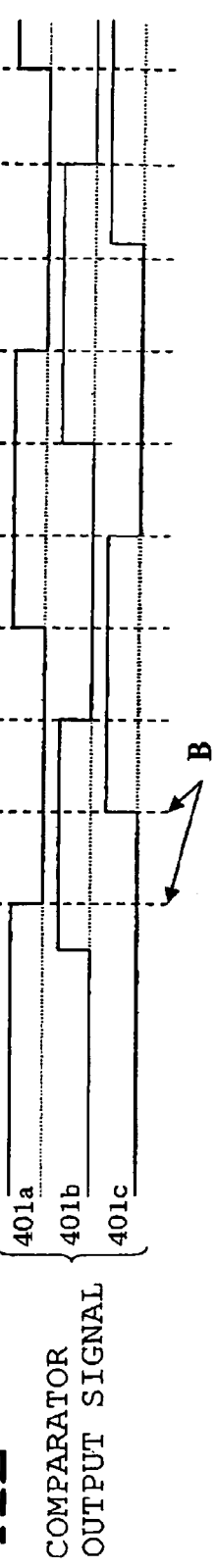
FIG. 41A COUNTER
FIG. 41B DELAY COUNTER
FIG. 41C FIRST ENERGIZATION SIGNAL Sx
FIG. 41D OUTPUT VOLTAGE
FIG. 41E COMPARATOR OUTPUT SIGNAL

FIG. 42B OUTPUT VOLTAGE

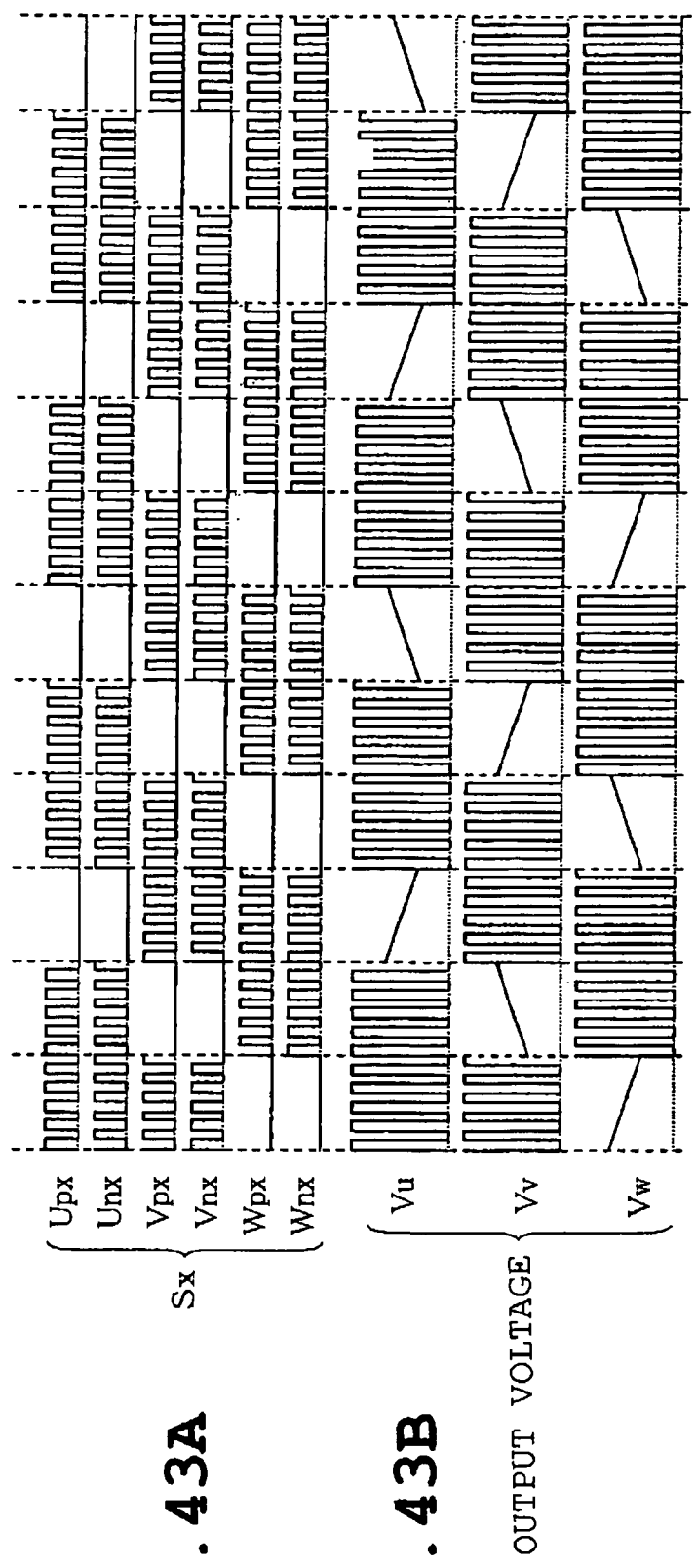

MOTOR CONTROL DEVICE

CROSS-REFERENCE TO RELATED APPLICATIONS

This application is based upon and claims the benefit of priority from the prior Japanese Patent Application Nos. 2005-69214 filed on Mar. 11, 2005, 2005-113512 filed on Apr. 11, 2005 and 2005-322341 filed on Nov. 7, 2005, the entire contents of all of which are incorporated herein by reference.

BACKGROUND

The present disclosure relates to a motor control device that realizes sensorless drive of a permanent magnet motor, and more particularly to such a motor control device that enables sinusoidal drive of the permanent magnet motor.

Brushless motors have recently been used with household appliances and industrial equipment for their superior efficiency. JP-A1-001-039358, JP-A-2003-339143 and JP-A-2004-242417 all disclose brushless motors used as spindle motors for driving a disc recording medium such as a digital versatile disc (DVD), a compact disc (CD) and a hard disc drive (HDD). A driving device described in each gazette includes Hall elements for detecting a rotor position of the brushless motor and is arranged to generate an energizing signal by a 120-degree energization mode or sinusoidal pulse width modulation (PWM) mode.

Each of JP-A-H09-74790, JP-A-H10-75597 and JP-A-H10-290592 discloses a driving device including Hall elements for detecting a rotational position of the rotor of the brushless motor and is arranged to generate an energizing signal by the sinusoidal PWM mode on the basis of the detected position signal.

The sensorless drive that is employed for miniaturization and low cost of the motor needs to be compatible with the sinusoidal drive for reduction in oscillation and noise in the aforementioned household appliances and industrial equipment. However, the arrangement of a motor control device becomes complicated and accordingly, the cost thereof is increased when operation such as sensorless vector control is carried out using a high-speed processor such as a digital signal processor (DSP).

JP-A-01-8890 discloses a sensorless drive system with a relatively simpler arrangement. Current is caused to flow through two of three phases while the other phase is kept open. Zero cross of an induced voltage is detected by comparison of voltage of the open phase and a reference voltage. A phase to be energized is determined on the basis of the detected zero cross. However, since this system necessitates an open phase, continuous energization such as by use of sinusoidal waveform is impossible, whereupon production of oscillation and noise is inevitable.

SUMMARY

Therefore, an object of the present disclosure is to provide a motor control device which employs a sinusoidal PWM energization system and can realize a low-cost sensorless drive necessitating no sensor detecting a rotational position of the rotor.

The present disclosure provides a motor control device for controlling a permanent magnet motor including a rotor having a permanent magnet and a stator provided with three-phase windings. The motor control device comprises a current detector detecting current flowing through the three-phase windings, an induced voltage computing unit obtaining voltage induced at each phase from the detected three-phase winding current based on a phase voltage equation, thereby delivering an induced voltage signal, a position detector detecting a rotational position of the rotor from the induced voltage of each phase computed by the induced current computing unit, the rotational position of the rotor having a 6n resolution where n is an integer which is equal to or larger than 1, an energization phase control unit determining a phase to be energized based on the rotational position of the rotor and a phase command, an energization signal forming unit forming a 6n-resolution three-phase energization signal based on the phase to be energized and a voltage command, an energizing unit which carries out PWM modulation for the three-phase energization signal, thereby supplying voltage according to the modulated three-phase energization signal to each of the three-phase windings.

The above-described arrangement can achieve the sensorless drive by a sinusoidal PWM energizing system. Furthermore, simplification and low cost of the arrangement can be achieved since the 6n-resolution (where n=1, 2, 3 . . . ) rotational position of the rotor is detected from the induced voltage of each phase computed on the basis of the phase voltage equation.

As another arrangement to forming the aforesaid three-phase energization signal, the invention also provides a motor control device for controlling a permanent magnet motor including a rotor having a permanent magnet and a stator provided with three-phase windings. The motor control device comprises a current detector detecting current flowing through the three-phase windings, an induced voltage computing unit obtaining voltage induced at each phase from the detected three-phase winding current based on a phase voltage equation, thereby delivering an induced voltage signal, a first position detector detecting a 6-resolution first rotational position of the rotor by comparison of induced voltages of the respective phases, a multiplier obtaining an n-fold multiplied signal based on the first rotational position of the rotor where n is an integer which is equal to or larger than 2, a second position detector detecting a second rotational position of the rotor from the first rotational position of the rotor and the n-fold multiplied signal, the second rotational position having a 6n resolution, an energization signal forming unit forming a 6n-resolution three-phase energization signal based on the second rotational position of the rotor, and an energizing unit which carries out PWM modulation for the three-phase energization signal, thereby supplying to the three-phase windings voltage according to the modulated three-phase energization signal.

The above-described arrangement can also achieve the sensorless drive by a sinusoidal PWM energizing system. Furthermore, a 6-resolution first rotational position of the rotor is obtained from the induced voltage of each phase computed on the basis of the phase voltage equation. A 6n-resolution position information is obtained by the multiplier from the 6-resolution position information. Consequently, a sinusoidal drive with high resolution can be achieved, and simplification and low cost of the arrangement can also be achieved.

Additionally, the invention further provides a motor control device comprises a current detector detecting current flowing through the three-phase windings, a first energization signal forming unit which detects a zero-cross timing of voltage induced in the three-phase windings based on three-phase winding voltage and forms a first energization signal with a 120-degree energization waveform based on the zero-cross timing, a second energization signal forming unit which computes an induced voltage waveform of each phase from the detected three-phase winding current based on a phase voltage equation, thereby forming a second energization signal having substantially a sinusoidal waveform, a selector which selects either one of the first and second energization signals on a predetermined condition, and an energizing unit which supplies to the three-phase windings of the permanent magnet motor the energization signal selected by the selector.

The foregoing arrangement can drive the permanent magnet motor with low oscillation and low noise.

BRIEF DESCRIPTION OF THE DRAWINGS

Other objects, features and advantages of the present invention will become clear upon reviewing the following description of the illustrative example with reference to the accompanying drawings, in which:

FIG. 15 shows the relationship between signals sP and sB and phase data D2 in a phase selecting circuit;

FIGS. 32A through 32I are timing charts showing operations in relation to a first energization signal forming unit;

FIGS. 33A through 33E are timing charts showing operations in relation to a second energization signal forming unit;

FIGS. 39A and 39B are block diagrams of the second energization signal forming circuit;

FIGS. 41A through 41E are timing charts showing the operation of the first energization signal forming circuit;

FIGS. 42A and 42B are views similar to FIGS. 41C and 41D, showing a tenth illustrative example of the invention, respectively; and FIGS. 43A and 43B are views similar to FIGS. 41C and 41D, showing an eleventh illustrative example of the invention, respectively.

DETAILED DESCRIPTION OF THE DISCLOSURE

Several embodiments of the present disclosure will now be described with reference to the drawings.

Figure 1A:
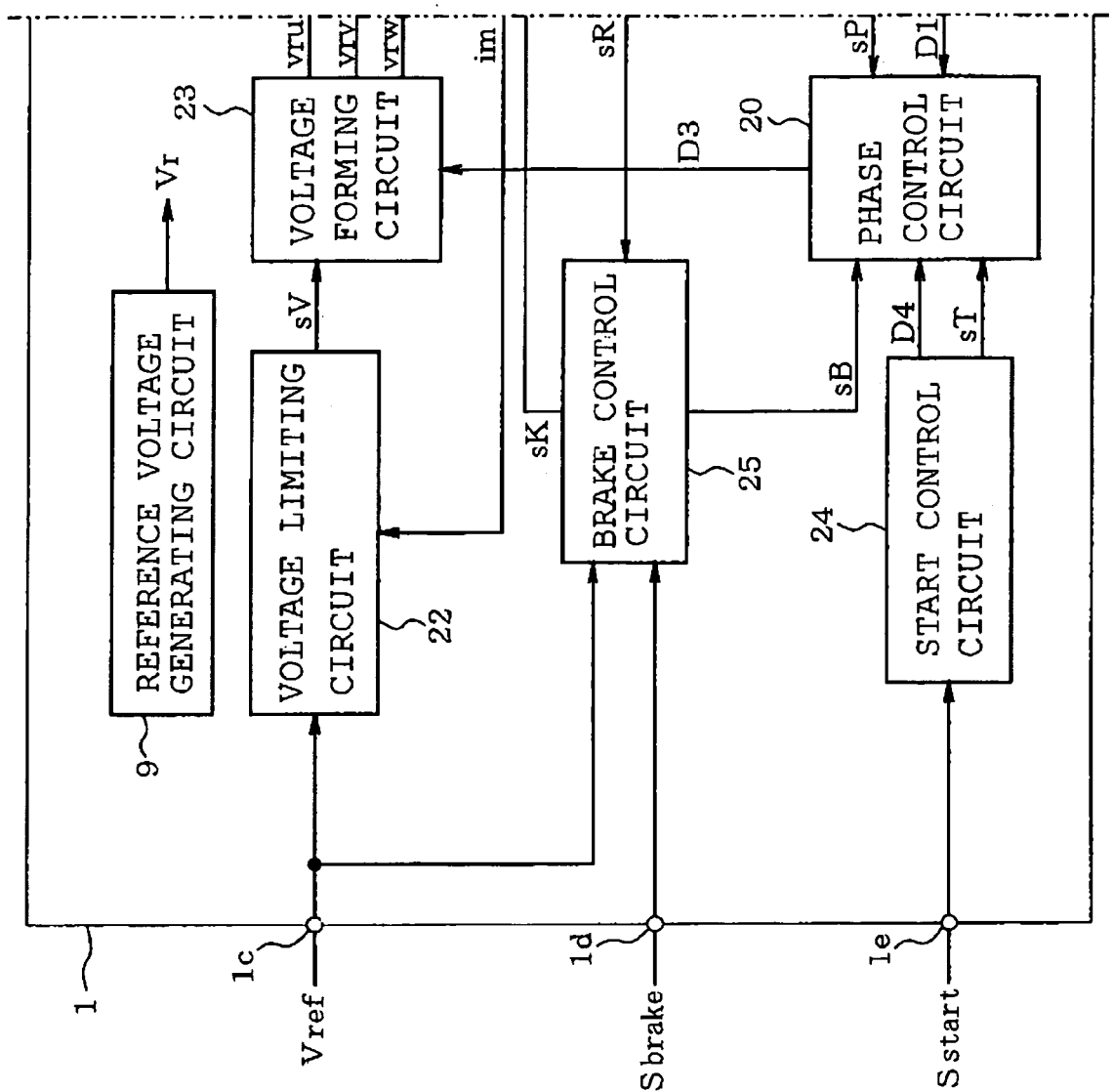
FIGS. 1A and 1B show a whole drive control integrated circuit (IC) for a brushless motor according to a first illustrative example of the present invention.
Figure 1B:
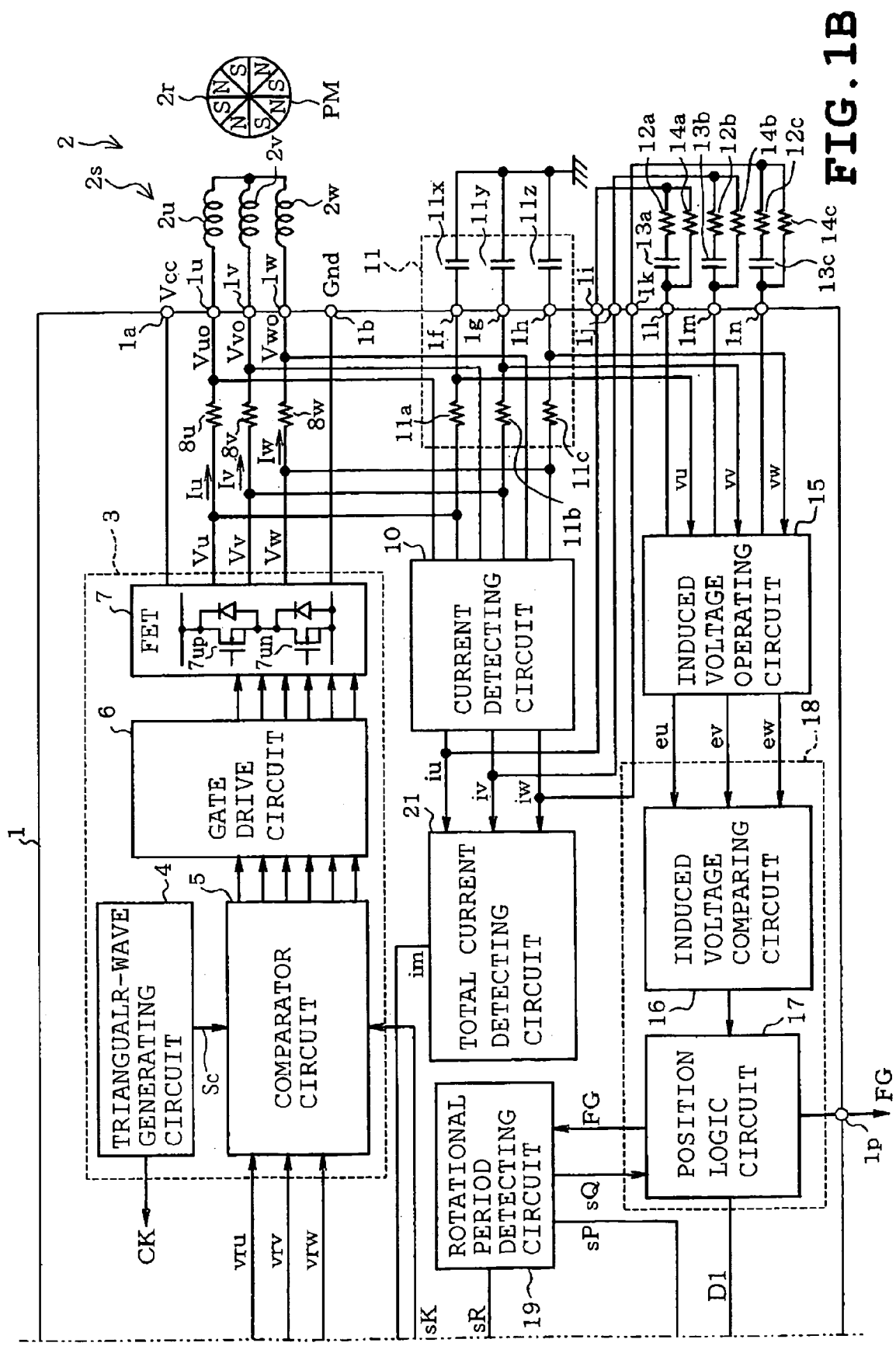

FIGS. 1 through 23 illustrate a first embodiment. Referring to FIGS. 1A and 1B, a drive control integrated circuit (IC) for a brushless motor 2 is shown. The drive control IC realizes functions thereof by hardware processing but not by software processing with use of a processor, thereby being capable of directly driving the three-phase brushless motor 2. The motor 2 is a spindle motor for rotating a disc-like recording medium such as a DVD, CD, HDD or etc and also a permanent magnet motor comprising a rotor 2r having a permanent magnet PM and a stator 2s provided with three-phase windings 2u, 2v and 2w.

Power supply voltage $V_{cc}$ (12 V, for example) is supplied via power supply terminals 1a and 1b to the IC 1. A voltage command signal $V_{ref}$, a start signal $S_{start}$ and brake signal $S_{brake}$ are adapted to be supplied to terminals 1c, 1d and 1e respectively, as will be described later. The windings 2u, 2v and 2w of the motor 2 are to be connected to terminals 1u, 1v and 1w respectively. External components are to be connected to three groups of terminals 1f, 1g and 1h, 1i, 1j and 1k, and 1l, 1m and 1n.

A circuit arrangement of the IC 1 will now be described as follows. An energization circuit 3 includes a triangular wave generating circuit 4 generating a triangular wave signal Sc having a frequency of 50 kHz, a comparator circuit 5 which compares energization signals vru, vrv and vrw with the triangular wave signal Sc thereby to generate a pulse width modulation (PWM) signal, a gate drive circuit 6 amplifying the PWM signal and supplying the amplified PWM signal to a gate of a field effect transistor (FET; and will be described later) and a switching circuit 7.

The switching circuit 7 is an inverter circuit configured by three-phase bridge connection of six FET's between a power line connected to the power terminal 1a and another power line (ground line) connected to the power terminal 1b. FIG. 1B shows the FET's 7up and 7uu constituting upper and lower arms of phase U respectively. Three shunt resistors 8u, 8v and 8w are connected between phase output terminals of the switching circuit 7 and the terminals 1u, 1v and 1w of the IC 1 respectively. A reference voltage generating circuit 9 generates a reference voltage Vr which is one half of the power supply voltage Vcc, thereby delivering the reference voltage Vr to each circuit, for example. To the current detecting circuit 10 are supplied output voltages Vu, Vv and Vw of output voltages of the switching circuits and voltages Vu0, Vv0, Vw0 of the terminals 1u, 1v and 1w, that is, voltages across both ends of the shunt resistors 8u, 8v and 8w. The current detecting circuit 10 delivers current signals iu, iv and iw according to the output currents Iu, Iv and Iw of the switching circuit 7 based on interterminal voltages of the shunt resistors 8u, 8v and 8w, respectively.

Figure 2:
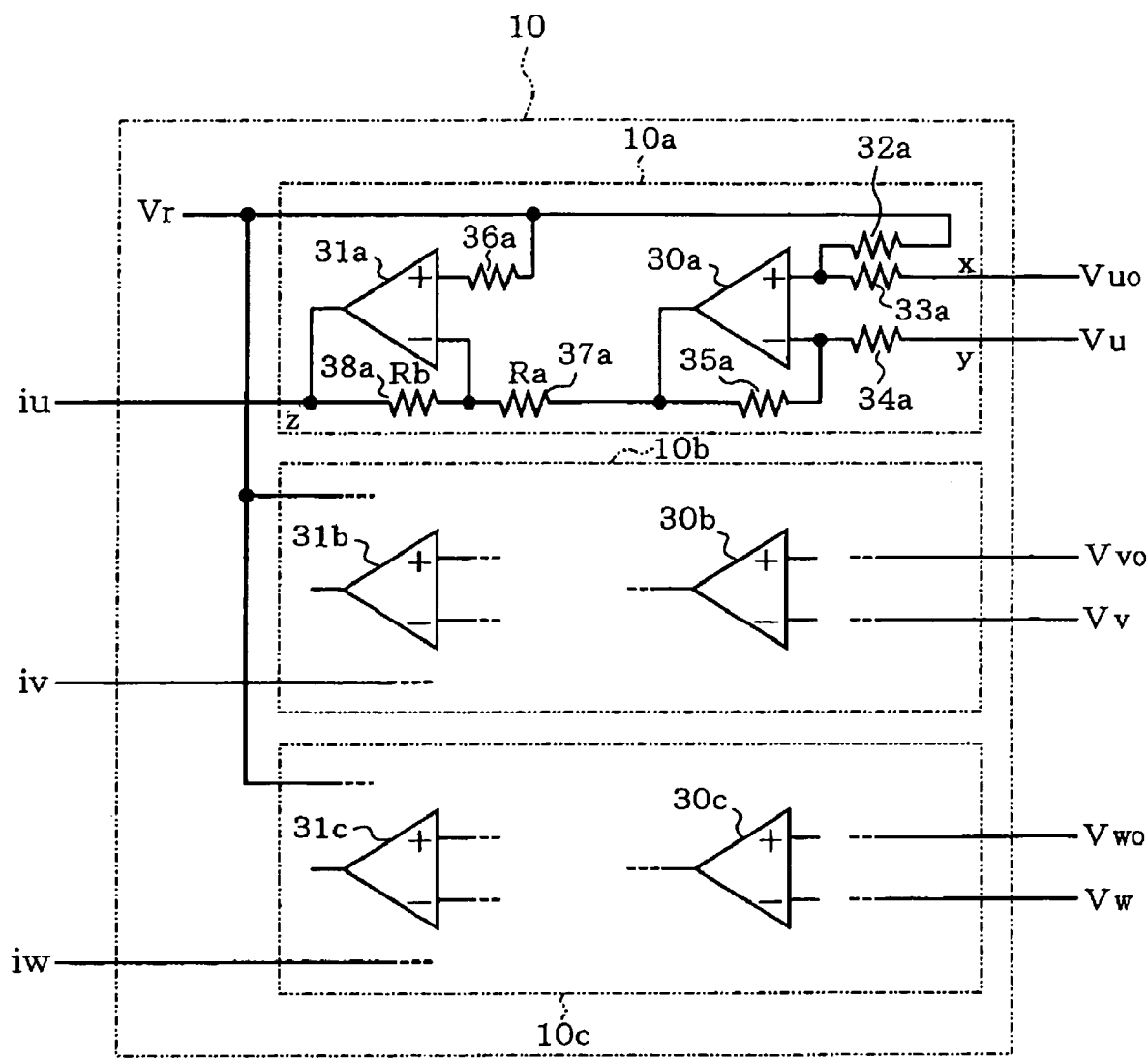
FIG. 2 shows an arrangement of a current detecting circuit.

The current detecting circuit 10 has a circuit arrangement as shown in FIG. 2. Current detecting circuits 10a, 10b and 10c of phases U, V and W have the same arrangement. For example, the current detecting circuit 10a includes a differential amplifier circuit comprising an operational amplifier 30a and resistors 32a to 35a and an inverting amplifier comprising an operational amplifier 31a and resistors 36a to 38a. The aforesaid reference voltage Vr is supplied via resistors 32a and 36a to the operational amplifiers 30a and 31a respectively. Current signals iu, iv and iw delivered from the current detecting circuit 10 are supplied to a total current detecting circuit 21 as shown in FIG. 1B and the terminals 1i, 1j and 1k for external output.

A filter circuit 11 is connected to an output terminal of the switching circuit 7. An output signal of the filter circuit 11 is supplied to an induced voltage computing circuit 15. The filter circuit 11 includes resistors 11a, 11b and 11c connected between the phase output terminals of the switching circuit 7 and capacitors 11x, 11y and 11z externally connected between the terminals 1f, 1g and 1h of the IC 1 and the ground. When having a small capacity, each of the capacitors 11x, 11y and 11z may be formed inside the IC 1, instead.

Series circuit of resistors 12a, 12b and 12c and capacitors 13a, 13b and 13c are externally provided between the terminals 1i, 1j and 1k and the terminals 1l, 1m and 1n of the IC 1, respectively. Three resistors 14a, 14b and 14a are connected in parallel to the series circuits respectively. The resistors 12a, 12b and 12c are provided for prevention of oscillation.

The induced voltage computing circuit 15 is supplied with current signals iu, iv and iw from the current detecting circuits 10 via the aforesaid external circuits and voltages vu, vv and vw having passed through the filter circuit 11. The induced voltage computing circuit 15 delivers induced voltage signals eu, ev a ew according to induced voltages Eu, Ev and Ew of the motor 2, respectively.

Figure 3:
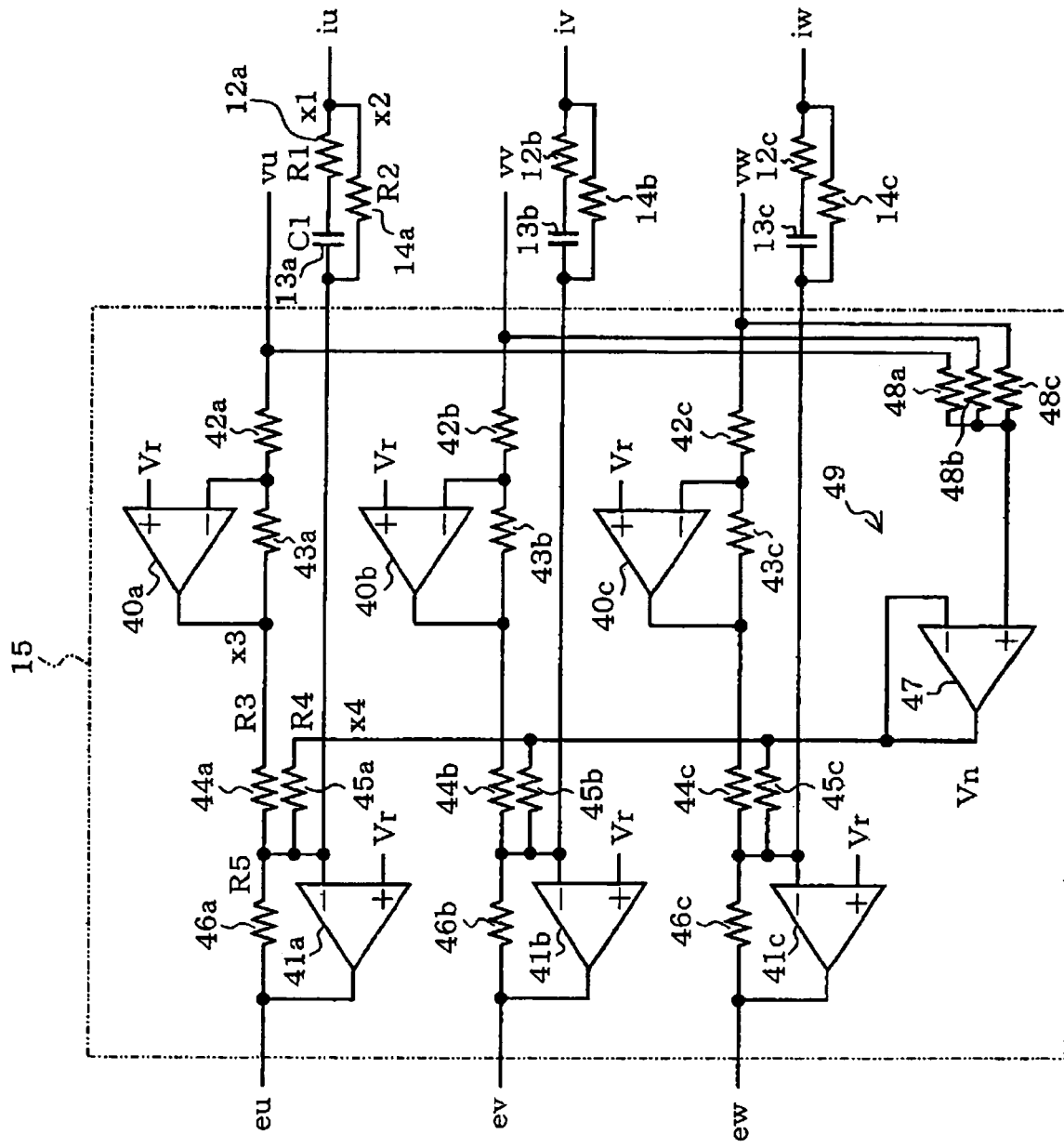
FIG. 3 shows an arrangement of an induced voltage computing circuit.

FIG. 3 shows a circuit arrangement of the induced voltage computing circuit 15. The phases have the same arrangement. For example, phase U is composed of an inverting amplifier circuit comprising an operational amplifier 40a and resistors 42a and 43a and an adder circuit comprising an operational amplifier 41a and resistors 44a, 45a and 46a. Furthermore, another adder circuit 49 is provided for generating a neutral-point voltage signal Vn' corresponding to an imaginary neutral-point voltage Vn'. The adder circuit 49 includes an operational amplifier 47 serving as a voltage follower and resistors 48a, 48b and 48c having the same resistance value.

Figure 4:
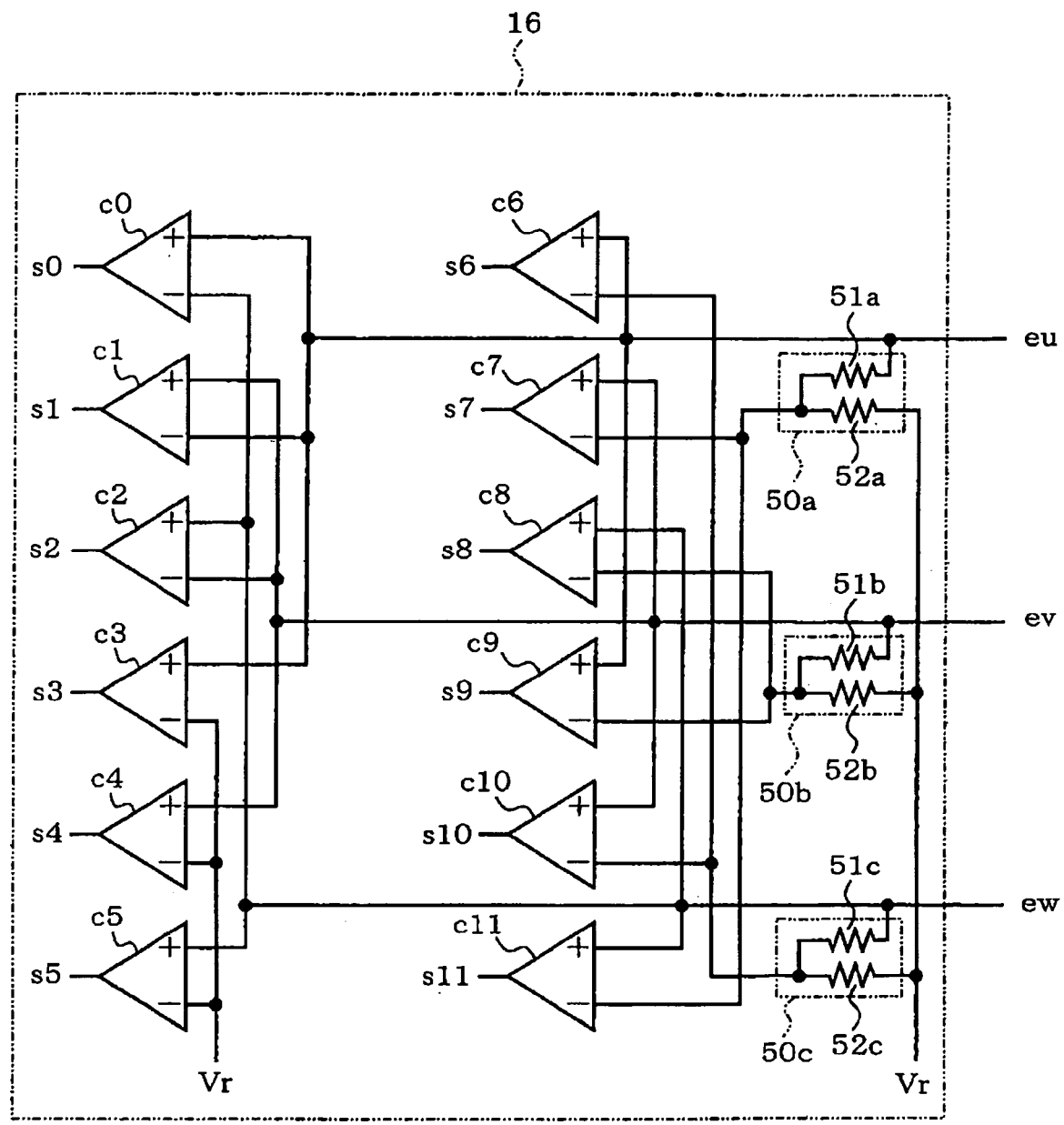
FIG. 4 shows an arrangement of an induced voltage comparing circuit.

The induced voltage signals eu, ev and ew delivered from the induced voltage computing circuit 15 are supplied to an induced voltage comparing circuit 16 as shown in FIG. 1B. The induced voltage comparing circuit 16 compares one of the induced voltage signals eu, ev and ew with another and further the induced voltage signals eu, ev and ew with the reference voltage Vr. The induced voltage comparing circuit 16 has an electrical circuit arrangement as shown in FIG. 4. Comparators c0, c1 and c2 compare the induced voltage signals eu, ev and ew with the induced voltage signals ew, eu and ev, thereby delivering signals s0, s1 and s2, respectively as shown in FIG. 4. Comparators c3, c4 and c5 compares each of the induced voltage signals eu, ev and ew with the reference voltage Vr, thereby delivering signals s3, s4 and s5.

Voltage divider circuits 50a, 50b and 50c divide the induced voltage signals eu, ev and ew into 0.366-fold signals and comprise resistors 51a and 52a, 51b and 52b, and 51c and 52c respectively. Comparators c6 and c9 compare the induced voltage signal eu with each of the divided voltage signals ew and ev, thereby delivering signals s6 and s9, respectively. Comparators c7 and c10 compare the induced voltage signal ev with each of the divided voltage signals eu and ew, thereby delivering signals s7 and s10, respectively. Comparators c8 and c11 compare the induced voltage signal ew with each of the divided voltage signals ev and eu, thereby delivering signals s8 and s11, respectively.

Signals s0 to s11 delivered from the induced voltage comparing circuit 16 are supplied to a position logic circuit 17 as shown in FIG. 1B. The position logic circuit 17 delivers 5-bit position data (rotational position of the rotor) with any one of predetermined resolutions, 24-resolution, 12-resolution and 6-resolution according to a signal sQ which will be described later.

Figure 5:
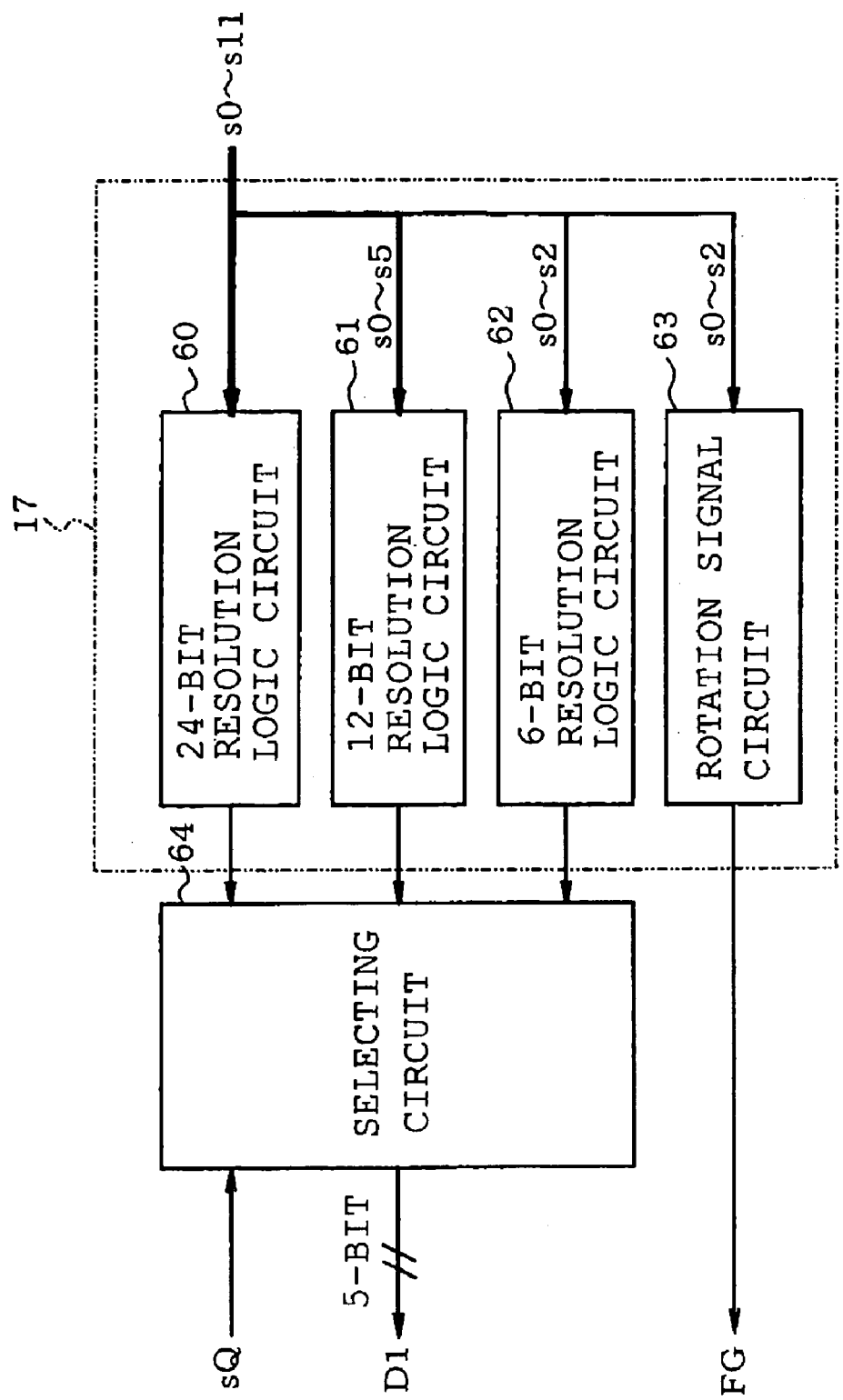
FIG. 5 shows an arrangement of a position logic circuit.

FIG. 5 shows an arrangement of the position logic circuit 17. The signals s0 to s11 are supplied to a 24-resolution logic circuit 60, a 12-resolution logic circuit 61, a 6-resolution logic circuit 62 and a rotational signal circuit 63. Each of the logic circuits 60 to 62 delivers a 5-bit digital signal according to the resolution. A selecting circuit 64 is arranged to select and deliver any one of the digital signals as position data D1 based on a 2-bit selecting signal sQ according to a rotational speed. Furthermore, a rotation signal circuit 63 is arranged to deliver a rotation signal FG comprising signals s0 to s2. The induced voltage comparing circuit 16 and the position logic circuit 17 constitute a position detecting circuit 18.

The rotation signal FG delivered from the position logic circuit 17 is supplied via a terminal 1p to external of the IC 1 and also to a rotational period detecting circuit 19 as shown in FIG. 1B. The rotational period detecting circuit 19 is arranged to deliver signals sP, sQ and sR according to a rotational period (rotational speed). The position data D1 delivered from the position logic circuit 17 is supplied to the phase control circuit 20. The phase control circuit 20 determines a phase command according to a rotational speed and driving condition (drive/brake) and also a phase to be energized based on the position data D1 and the phase command.

Figure 6:
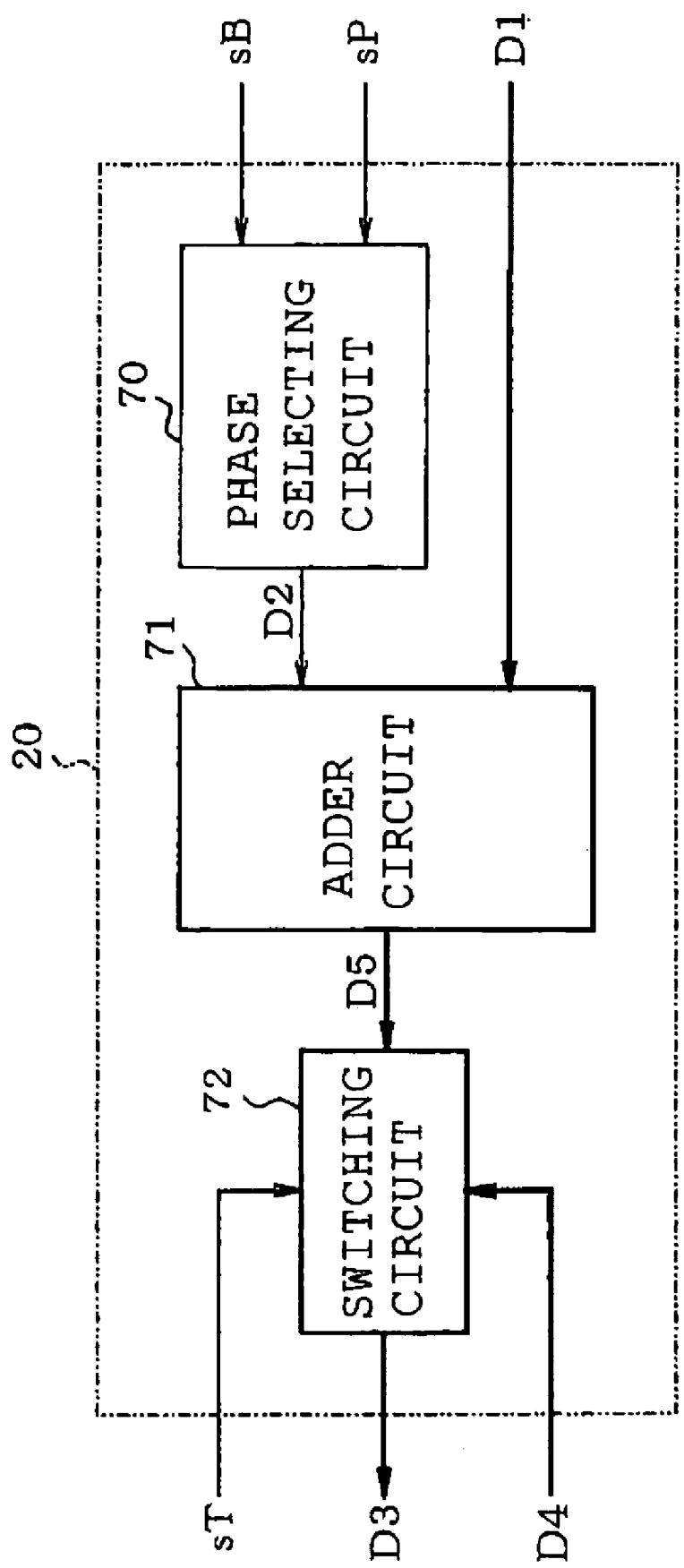
FIG. 6 shows an arrangement of a phase control circuit.

FIG. 6 shows an arrangement of the phase control circuit 20. A phase selecting circuit 70 selects phase data based on the signal sP according to a rotational speed and the signal sB, delivering the selected phase data D2 to an adder 71. The adder 71 adds the position data D1 and the phase data D2, thereby generating energization phase data D5. A switching circuit 72 switches each of the energization phase data D5 and the energization phase data D4 at start-up time to the other, thereby delivering either data as energization phase data D3. The data D4 will be described later.

Figure 7:
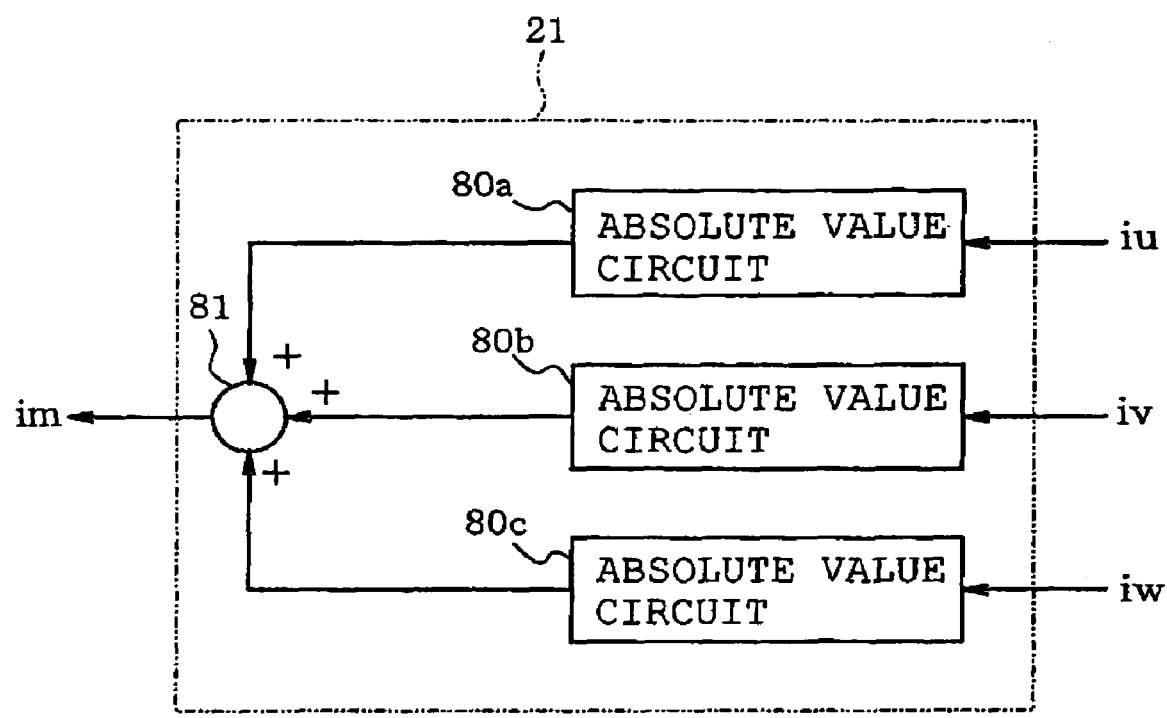
FIG. 7 shows an arrangement of a total current detecting circuit.

The total current detecting circuit 21 detects current signals iu, iv and iw and delivers a total current signal im corresponding to total current Im based on the detected current signals as shown in FIG. 1B. The total current detecting circuit 21 has a circuit arrangement as shown in FIG. 7. Current signals iu, iv and iw in FIG. 7 are supplied via absolute value circuits 80a, 80b and 80c to an adder 81 respectively as shown in FIG. 7. An external voltage command signal $V_{ref}$ and the total current signal im are supplied to a voltage limiting circuit 22 as shown in FIG. 1A, thereby delivering a voltage signal sV to a voltage forming circuit 23.

Figure 8:
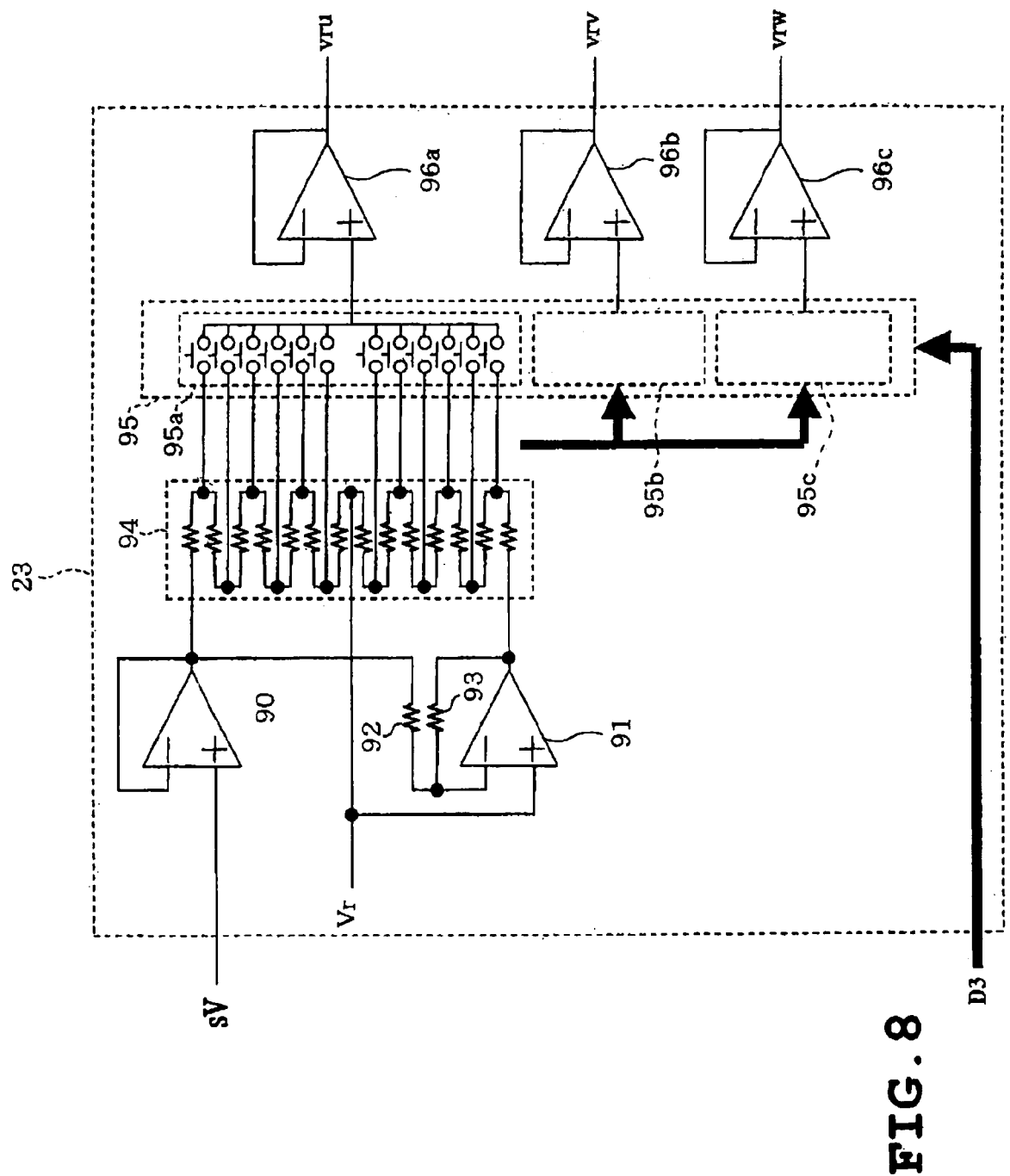
FIG. 8 shows arrangement of a voltage forming circuit.

The voltage forming circuit 23 forms three-phase energization signals vru, vrv and vrw based on the energization phase data D3 and the voltage signal sV. The voltage forming circuit 23 has a circuit arrangement as shown in FIG. 8. More specifically, the voltage forming circuit 23 comprises an operational amplifier 90 to which the voltage signal sV is supplied and which serves as a voltage follower, an inverting amplifier circuit including an operational amplifier 91 and resistors 92 and 93, switching circuits 95a, 95b and 95c selecting a divider circuit 94 for forming a cosine signal and a divided voltage according to the energization phase data D3, and operational amplifiers 96a, 96b and 96c each operating as a voltage followers. Three-phase energization signals vru, vrv and vrw are supplied to the above-described comparator circuit 5.

A start control circuit 24 as shown in FIG. 1A comprises a forced rotation circuit and a switching circuit. The forced rotation circuit forms an energization phase data D4 having a predetermined frequency according to an external start signal $S_{start}$, delivering the formed data D4 to the phase control circuit 20 so that the motor 2 is force-rotated. The switching circuit delivers a signal sT for switching to an operation based on the energization phase data D5 after attainment of a predetermined rotational speed upon start of the forced operation.

An external voltage command signal $V_{ref}$ and a brake signal $S_{brake}$ are supplied to a brake control circuit 25. A signal sR delivered from the rotation period detecting circuit 19 is also supplied to the brake control circuit 25. The brake control circuit 25 delivers a signal sB indicative of a braked state of the phase control circuit 20. The brake control circuit 25 further delivers a signal sK to the comparator circuit 5.

The operation of the IC 1 will now be described with further reference to FIGS. 9 to 23. Firstly, the operation of the current detecting circuit 10 will be described with reference to FIG. 2. Voltage between both ends of each of shunt resistors 8u, 8v and 8w is supplied to the current detecting circuit 10. For example, in the phase U current detecting circuit 10a, resistors 32a to 35a have the same resistance value. A differential amplifier circuit employing the operational amplifier 30a and constituting an initial stage delivers the difference between input voltages x and y on the basis of the reference voltage Vr. A next-stage inverting amplifier circuit employing the operational amplifier 31a has an amplification factor of —Rb/Ra where Ra and Rb designate resistance values of the resistors 37a and 38a respectively. Accordingly, voltage z delivered from the current detecting circuit 10a is shown by the following equation:

$$Z=(Rb/Ra)(y-x)+Vr \tag{1}$$

Since voltage (y–x) indicates voltage drop of the shunt resistor 8u due to current Iu flowing into the winding 2u of the motor 2, the output voltage z becomes a current signal iu proportional to the winding current Iu. Each of the other phases V and W operates in the same manner as described above. Thus, the current signals iu, iv and iw proportional to the currents Iu, Iv and Iw flowing into the windings 2u, 2v and 2w respectively are delivered.

The operation of the induced voltage computing circuit 15 will be described with reference to FIG. 3. Since having a PWM waveform, each of the output voltages Vu, Vv and Vw of the switching circuit 7 is supplied via the filter circuit to the induced voltage computing circuit 15. As shown in FIG. 3, after passing through the filter, the voltages vu, vv and vw are amplified by the respective inverting amplifiers on the basis of the reference voltage Vr and then supplied to the adder circuit. Furthermore, an average voltage which is an average value of the voltages vu, vv and vw is synthesized by the resistors 48a, 48b and 48c thereby to be supplied via the operational amplifier 47 to the adder circuits of the respective phases. The average voltage is an imaginary neutral-point voltage Vn' equivalent to a neutral-point voltage Vn of the windings 2u, 2v and 2w.

Describing phase U of the induced voltage computing circuit 15, reference symbols x1 to x4 in FIG. 3 designate voltages at respective portions. The output voltage z is obtained from the following equation:

$$Z=-R5 \cdot C1 \cdot dx1/dt-(R5/R2)x2-(R5/R3)x3-(R5/R4)x4 \tag{2}$$

where reference symbols R1 to R5 designate resistance values of the resistors 12a, 14a, 44a, 45a and 46a respectively and reference symbol C1 designates an electrostatic capacity of the capacitor 13a, and voltages x1 and x2 correspond to current signal iu, voltage x3 corresponds to voltage signal –vu and voltage x4 corresponds to a neutral-point voltage signal Vn. R5·C1 is set at a value obtained by multiplying an inverse number of resistance value of shunt resistor 8u by inductance L of one phase of the motor 2. Furthermore, (R5/R2) is set at a value obtained by multiplying an inverse number of resistance value of shunt resistor 8u by winding resistance R of one phase of the motor 2. Furthermore, when (R5/R3) and (R5/R4) are set at 1, the following equation is obtained:

$$z=-L \cdot dIu/dt-R \cdot Iu+vu-Vn \tag{3}$$

Figure 9:
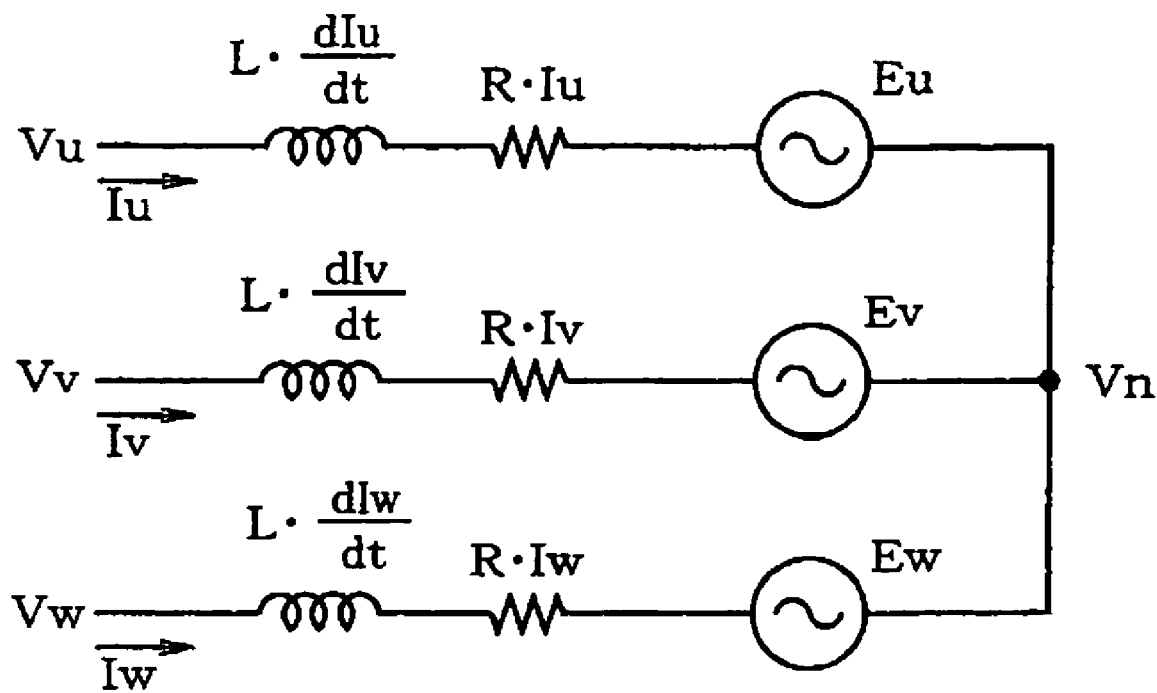
FIG. 9 shows an electrical circuit equivalent to a brushless motor.

When checked by comparison with an equivalent circuit of the motor 2 as shown in FIG. 9, the output voltage z becomes the induced voltage Eu. The same is applied to each of the other phases, and the induced voltage computing circuit 15 delivers induced voltage signals eu, ev and ew according to the induced voltages Eu, Ev nd Ew respectively. The capacitors 13a, 13b and 13c and the resistors 14a, 14b and 14c all of which relate to motor constants L and R are connected to an external of the IC 1. As a result, the capacitors 13a, 13b and 13c and the resistors 14a, 14b and 14c can be adjusted according to the brushless motor to be used.

Figure 10:
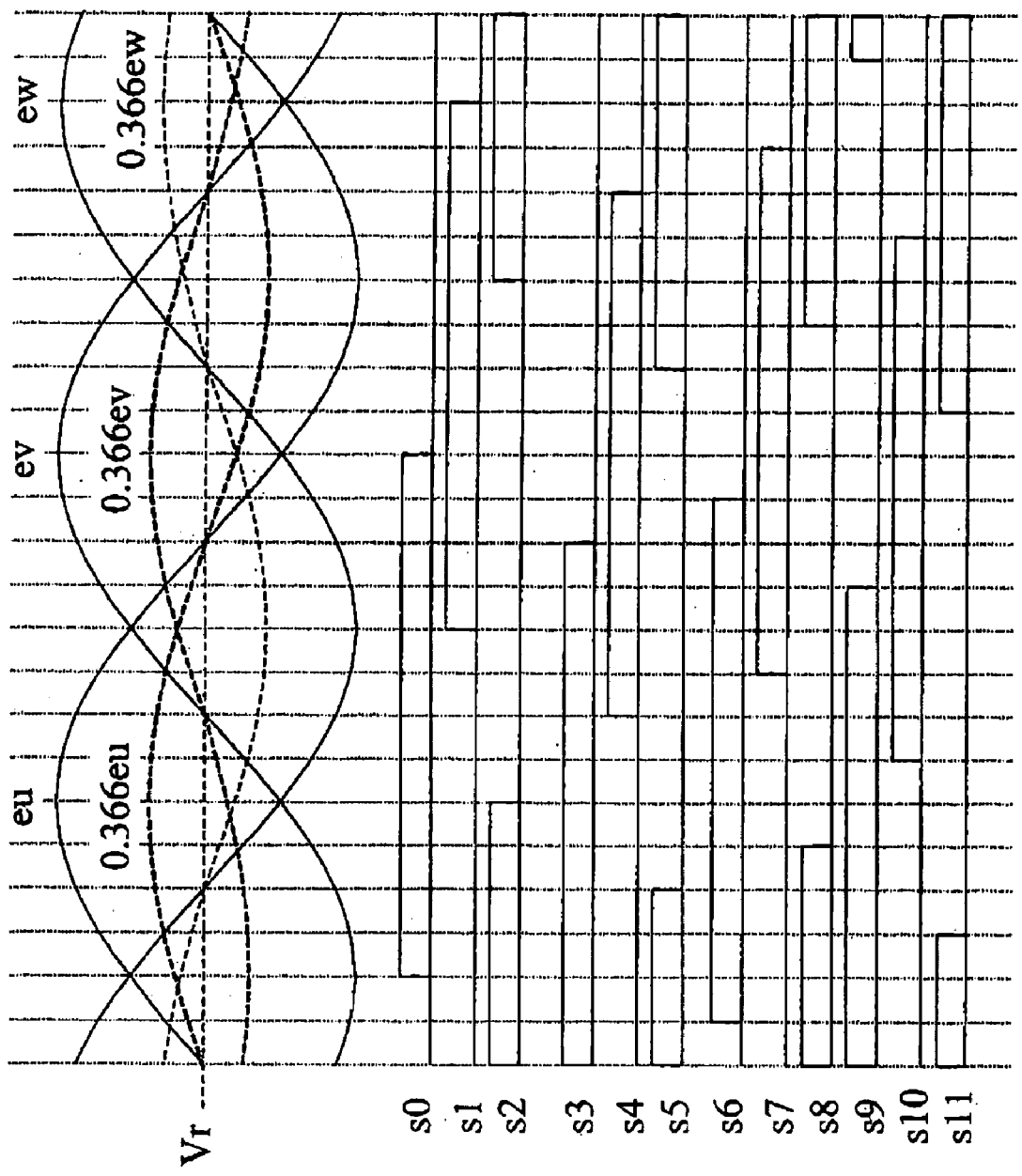
FIG. 10 shows waveforms of induced voltage signals, 0.366-fold induced voltage signals and output signals of comparators c0 to c11.

The operation of the position detecting circuit 18 will be described. FIG. 10 shows waveforms of induced voltage signals eu, ev and ew, 0.366-fold induced voltage signals obtained by voltage division and output signals s0 to s11 of comparators c0 to c11. If the induced voltage signals eu, ev and ew are sinusoidal signals, an electrical period is divided by the signals s0 to s11 of the comparators c0 to c11 into two parts so as to correspond to "0" and "1." Since the twelve output signals s0 to s11 have different timings, one electrical period is divided into 24 parts each of which has about 15 electrical degrees.

A 0.366-fold increase is a division ratio m for making shift by 15 degrees and is determined on the basis of the following equation (4):

$$\sin 15° = \text{division ratio } m \cdot \sin (60°-15°) \qquad (4)$$

Figure 11:
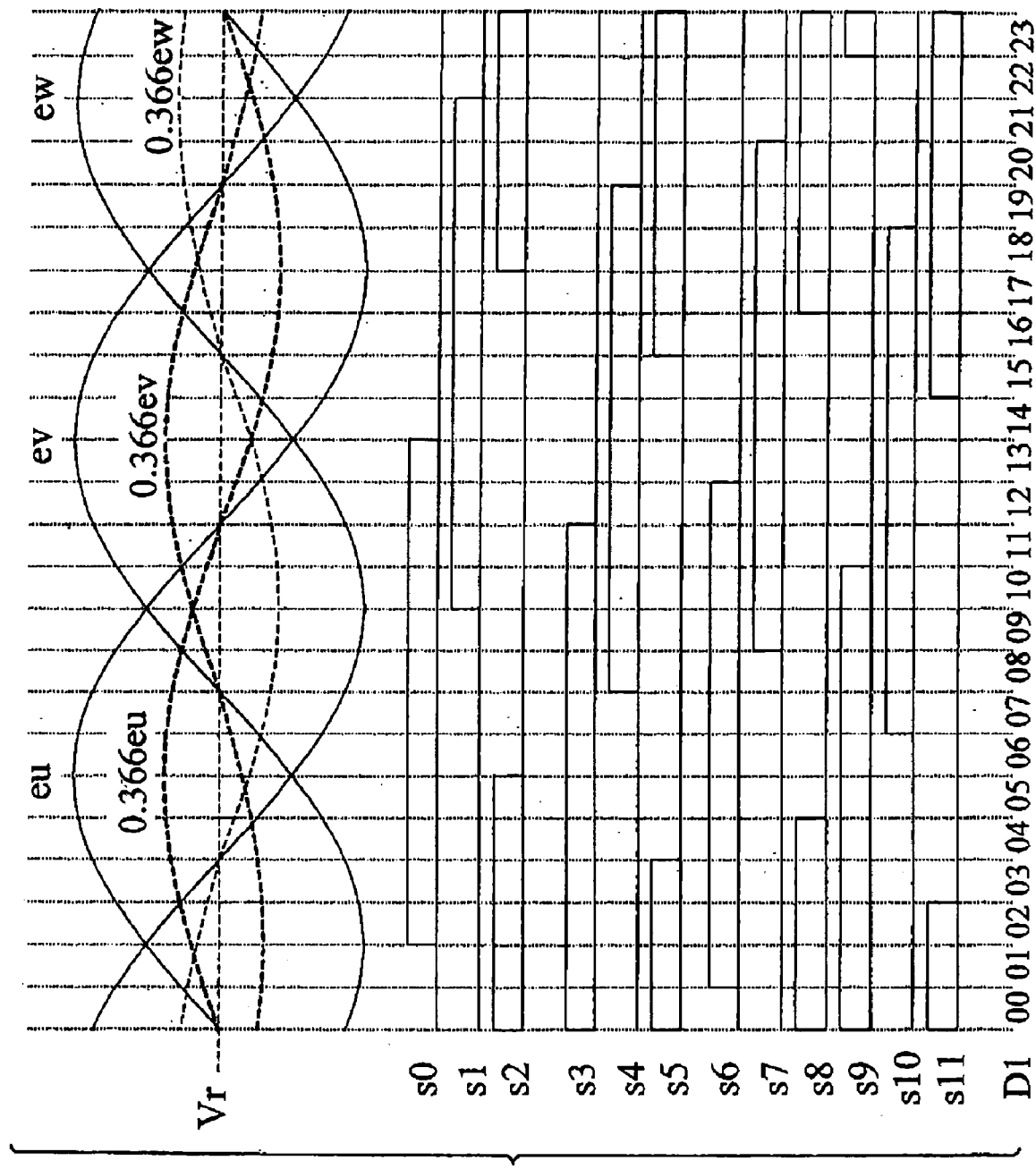
FIG. 11 shows induced voltage signal waveforms and input and output signal waveforms of a 24-resolution logic circuit.
Figure 12:
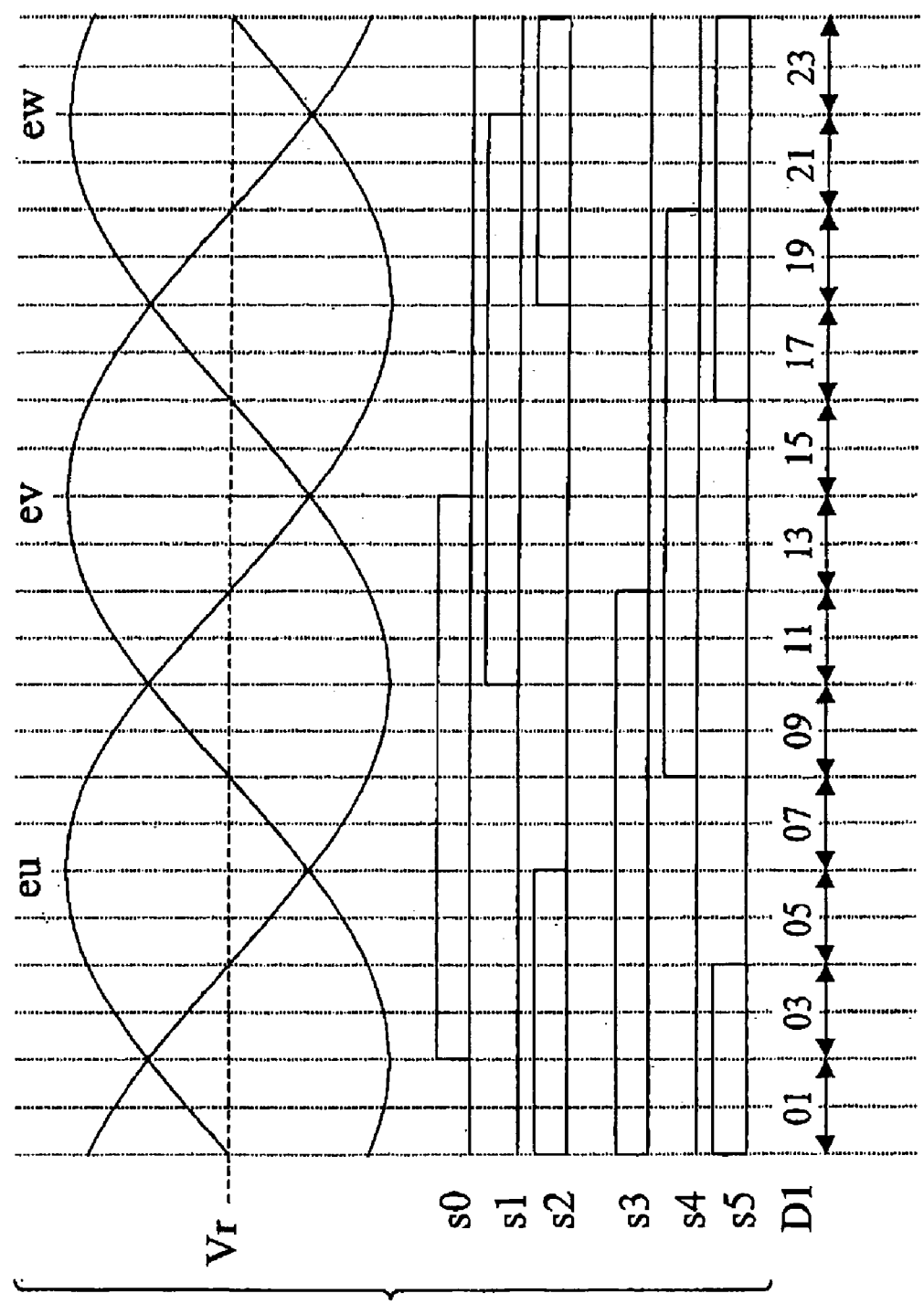
FIG. 12 is a view similar to FIG. 11, showing waveforms of a 12-resolution logic circuit.
Figure 13:
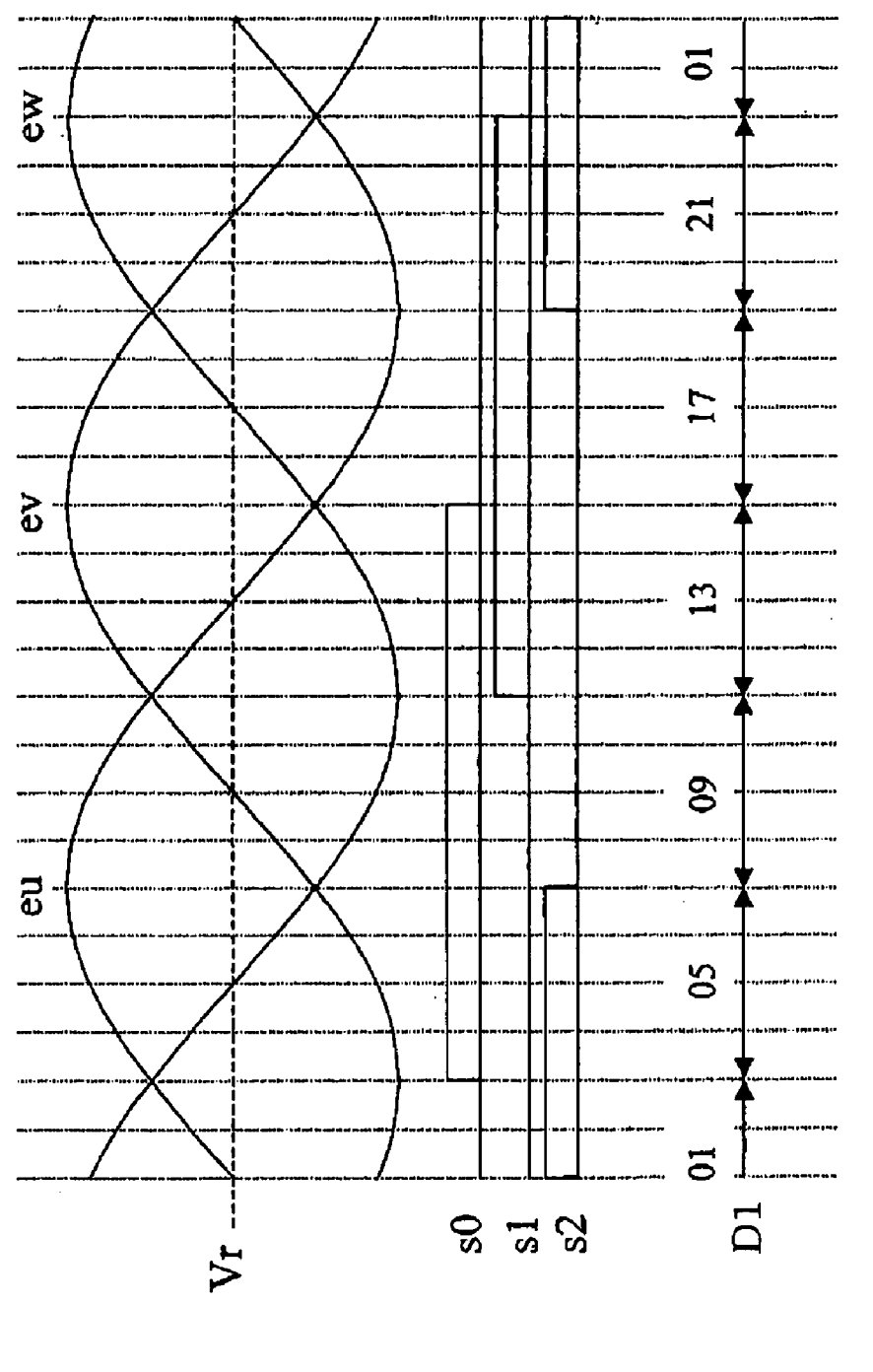
FIG. 13 is a view similar to FIG. 11, showing waveforms of a 6-resolution logic circuit.

FIGS. 11, 12 and 13 show correspondences between input and output signals of 24-, 12- and 6-resolution logic circuits 60, 61 and 62 respectively. The 24-resolution logic circuit 60 causes 24 regions divided by the comparator circuit 16 to correspond to 5-bit position data 0 to 23 as shown in FIG. 11. For example, "00" is obtained when signals s0 to s11 is represented as "LLHHLHLLHHLH." The position data sequentially changes from "00" to "23" with rotation of the motor 2. As a result, a position signal with 24-resolution which is obtained by dividing one electrical period of the induced voltage of motor 2 into 24 parts can be obtained. In the same manner, the 12-resolution logic circuit 61 also produces position data with 12-resolution based on the signals s0 to s5 as shown in FIG. 12. The 6-resolution logic circuit 62 also produces position data with 6-resolution based on the signals s0 to s2 as shown in FIG. 13.

The logic circuits 60, 61 and 62 have different characteristics depending upon differences between the signals s0 to s11 to be supplied thereto. More specifically, the signals s0 to s2 used by the 6-resolution logic circuit 62 are obtained by comparing induced voltage signals eu, ev and ew having large amplitude difference. Accordingly, each of the signals s0 to s2 has a highest sensitivity. On the other hand, the signals s3 to s5 used by the 12-resolution logic circuit 61 are obtained by comparing the induced voltage signals eu, ev and ew with the reference voltage Vr. Accordingly, each of the signals s3 to s5 has a lower sensitivity. Furthermore, the signals s6 to s11 used by the 24-bit logic circuit 60 are obtained by comparing the induced voltage signals eu, ev and ew with the 0.366-fold signals respectively. Accordingly, each of the signals s6 to s11 has the lowest sensitivity.

Figure 14:
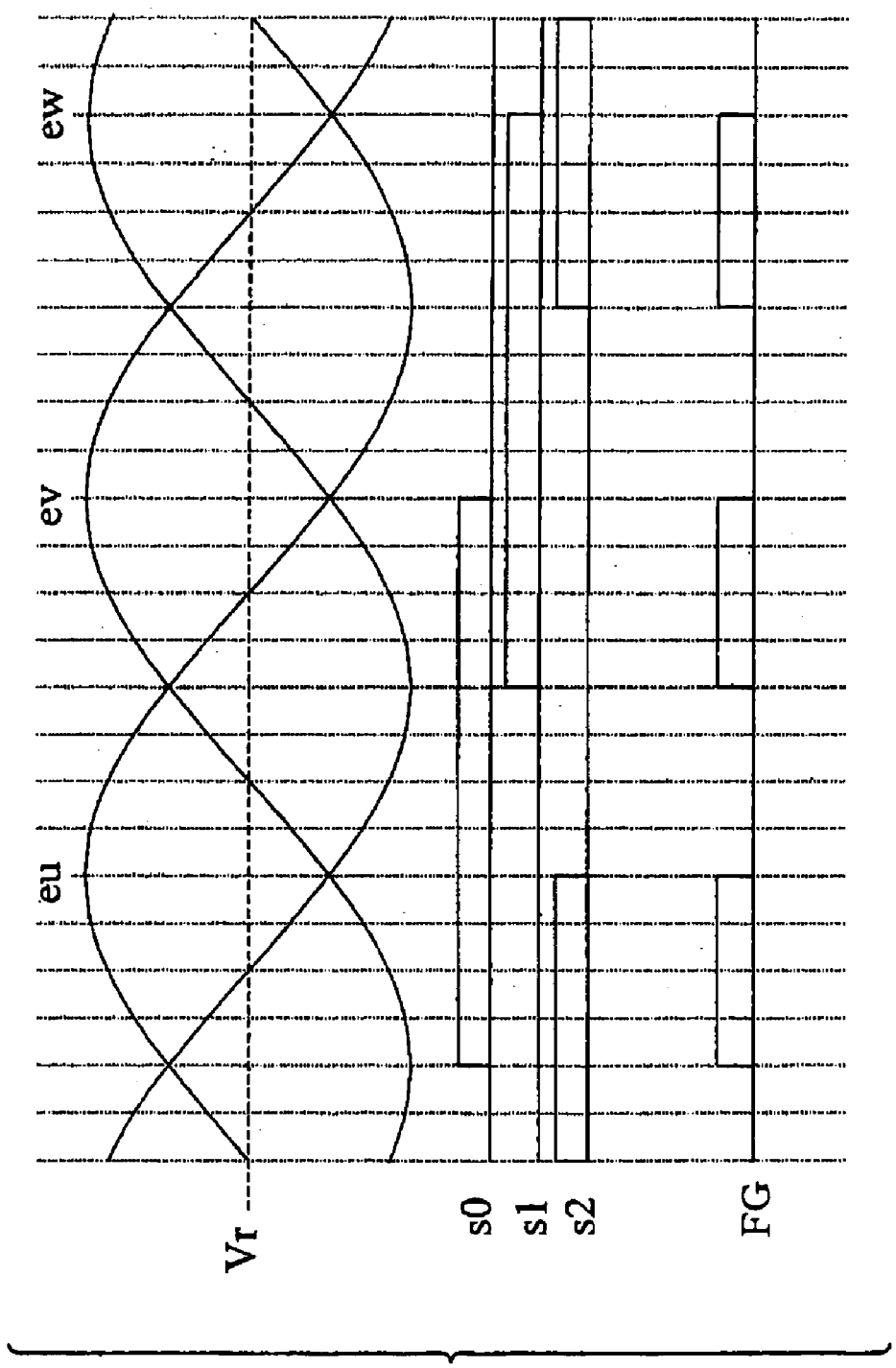
FIG. 14 shows induced voltage waveforms and input and output signals of a rotational signal circuit.

More specifically, the 6-resolution logic circuit 62 can deliver accurate position data even when the motor rotational speed is low such that the induced voltage is relatively smaller. On the contrary, the 24-resolution logic circuit 60 can deliver the position data which provides higher motor rotational speeds and accordingly a relatively larger induced voltage. The selecting circuit 64 selects one of the aforementioned three position data based on a signal sQ, delivering the selected position data as position data D1. The signal sQ selects the 6-resolution logic circuit 62 when the rotational speed of the motor is low as will be described later. As the rotational speed is increased, the signal sQ selects the 12- and 24-resolution logic circuits 61 and 60 in turn. A rotational signal circuit 63 delivers a rotation signal FG changing every 60 degree electrical angle based on the signals s0 to s2 as shown in FIG. 14.

A rotation period detecting circuit 19 counts a change period of the rotation signal FG on the basis of clock CK. More specifically, the rotation period detecting circuit 19 includes a counter (not shown) repeating latch and reset every time of change of the rotation signal FG, thereby producing data corresponding to a change period of the rotation signal FG (namely, rotational speed). The rotation period detecting circuit 19 compares the data with a plurality of predetermined data, thereby delivering signals sP, sQ and sR. Consequently, the signals sP, sQ and sR become signals according to the rotational speeds of the motor 2 respectively.

The operation of the phase control circuit 20 will be described. A phase selecting circuit 70 as shown in FIG. 6 delivers phase data D2 according to the signal sP from the rotation period detecting circuit 19 and the signal sB from the brake control circuit 25. FIG. 15 shows the relationship between the signals sP and sB, and the phase data D2. The signal sP corresponds to the rotational speed. For example, The signal sP=00 when the rotational frequency ranges from 0 to 100 Hz. The signal sP=01 when the rotational frequency ranges from 100 to 400 Hz. The signal sP=10 when the rotational frequency. Furthermore, the signal sB=0 in a non-braked state and sB=1 in a braked state.

In the non-braked state, phase data D2=00 is selected when the rotational frequency ranges from 0 to 100 Hz. Phase data D2=10 is selected when the rotational frequency ranges from 100 to 400 Hz. Phase data D2=10 is selected when the rotational frequency is equal to or above 400 Hz. "01" of phase data D2 corresponds to an electrical lead angle of 15° and "10" corresponds to an electrical lead angle of 30°. More specifically, when the voltage command is larger than the reference voltage Vr or the voltage command is in a positive state, a phase command is caused to lead as the rotational speed is increased.

On the other hand, in the braked state, phase data D2=00 is selected when the rotational frequency ranges from 0 to 100 Hz. Phase data D2=23 is selected when the rotational frequency ranges from 100 to 400 Hz. Phase data D2=22 is selected when the rotational frequency is equal to or larger than 400 Hz. Phase data D2=23 corresponds to an electrical lag angle of 15°. Phase angle D2=22 corresponds to an electrical lag angle of 30°. More specifically, when the voltage command is smaller than the reference voltage Vr or the voltage command is in a negative state, a phase command is caused to lag as the rotational speed is increased.

The adder 71 adds position data D1 and phase data D2. When the result of addition exceeds "23," "24" is subtracted from the result of addition. As a result, the result of addition or energization phase data D5 normally ranges from "00" to "23." The switching circuit 72 selects either energization phase data D4 or D5 according to signal sT, delivering the selected data as energization phase data D3.

Figure 16:
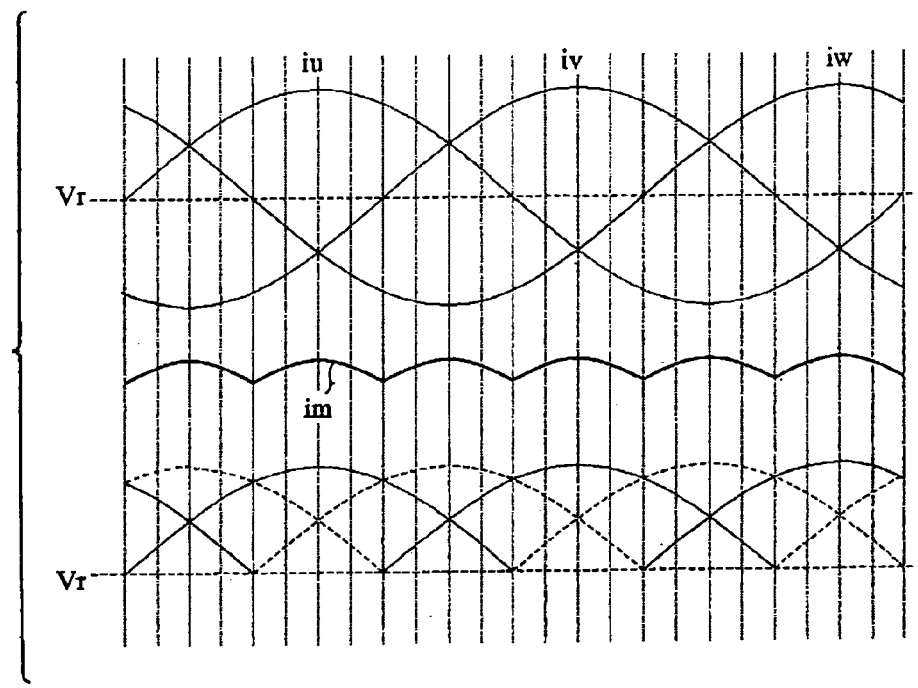
FIG. 16 shows waveforms of the total current detecting circuit for explanation of operation of the circuit.

FIG. 16 is a view explaining the operation of the total current detecting circuit 21 and shows waveforms of current signals iu to iw, absolute values of current signals iu to iw and a total current signal im. The total current signal im becomes a DC signal according to output current of IC 1.

Figure 17:
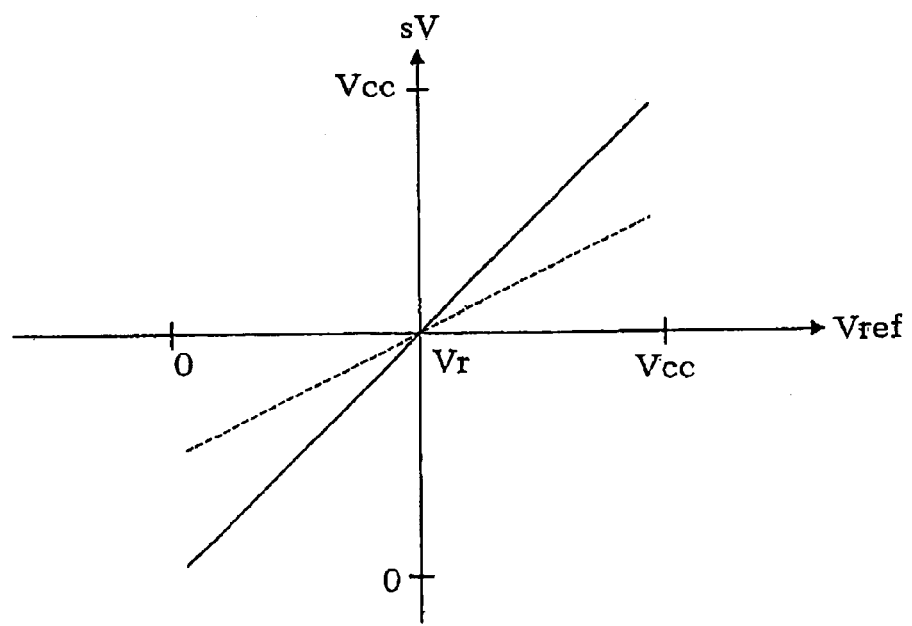
FIG. 17 shows the relationship between a voltage command signal $V_{ref}$ supplied to a voltage limiting circuit and a voltage signal sV delivered from the voltage limiting circuit.

FIG. 17 shows the relationship between a voltage command signal $V_{ref}$ (axis of abscissas) supplied to the voltage limiting circuit 22 and a voltage signal sV (axis of ordinates)

delivered from the voltage limiting circuit 22. Both signals are proportional to each other on the basis of the reference voltage Vr. The voltage limiting circuit 22 changes the gradient according to total current Im. More specifically, when the total current signal im is below a predetermined threshold, the voltage command signal $V_{ref}$ is delivered as a voltage signal sV as shown by solid line in FIG. 17. When the total current signal im is equal to or above the threshold, the gradient is adjusted according to the difference between the signal im and the threshold so that the voltage signal sV is reduced, as shown by broken line in FIG. 17. Since the output voltages Vu, Vv and Vw of the energizing circuit 3 are proportional to the voltage signal sV, the output voltages Vu, Vv and Vw of the energizing circuit 3 are adjusted by the total current Im, whereby the output currents Iu, Iv and Iw of the energizing circuit 3 are limited to substantially a predetermined value. Consequently, the switching circuit 7 and motor 2 can be prevented from an excessively large current.

Referring now to FIG. 8 showing the voltage forming circuit 23, the voltage signal sV is applied via a buffer circuit to one of two ends of a voltage divider circuit 94. The voltage signal sV is further applied via an inverting amplifier circuit which is based on the reference voltage Vr. Furthermore, the reference voltage Vr is applied to a central connecting point of the voltage divider circuit 94. The voltage divider circuit 94 generates twelve divided voltages according to a resistance ratio based on the voltage signal sV, reference voltage $V_{ref}$ and voltage (2·Vr−sV).

Figure 18:
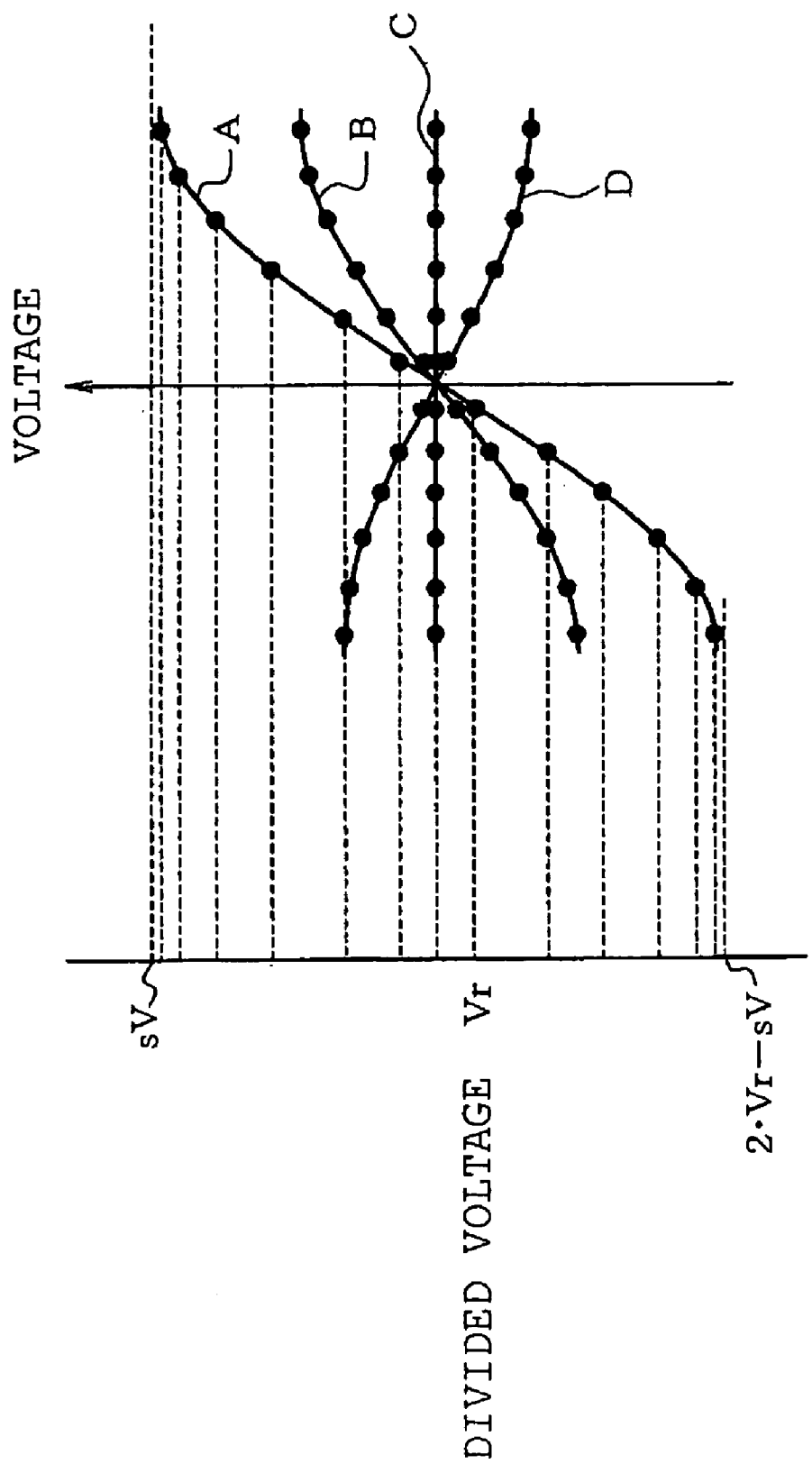
FIG. 18 shows a divided voltage produced by a voltage dividing circuit of the voltage forming circuit and a cosine waveform produced using the divided voltage.

FIG. 18 shows voltages generated by the voltage divider circuit 94. Twelve divided voltages upon input of the voltage signal sV are shown along the axis of ordinates at the left end in the figure at irregular intervals. Curve A shown on the right of the divided voltages shows a voltage signal waveform obtained by switching and selecting the twelve divided voltages sequentially at regular intervals. Black dots on the curve denote divided voltages. This voltage signal is a cosine signal with 12-resolution with respect to the amplitude. When the input voltage signal sV varies, curve A changes to curves B, C and D. Curve C denotes the case where the voltage of voltage signal sV is equal to the reference voltage. Curve D denotes the case where the voltage of voltage signal sV is lower than the reference voltage Vr.

Figure 19:
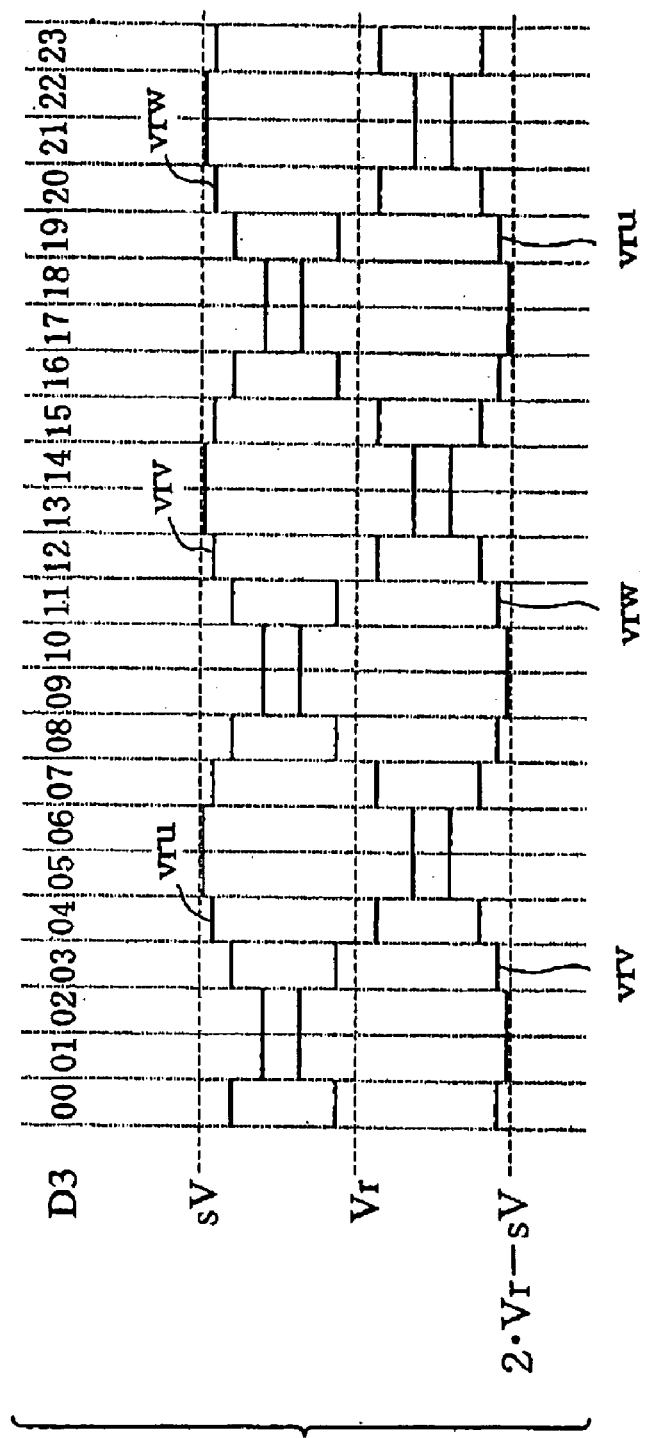
FIG. 19 shows waveforms of energization signals vru, vrv and vrw in the case where output of a 24-resolution logic circuit has been selected when a voltage signal sV is larger than the reference voltage Vr.

In the voltage forming circuit 23, switches 95a, 95b and 95c select these divided voltages according to energization phase data D3. The switches 95a, 95b and 95c are switch circuits for phases U, V and W and delivers energization signals vru, vrv and vrw in FIG. 19, respectively. The energization signals vru, vrv and vrw constitute a substantially sinusoidal three-phase waveform with 12-resolution potential and 24-resolution phase on the basis of the reference voltage Vr. The waveform has amplitude of (sV−Vr). FIG. 19 shows the case where the voltage signal sV is larger than the reference voltage Vr. However, when the voltage signal sV is smaller than the reference voltage Vr, the energization signals vru, vrv and vrw are inverted as shown in FIG. 20.

Figure 20:
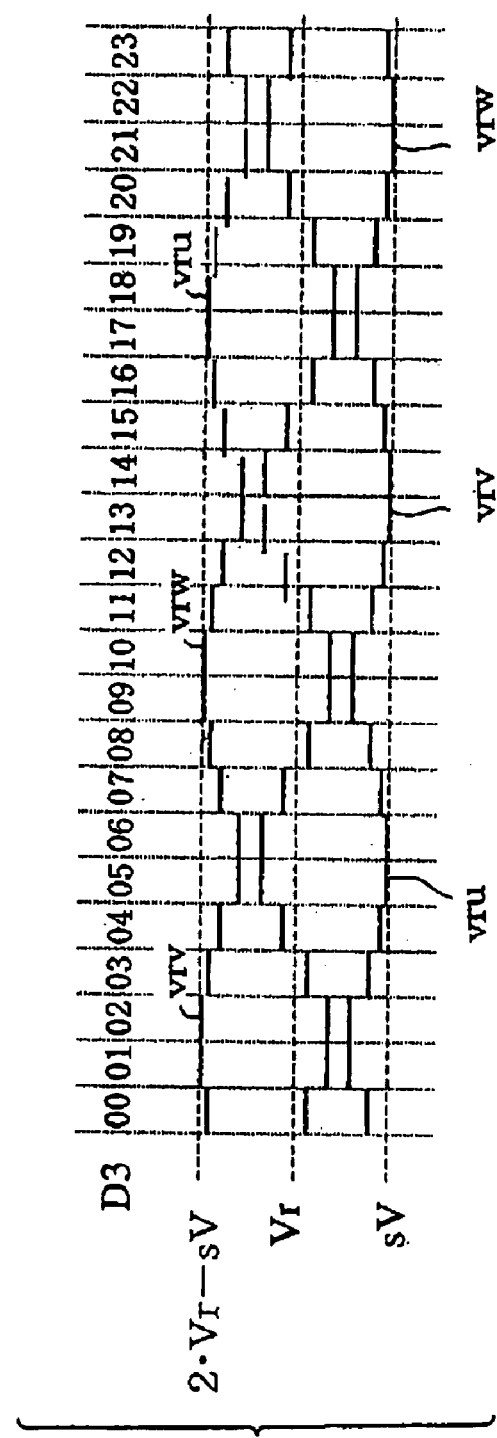
FIG. 20 is a view similar to FIG. 19, showing the case where the voltage signal sV is smaller than the reference voltage Vr.
Figure 21:
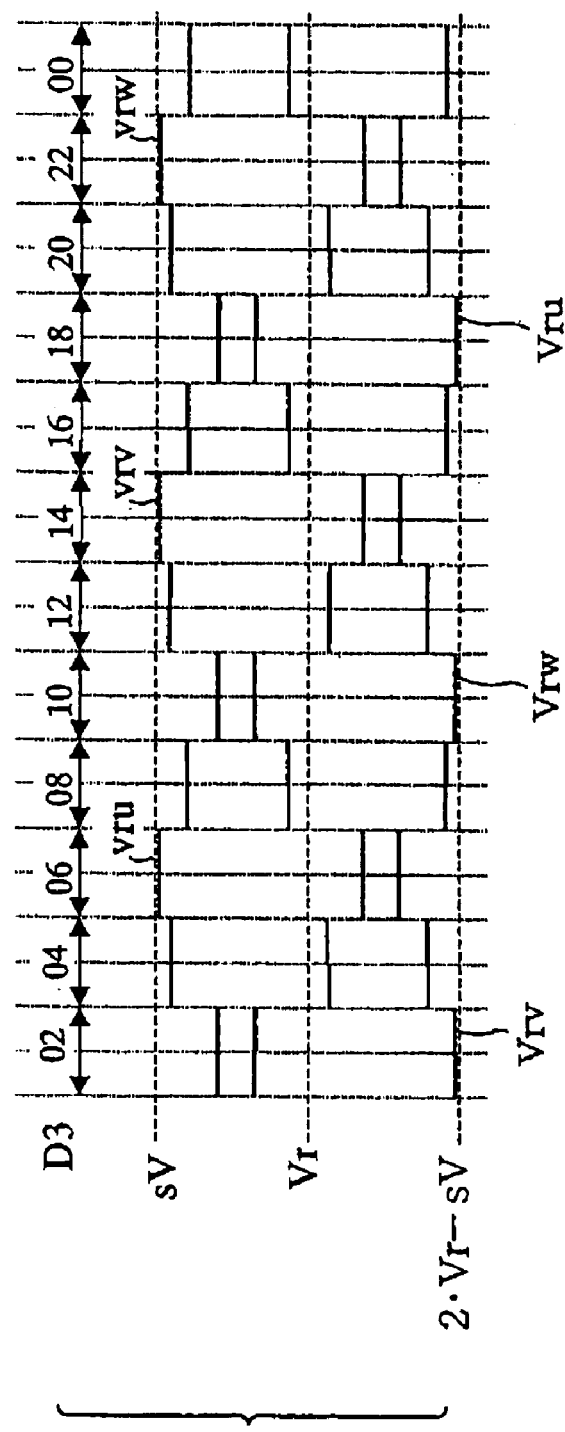
FIG. 21 is a view similar to FIG. 19, showing the case where output of the 12-resolution logic circuit has been selected.
Figure 22:
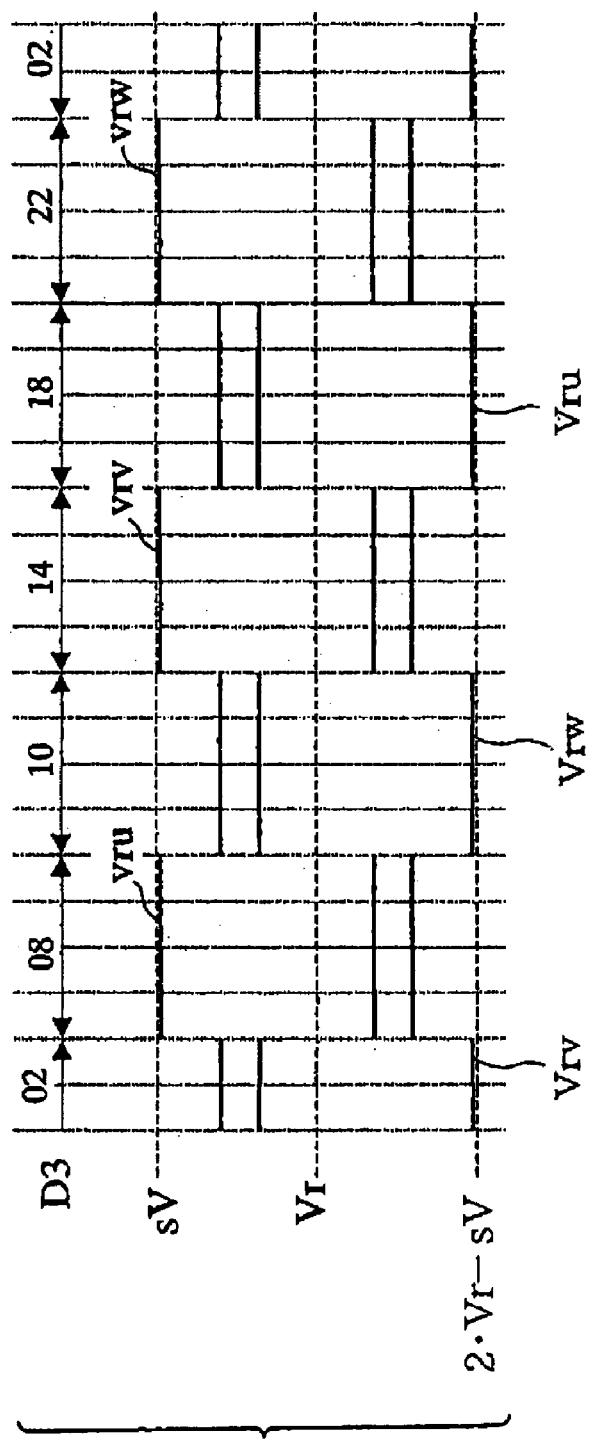
FIG. 22 is a view similar to FIG. 19, showing the case where output of the 6-resolution logic circuit has been selected.

FIGS. 19 and 20 show a case where output of the 24-resolution logic circuit 60 has been selected by the signal sQ in the position logic circuit 17. A waveform as shown in FIG. 21 is obtained when the output of the 12-resolution logic circuit 62 has been selected under the condition of voltage signal sV>reference voltage Vr. A waveform as shown in FIG. 22 is obtained when the output of the 6-resolution logic circuit 62 has been selected. FIGS. 21 and 22 show a case where "01" has been added to the phase by the phase control circuit 20. These waveforms are delivered as energization signals vru, vrv and vrw via operational amplifiers 96a, 96b and 96c each serving as a voltage follower. The energization signals vru, vrv and vrw are modulated in a PWM manner by the effect of the above-described energization circuit 3 and applied to the motor 2 as voltages Vu, Vu and Vw.

Figure 23:
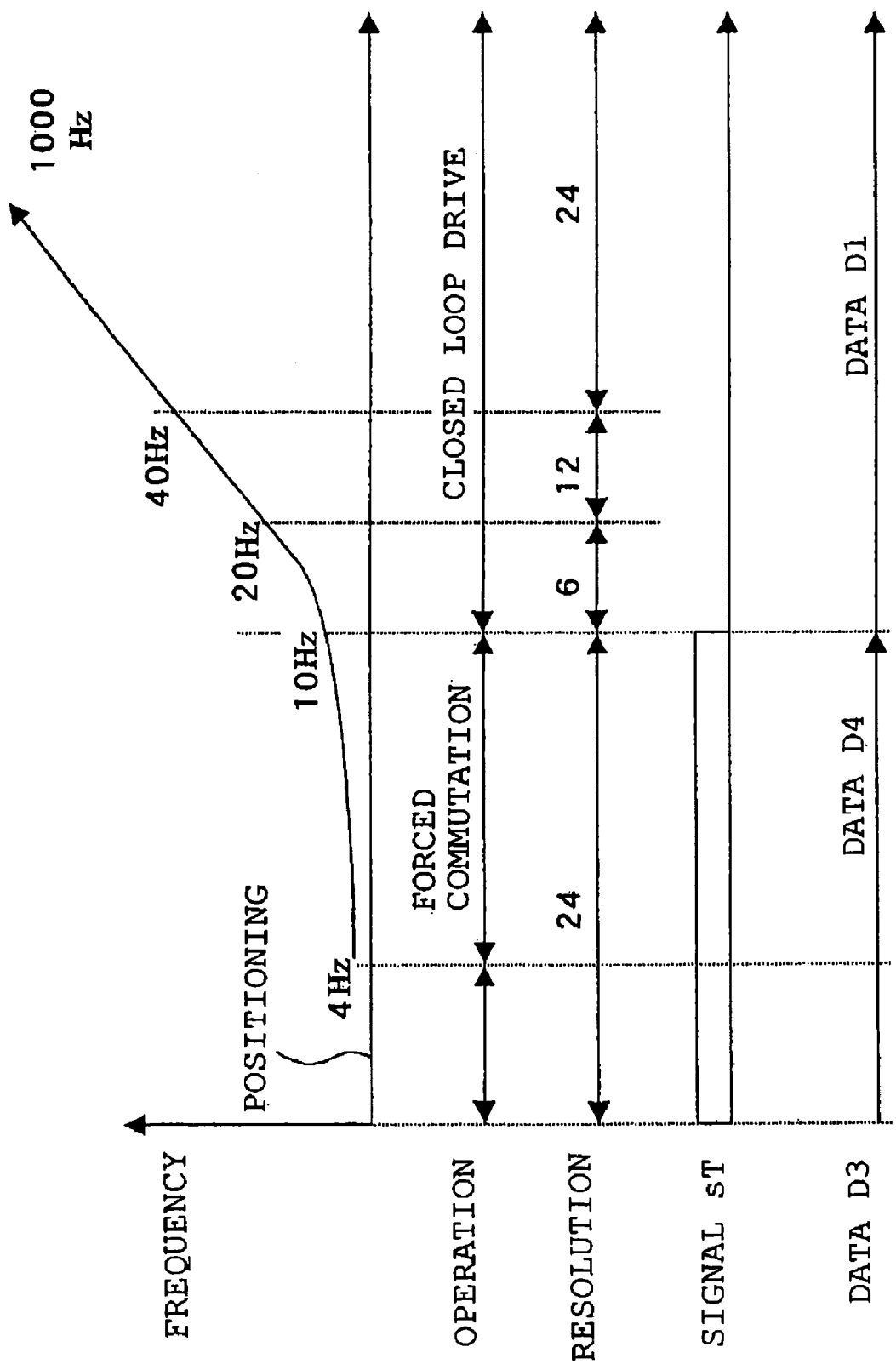
FIG. 23 shows a start-up sequence by a start control circuit.

The operation of the start control circuit 24 will be described. The start control circuit 24 is capable of closed-loop operation starting from a stopped state on the basis of the above-described position detection and executes processing for accelerating the motor 2. When a start signal $S_{start}$ is at L level (stop command), the start control circuit 24 delivers a stop signal (not shown) to the energizing circuit 3 whose output is in an off state. When the start signal $S_{start}$ turns to H level (start command), the start control circuit 24 carries out a sequential operation as shown in FIG. 23. More specifically, the start control circuit 24 turns the signal sT to a H level relative to the phase control circuit 20. While signal sT is at the H level, the phase control circuit 20 selects energization phase data D4 by the switching circuit 72, delivering the selected data as energization phase data D3. The start control circuit maintains energization phase data D4 at a predetermined value, for example, "00" for a predetermined period starting at start command). The motor 2 is positioned by the DC excitation.

After a predetermined period starting at the start command, the start control circuit 24 proceeds to a forced commutation operation in which values "00" to "23" are periodically delivered as energization phase data D4 by a built-in ring counter (not shown) comprising 24 flip-flops. The ring counter is set at a frequency increased continuously or stepwise from 4 Hz on the basis of clock CK as shown in FIG. 23, for example. Since the ring counter is used, the voltage forming circuit 23 forms a waveform of 24-resolution until the forced commutation starts.

When the frequency reaches 10 Hz, for example, the start control circuit 24 sets the signal sT at L level, and the phase control circuit 20 selects energization phase data D5 by the switching circuit 72, thereby delivering the selected data D5 as energization phase data D3. The frequency of 10 Hz is experimentally determined as a rotational speed at which 6-resolution position detection is possible in the position logic circuit 17. The 6-resolution is selected by the signal sQ. Subsequently, the motor 2 is rapidly accelerated since the 6-resolution position detection and closed loop operation for voltage formation are carried out.

When the ring counter reaches the frequency experimentally determined as a rotational speed at which position detection of 12-resolution is possible in the position logic circuit 17, for example, 20 Hz, the 12-resolution is selected by the signal sQ, so that the start control circuit 24 is switched to the 12-resolution position detection and closed loop operation for voltage formation. Furthermore, when the ring counter reaches the frequency experimentally determined as a rotational speed at which position detection of 24-resolution is possible in the position logic circuit 17, for example, 40 Hz, the 24-resolution is selected by the signal sQ, so that the start control circuit 24 is switched to the 24-resolution position detection and closed loop operation for voltage formation.

The above-described starting sequence renders a stable short-time start possible. Although FIG. 23 shows that switching is carried out on the basis of frequency, switching may be based on a lapse of time or rotational angle. Furthermore, the position logic circuit 17 may be provided with a detection determining circuit for determining whether position detection is possible at each resolution. The start control circuit 24 may be switched to each resolution on the basis of result of determination by the detection determining circuit. In this case, a desired determining manner depends upon whether a position can be detected in a predetermined sequence, for example, with respect to one electrical period.

Although the aforementioned starting sequence includes a stage of positioning by DC excitation, the stage is not necessarily provided when motor or load inertia is small. Furthermore, in order that start-up within a short period of time may be realized, the resolution is switched so that the start control circuit 24 can proceed to the closed loop operation at a lower rotational speed. However, when drive at a low resolution results in oscillation or noise, the forced commutation may be continued until the frequency of 40 Hz is reached, and immediately thereafter, the start control circuit 24 may be switched to the operation at 24-resolution.

The brake control circuit 25 compares the voltage command signal $V_{ref}$ with the reference voltage $V_r$ by the function of a polarity determination circuit, starting operation when the voltage command signal $V_{ref}$<reference voltage $V_r$ or the voltage command is determined to be negative). Braking includes a short-circuit brake and reverse torque brake, either of which is selected by the brake signal $S_{brake}$.

When the brake signal $S_{brake}$ is at the low level L, the brake control circuit 25 delivers a signal sK. The energizing circuit 3 to which the signal sK turns on lower FETs of three phases. As a result, the windings 2u, 2v and 2w are short-circuited such that braking force is generated in the motor 2. On the other hand, when the brake signal $S_{brake}$ is at the high level H, the brake control circuit 25 delivers a signal sB so that the phase control circuit 20 controls the energization phase according to the relationship as shown in FIG. 15. In this case, since the voltage forming circuit 23 forms negative voltage (energization signal with reverse phase), reverse torque brake is generated in the motor 2. Accordingly, the rotational speed of the motor 2 is reduced. When the rotational speed of the motor 2 is reduced to 10 Hz, for example, the rotational period detecting circuit 19 delivers a signal sR to the brake control circuit 25, which produces a signal sK to switch the brake mode to the short-circuit brake.

The current detecting circuit 10, induced voltage computing circuit 15 and position detecting circuit 18 are in operation even while the short-circuit brake and reverse torque brake are effective. As a result, the voltage command signal $V_{ref}$ is larger than the reference voltage $V_r$ and accordingly, when released from the braked state, the motor 2 can be shifted to the original driving state or a state where torque can be generated.

As obvious from the foregoing, the motor-drive control IC 1 of the illustrative example comprises the current detecting circuit 10, induced voltage computing circuit 15 and position detecting circuit 18. The motor-drive control IC 1 obtains the induced voltage signals eu, ev and ew from the detected current signals iu, iv and iw based on the phase voltage equation respectively. The motor-drive control IC 1 obtains the rotational position of the rotor with 6n-resolution where n=1, 2 and 3; and 6-, 12- and 24-bit). Consequently, no position sensor such as a Hall element needs to be provided.

The voltage forming circuit 23 includes the voltage divider circuit 94 and switch circuits 95a, 95b and 95c and generates substantially sinusoidal energization signals vru, vrv and vrw from the voltage signal sV and energization phase data D3. As a result, since the pulse width modulation (PWM) can be carried out by the energization circuit 3, sine wave drive of the motor 2 can be realized. Thus, since the motor 2 is driven by substantially sinusoidal current, torque ripple can be reduced and accordingly, vibration and/or noise can be reduced.

Furthermore, the phase control circuit 20 controls the phase according to the rotational speed and the braked state of the motor 2 so that an appropriate energization phase is obtained. As a result, the motor 2 can be operated with high efficiency. Furthermore, one of the three phase resolutions. The phase control circuit 20 delivers position data D1 with higher resolutions, as the rotational speed of the motor 2 is increased. More specifically, when the rotational speed is low, the phase control circuit 20 delivers position data D1 with 6-resolution providing a highest detection sensitivity. As the rotational speed is increased, the phase control circuit 20 delivers position data D1 with 12-resolution providing a middle detection sensitivity and position data D1 with 24-resolution providing a lowest detection sensitivity in turn. Consequently, the rotational position of the rotor can be detected to a lower rotational speed and accordingly, an operating range of the closed loop process driving the motor 2 by the sensorless manner can be increased.

The voltage limiting circuit 22 reduces the voltage command signal $V_{ref}$ thereby to obtain the voltage signal sV when the total current signal im is increased to or above a predetermined threshold. Accordingly, since the output currents Iu, Iv and Iw of the energization circuit 3 are prevented from becoming excessively large, the switching circuit 7 and the motor 2 can be protected from an overcurrent.

The start control circuit 24 positions the rotor by DC excitation and thereafter delivers 24-resolution energization phase data D4 so that forced commutation is carried out. Subsequently, the start control circuit 24 switches to the closed loop drive (a position detecting operation) when a frequency has been reached at which 6-resolution energization phase data D1 is established. Consequently, the motor 2 can start up stably.

The brake control circuit 25 can use the short-circuit brake and the reverse torque brake. The brake control circuit 25 switches to the short-circuit brake when the rotational speed of the motor 2 is reduced to such a level that a rotational position of the rotor cannot be detected. Accordingly, braking can be effected without depending upon the rotational speed.

The above-described functions are realized by a hardware arrangement. Accordingly, no microcomputer, analog-to-digital (A/D) converter, multiplier, read only memory (ROM) or the like needs to be provided, and the hardware arrangement can be achieved by a small circuit arrangement. When the aforesaid hardware is arranged in the same chip together with a power circuit provided for obtaining output current of not less than 2 A with a withstand voltage of not less than 12 V, for example, as in the illustrative example, a process with a low integration ranging from 0.4 μm to 0.6 μm for ensurement of withstand voltage. In this regard, the IC 1 which is small in size is advantageous in the cost over conventional large drive control ICs using microcomputers.

The foregoing illustrative example can be modified or expanded as follows. Although the 6-, 12- and 24-bit position data (rotational position of rotor) are generated in the foregoing illustrative example, 18-bit or higher position data may be generated.

The total current detecting circuit 21, the voltage limiting circuit 22 and the brake control circuit 25 may or may not be provided. Furthermore, the drive control IC for the three-phase brushless motor has been described in the illustrative example. However, the drive control IC may be applied to a polyphase brushless motor other than the three-phase. Additionally, the brushless motor 2 should not be limited to the use as the spindle motor but may generally be used in household electrical equipment or information equipment.

Figures 24, 24A:
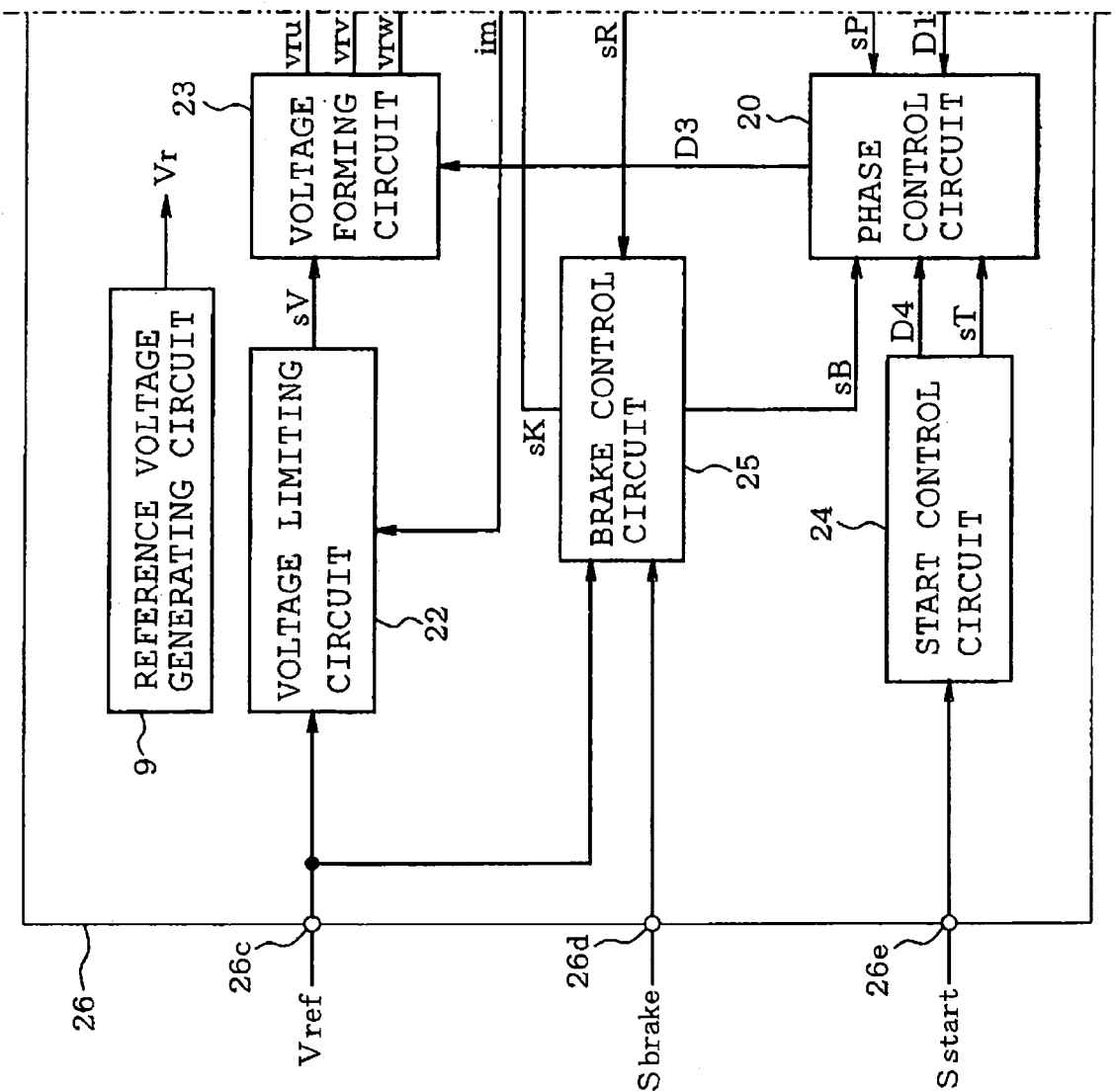
FIGS. 24A and 24B are similar to FIGS. 1A and 1B, showing a second illustrative example of the invention, respectively.
Figure 24B:
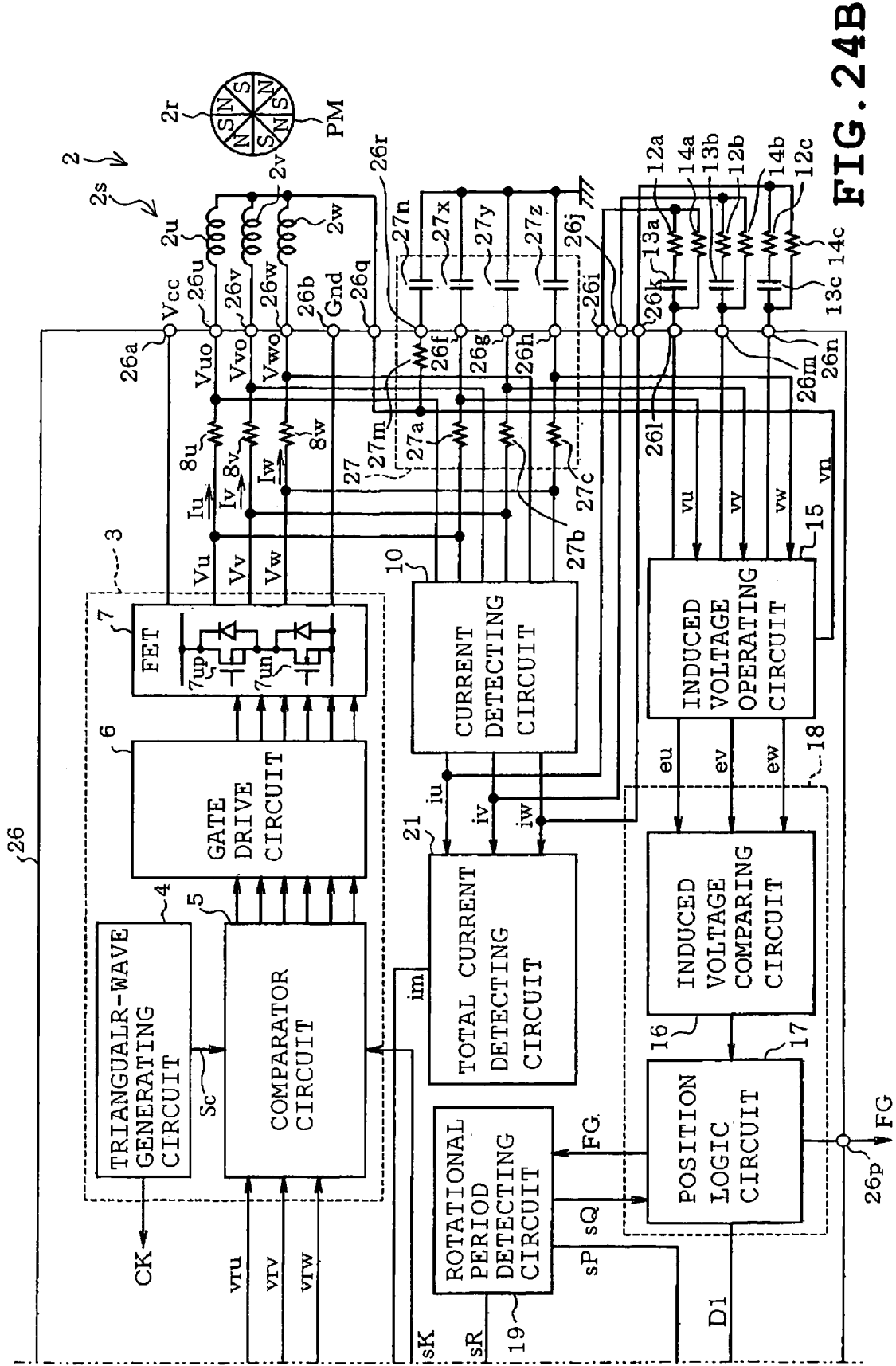

FIGS. 24A and 24B illustrate an overall arrangement of the motor drive control IC of a second illustrative example. Similar or identical parts in the second illustrative example are labeled by the same reference symbols as those in the first illustrative example.

An IC 26 has a terminal 26q to which a neutral point of the motor 2 is to be connected, as shown in FIGS. 24A and 24B. A filter circuit 27 comprises resistors 27a, 27b and 27c provided in the same manner as shown in FIG. 1B, capacitors 27x, 27y and 27z provided in the same manner as shown in FIG. 1B, a resistor 27m connected between the terminals 26q and 26r of the IC 26 and a capacitor 27n externally provided between the terminal 26r and the ground. The added resistor 27m and capacitor 27n serve to eliminate PWM components of the neutral-point voltage Vn. A resultant signal vn from which the PWM components have been eliminated is supplied to the induced voltage computing circuit 15.

Referring to FIG. 3 showing the induced voltage computing circuit 15, the adder circuit 49 includes the operational amplifier 47 serving as a voltage follower and resistors 48a, 48b and 48c as described above. The aforementioned neutral-point voltage signal vn is used instead of the neutral-point voltage signal Vn'. This arrangement improves an accuracy of computation of the induced voltage.

Figure 25A:
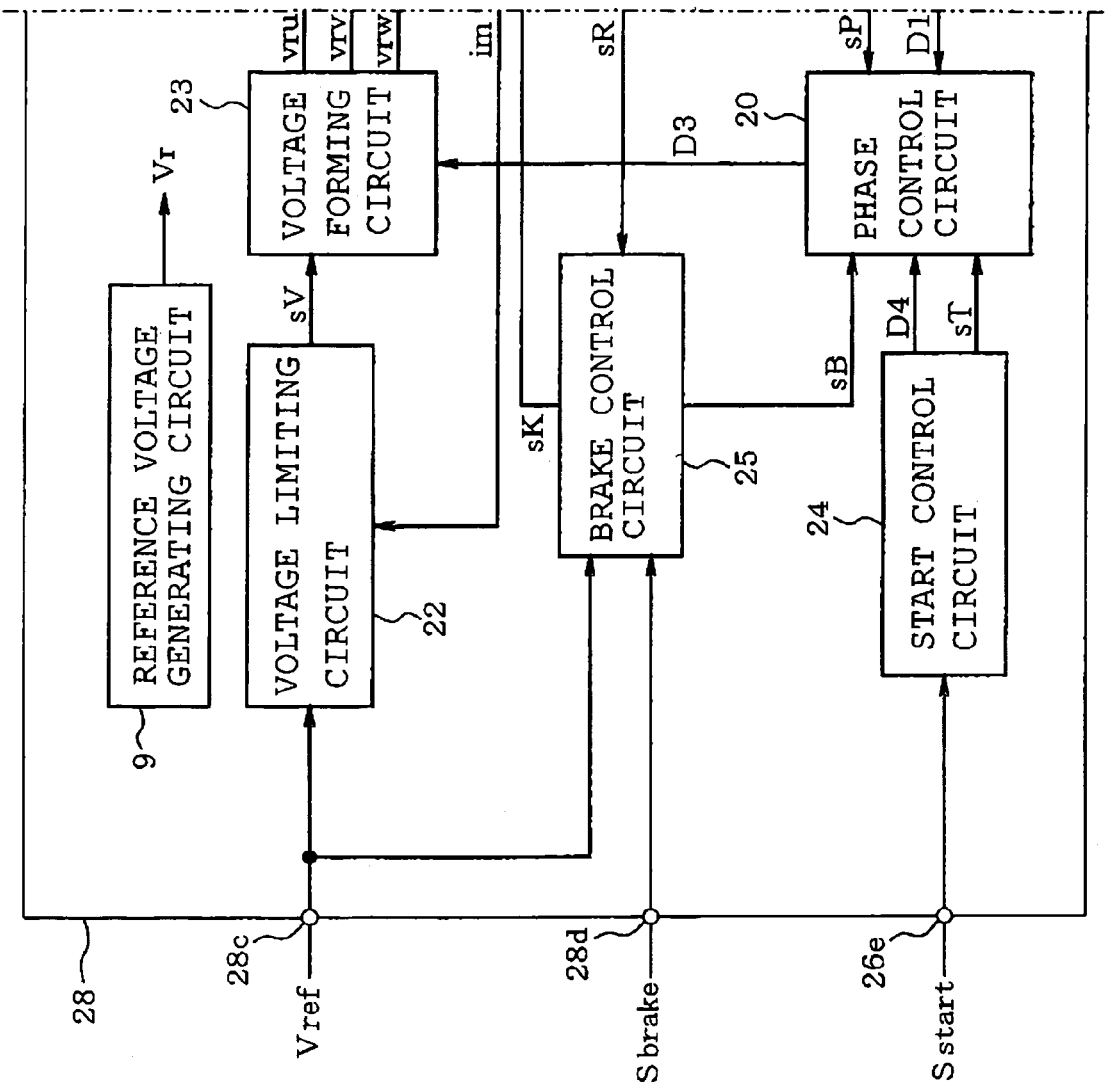
FIGS. 25A and 25B are similar to FIGS. 1A and 1B, showing a third illustrative example of the invention, respectively.
Figure 25B:
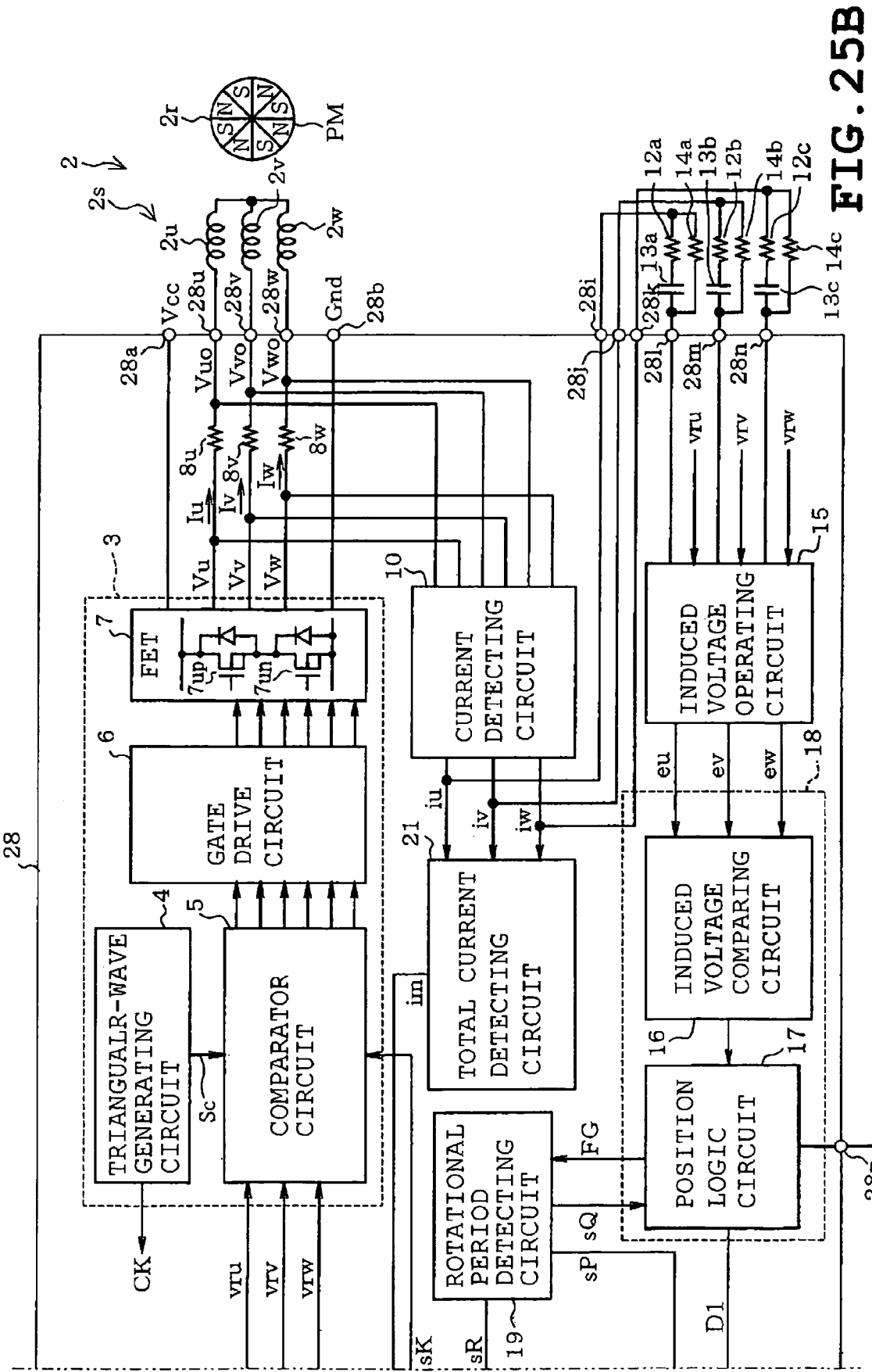

FIGS. 25A and 25B illustrate an overall arrangement of the motor drive control IC of a third illustrative example. Similar or identical parts in the third illustrative example are labeled by the same reference symbols as those in the first illustrative example.

In the IC 28 of the illustrative example, the energization signals vru, vrv and vrw are supplied to the induced voltage computing circuit 15, instead of the voltage signals vu, vv and vw. When α designates an amplitude ratio of the energization signal vru to the output voltage Vu of the energization circuit 3, (R5/R3) and (R5/R4) are each adjusted to 1/α. Consequently, the same operation as in the first illustrative example can be carried out. With this, the filter circuit 11 and the terminals thereof as shown in FIG. 1A are eliminated in the third illustrative example.

In the arrangements as shown in FIGS. 1A, 1B, 24A and 24B, the induced voltage can be detected while the motor 2 is in slowing-down revolution. In the third illustrative example, however, the position detection does not function while the motor 2 is in slowing-down revolution or the energization circuit 3 is off. Accordingly, the arrangement of the third illustrative example cannot be applied to the use necessitating position detection even during the slowing-down revolution.

Figure 26A:
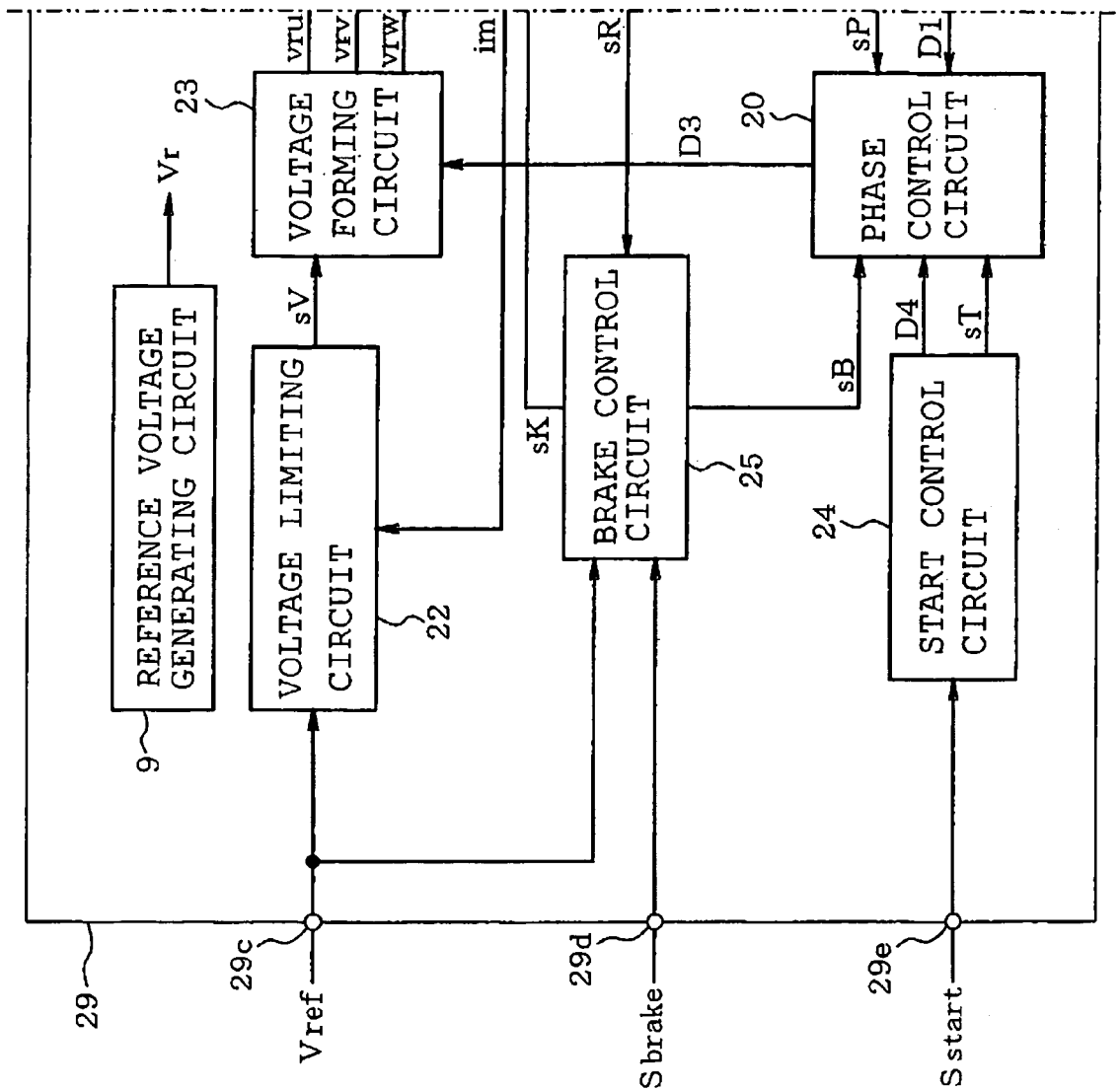
FIGS. 26A and 26B are similar to FIGS. 1A and 1B, showing a fourth illustrative example of the invention, respectively.
Figure 26B:
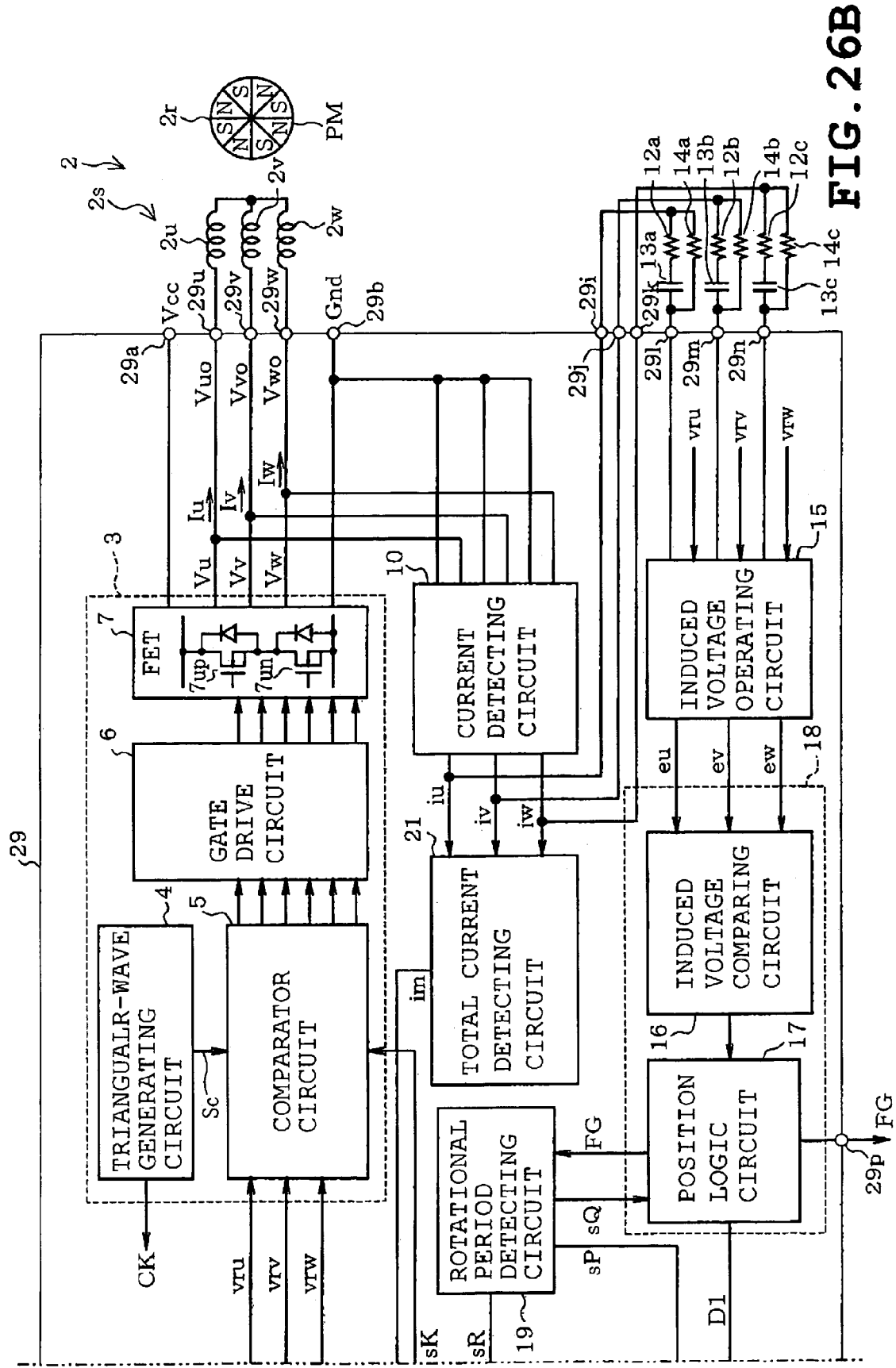

FIGS. 26A and 26B illustrate an overall arrangement of the motor drive control IC of a fourth illustrative example. Similar or identical parts in the fourth illustrative example are labeled by the same reference symbols as those in the first illustrative example.

In the IC 29 of the illustrative example, the current is detected using on-state voltage (drain-source voltage $V_{DS}$) of the lower arm FET (FET 7un in the case of phase U) of the switching circuit 7, instead of the shunt resistors 8u, 8v and 8w as shown in FIG. 1B. To the current detecting circuit 110 are supplied output voltages Vu, Vv and Vw of the switching circuit 7 and ground potential $G_{nd}$.

Figure 27:
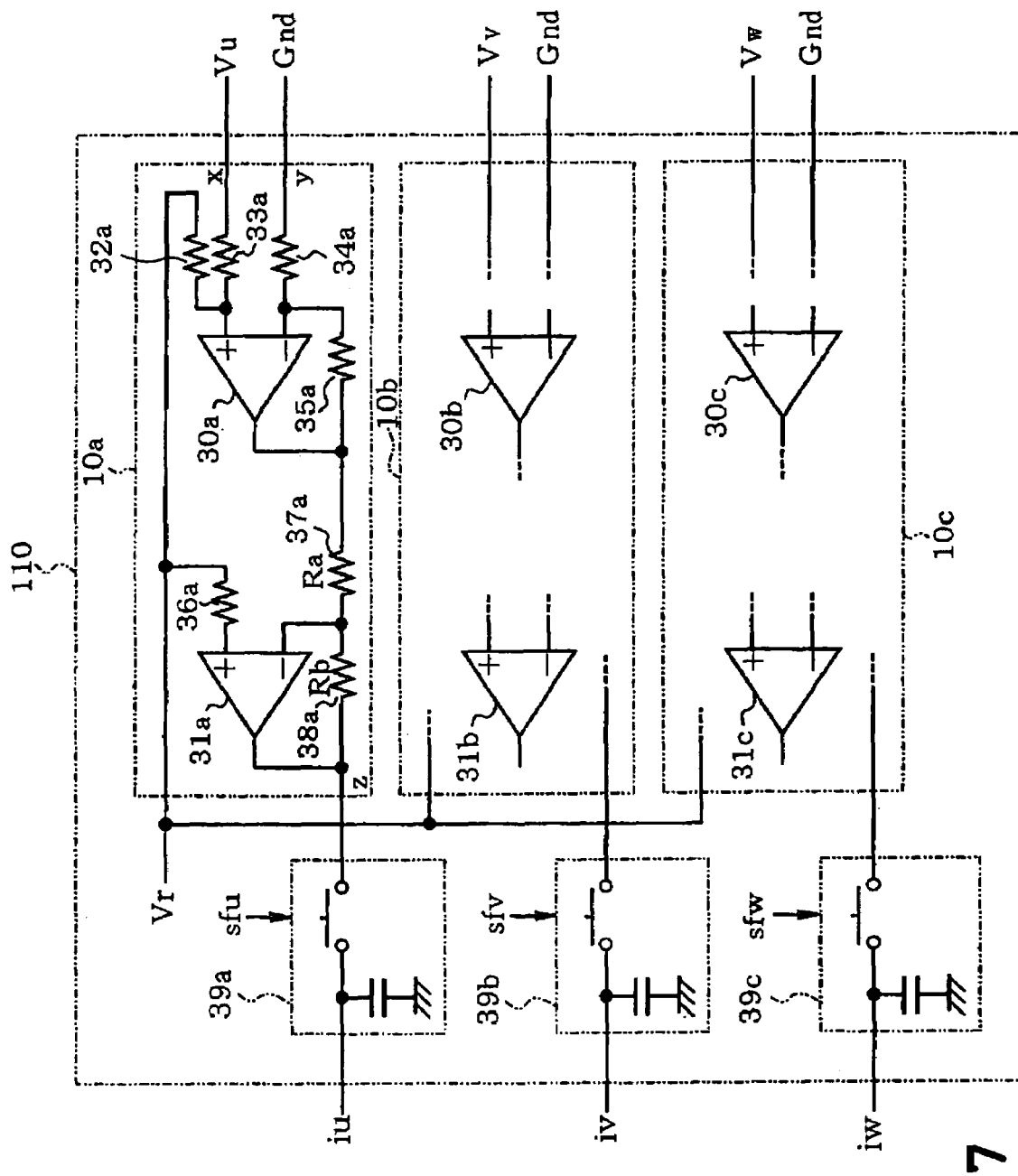
FIG. 27 is a view similar to FIG. 2.

FIG. 27 shows an arrangement of the current detecting circuit 110. Latch circuits 39a, 39b and 39c latch (sample and hold) output signals of the current detecting circuits 10a, 10b and 10c by on-state signals sfu, sfv and sfw of the lower arm side FET of the switching circuit 7 respectively. As a result, current signals iu, iv and iw during the on-period of the lower arm side FET. According to the illustrative example, the shunt resistors 8u, 8v and 8w can be eliminated.

Figure 28:
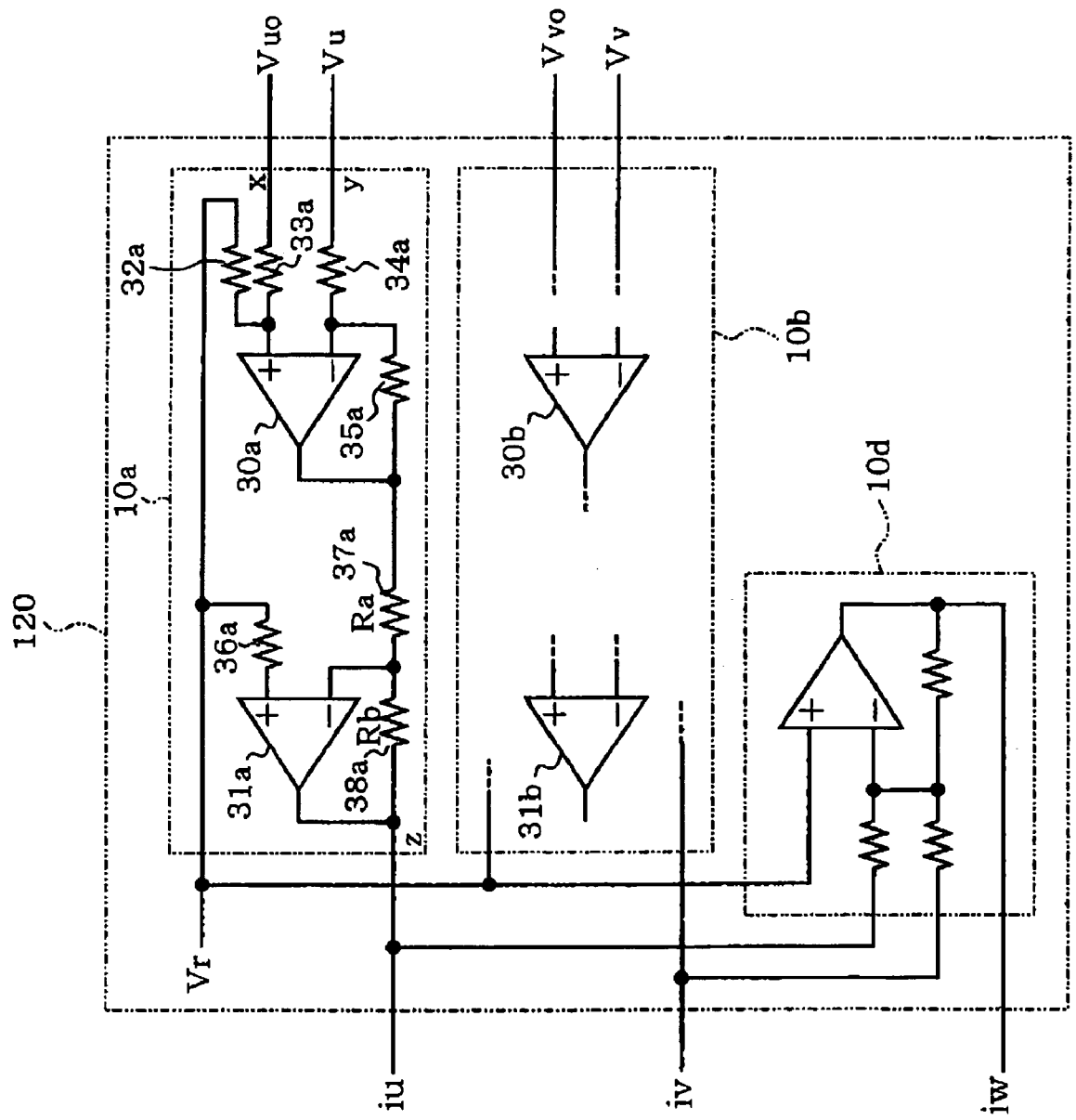
FIG. 28 is a view similar to FIG. 2, showing a fifth illustrative example of the invention.

In each of the foregoing illustrative examples, the current signals iu, iv and iw are detected directly in the current detecting circuit 10 as shown in FIG. 2. In a fifth illustrative example, for example, a subtraction circuit 10d is provided in the current detecting circuit 120 as shown in FIG. 28, instead of the phase W current detecting circuit 10c. The current signal iw of phase W is obtained from the current signals iu and iv of the other phases by the computation of −(iu+iv). This arrangement can further reduce the circuit size and the number of terminals.

Figure 29:
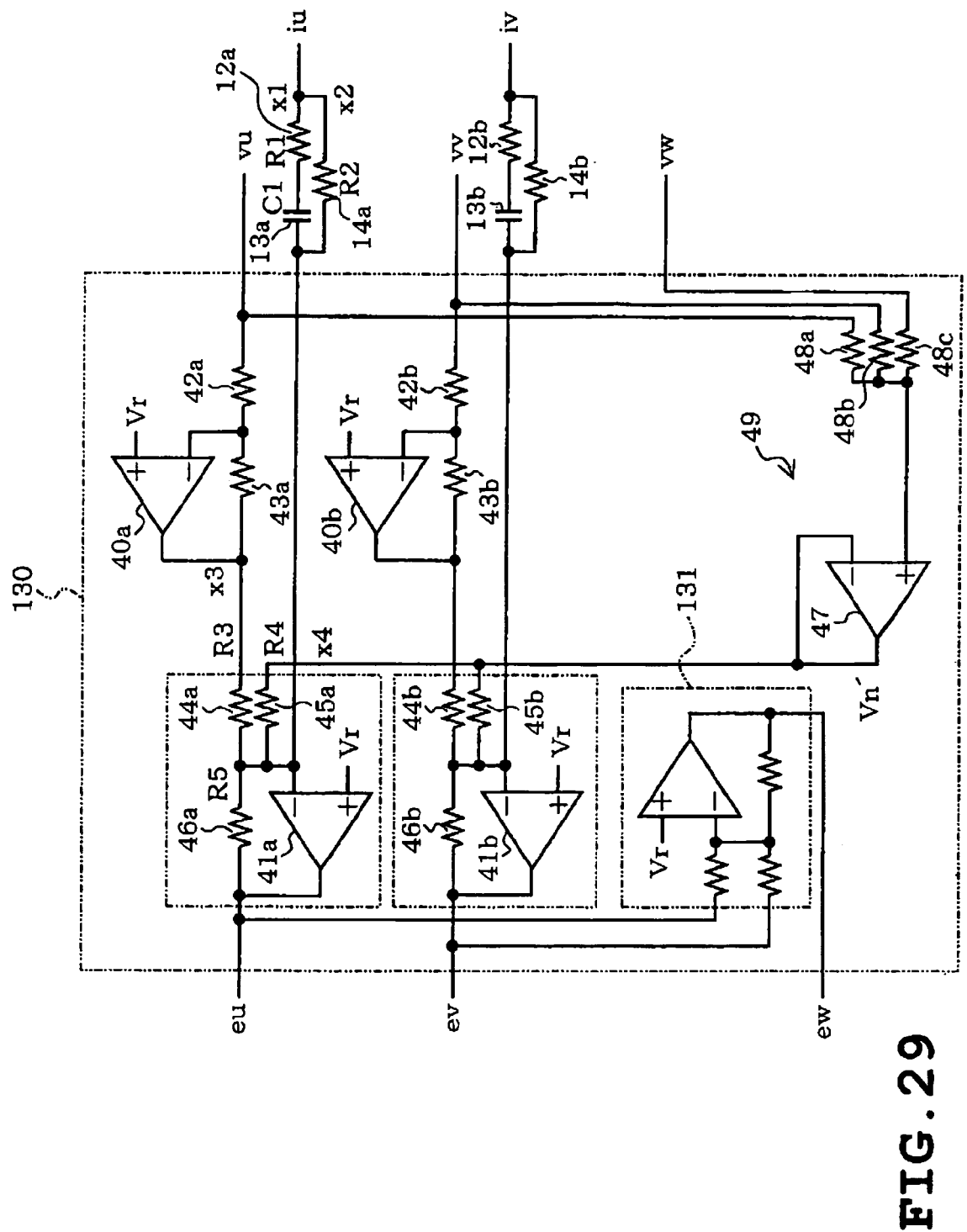
FIG. 29 is a view similar to FIG. 3, showing a sixth illustrative example of the invention.

In each of the foregoing illustrative examples, the induced voltage signals eu, ev and ew are detected directly in the induced voltage computation circuit 15 as shown in FIG. 3. In a sixth illustrative example, however, a subtraction circuit 131 is provided in the induced voltage computation circuit 130 as shown in FIG. 29, instead of the phase W circuit. The induced voltage signal ew of phase W is obtained from the induced voltage signals eu and ev of the other phases by the computation of −(eu+ev). This arrangement can further reduce the circuit size and the number of terminals.

In each of the foregoing illustrative examples, the induced voltage signals eu, ev and ew are directly obtained in the induced voltage computing circuit 15 as shown in FIG. 3. In a sixth illustrative example, a subtraction circuit 131 is provided in the induced voltage computing circuit 130 as shown in FIG. 29, instead of the phase W circuit, for example. The phase W induced voltage signal ew is obtained from the other phase induced voltage signals eu and ev by the operation of −(eu+ev). This arrangement can further reduce the circuit size and the number of terminals.

Figure 30:
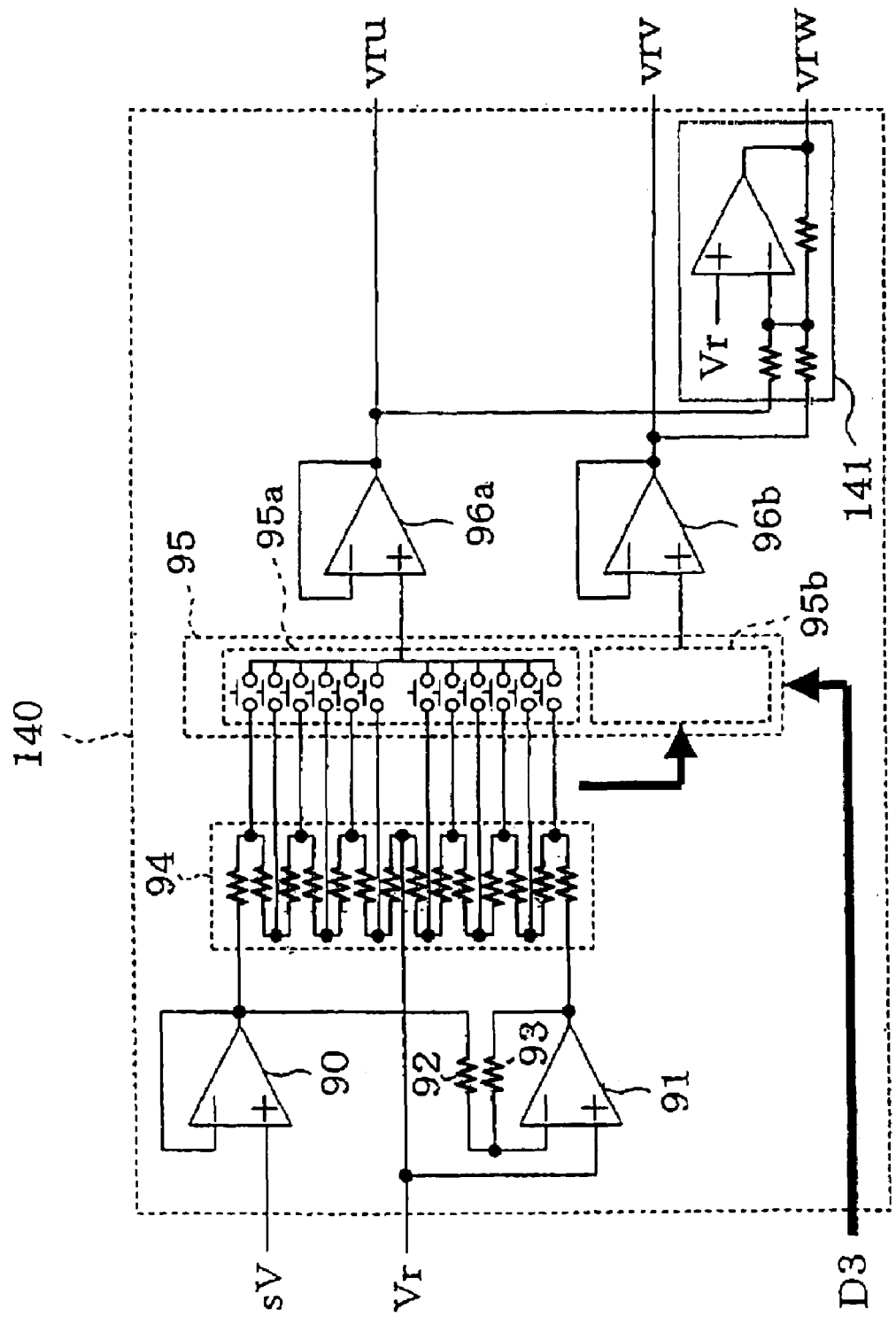
FIG. 30 is a view similar to FIG. 8, showing a seventh illustrative example of the invention.

In each of the foregoing illustrative examples, the energization signals vru, vrv and vrw are generated directly in the voltage forming circuit as shown in FIG. 8. In a seventh illustrative example, as in a voltage forming circuit 140 shown in FIG. 30, for example, a subtraction circuit 141 is provided, instead of, the phase W switch circuit 95c and operational amplifier 96c. The phase W induced voltage signal vrw is obtained from the other phase induced voltage signals vru and vrv by the operation of −(vru+vrv). This arrangement can further reduce the circuit size and the number of terminals.

FIGS. 31 to 36 illustrate an eighth illustrative example. FIGS. 31A, 31B and 31C show an overall arrangement of the drive control device for a permanent magnet motor. The drive control device 201 drives via a gate drive circuit 202 and switching circuits 203a, 203b and 203c a fan motor 205 rotating a fan 204. The fan motor 205 (hereinafter referred to merely as "motor 205") comprises a rotor 205r having permanent magnets PM and a stator 205s including three-phase windings 205u, 205v and 205w. The drive control circuit 201 includes a control circuit 206 arranged into an IC, for example, and realizes functions thereof by hardware processing but not by software processing with use of a processor. The drive control device 201 may be separate from or integral (incorporated in) with the fan motor 205.

Each of the switching circuits 203a, 203b and 203c is a bridge circuit comprising an insulated gate bipolar transistor (IGBT) 203p constituting an upper arm and an IGBT 203n constituting a lower arm. The switching circuits 203a, 203b and 203c constitute a three-phase bridge-connected inverter circuit. The switching circuits 203a to 203c have respective input terminals to which DC voltage obtained by rectifying AC power supply and respective output terminals connected to windings 205u, 205v and 205w of the motor 205.

Resistors 208a, 208b and 208c are connected between the emitters of the lower arm side IGBT's 203n of the respective switching circuits 203a to 203c and a negative side power supply line 207. Interterminal voltages of the resistors 208a to 208c are supplied to a current detecting circuit 209 of the control circuit 206. Bipolar transistors, field effect transistors (FET's) or the like may be employed in the switching circuits 203a to 203c, instead of the IGBT's.

The current detecting circuit 209 detects current signals iu, iv and iw according to output currents Iu, Iv and Iw of the switching circuits 203a to 203c based on the interterminal voltages of the resistors 208a to 208c respectively. The current detecting circuit 209 comprises an amplifying circuit 209a amplifying the current signals iu, iv and iw with a predetermined reference voltage Vr serving as a reference potential and a latch circuit 209b carrying out a latching operation by a current detection timing signal s1 delivered by a triangular wave forming circuit 224 in synchronization with the PWM period. Latched current signals iu, iv and iw are supplied to both amplitude detecting circuit 210 and phase detecting circuit 211. Furthermore, the signals iu, iv and iw are supplied to an induced voltage computing circuit 215 of the control circuit 206 via resistors 213a-213c, resistors 214a-214c and capacitors 212a-212c all of which are provided outside the control circuit 206.

The amplitude detecting circuit 210 produces a voltage amplitude signal va proportional to current amplitude, for example, by synthesizing process of absolute values of respective phase current signals iu, iv and iw, delivering the produced voltage amplitude signal va to a voltage control circuit 223. The amplitude detecting circuit 210 comprises absolute value circuits obtaining absolute values of respective current signals iu, iv and iw and a synthesis circuit (an adder circuit, for example) synthesizing absolute value signals delivered by the absolute value circuits, as the total current detecting circuit 21 shown in FIG. 7. Furthermore, the phase detecting circuit 211 produces a 6-resolution current phase signal si (see FIG. 32C) indicative of a current phase and delivers the signal si to a phase control circuit 216. The phase detecting circuit 211 comprises a comparator which compares one of the current signals iu, iv and iw with another.

Terminal voltages Vu, Vv and Vw of respective phases of the motor 205 are supplied via a voltage divider circuit 217 to a 120-degree position detecting circuit 218 of the control circuit 206. The terminal voltages Vu, Vv and Vw are also supplied via filter circuits 219a, 219b and 219c to the induced voltage computing circuit 215 of the control circuit 206 as voltage signals vu, vv and vw.

The voltage signals vu, vv and vw are supplied to the induced voltage computing circuit 215, which then delivers induced voltage signals eu, ev and ew. The induced voltage computing circuit 215 has the same arrangement as the induced voltage computing circuit 15 shown in FIG. 3. More specifically, the induced voltage computing circuit 215 comprises inverting circuits 215x, 215y and 215z composed of respective operational amplifiers, a computing unit 215n which is a non-inverting adder circuit which adds the voltage signals vu, vv and vw and three adder circuits 215a, 215b and 215c. Each adder circuit comprises an operational amplifier and three resistors having respective resistance values R3, R4 and R5.

The induced voltage signals eu, ev and ew are supplied to a sinusoidal wave position detecting circuit 220, which then delivers position data Dp2. The sinusoidal wave position detecting circuit 220 comprises a comparing circuit 220a, a multiplying circuit 220b and a position determining circuit 220c. The comparing circuit 220a compares one of the induced voltage signals eu, ev and ew with another thereby to produce 6-resolution position data Dp1 (first rotor rotational position) composed of six data with phase difference of 60 degrees from one another and a rotation signal sp1 (see FIG. 32E).

The rotation signal sp1 is supplied to the multiplying circuit 220b, which produces a multiplied signal sk (see FIG. 32F) obtained by multiplying the frequency of the supplied signal sp1 by a predetermined time, for example, 32 times (n=32). The position determining circuit 220c is incorporated with a counter 220d. The aforesaid position data Dp1 and multiplied signal si are supplied to the position determining circuit 220c, which then produces position data Dp2 (second rotor rotational position: see FIG. 32C).

The current phase signal si delivered by the phase detecting circuit 211 is supplied to the phase control circuit 216. The rotation signal sp1 delivered by the sinusoidal wave position detecting circuit 220 is also supplied to the phase control circuit 216. The phase control circuit 216 then produces phase data Dp3 (phase command). The position data Dp1 may be supplied to the phase control circuit 216, instead of the rotation signal sp1.

The sinusoidal wave position detecting circuit 220 delivers the position data Dp2 to the sinusoidal wave forming circuit 221. The phase control circuit 216 delivers the phase data Dp3 to the sinusoidal wave forming circuit 221. Furthermore, the voltage control circuit 223 delivers the output voltage signal vo to the sinusoidal wave forming circuit 221. The triangular wave forming circuit 224 delivers a triangular wave signal ss to the sinusoidal wave forming circuit 221. Based on these signals, the sinusoidal wave forming circuit 221 produces pulse-width modulated energization signals u1, v1, w1, x1, y1 and z1.

The sinusoidal wave forming circuit 221 comprises an adder circuit 221a, a voltage-dividing circuit 221b, switch circuits 221u, 221v and 221w and a PWM circuit 221c. The adder circuit 221a adds the position data Dp2 and the phase data Dp3 together thereby to deliver energization angle data Dp4. The voltage-dividing circuit 221b comprises a ladder resistor (voltage-dividing resistor) in the same manner as the voltage-dividing circuit 94 (12-resolution amplitude precision) shown in FIG. 8. The ladder resistor delivers a 180-degree cosine values according to the output voltage signal vo with 96-resolution amplitude precision.

The switch circuits 221u, 221v and 221w comprise respective analog switches for selecting a cosine value according to energization angle data Dp4 from those delivered by the voltage-dividing circuit 221b in the same manner as the switch circuit 95 as shown in FIG. 8. The switch circuits 221u, 221v and 221w delivers three-phase sinusoidal signals su, sv and sw (first energization signal, three-phase energization signals) respectively. The PWM circuit 221c pulse-width modulates the signals su, sv and sw by the triangular signal ss, thereby producing energization signals u1, v1, w1, x1, y1 and z1 (three-phase energization signals after modulation). The adder circuit 221a, voltage-dividing circuit 221b and switch circuits 221u, 221v and 221w constitute an energization signal forming circuit 221x.

The 120-degree position detecting circuit 218 obtains 6-resolution position signals cu, cv and cw by the comparison of voltages Vu, Vv and Vw divided by the voltage-dividing circuit 217 with a neutral-point voltage Vn (actually, imaginary neutral-point voltage Vn'). The 120-degree position detecting circuit 218 comprises comparing circuits 218a, 218b and 218c and a synthesizing circuit 218n. The synthesizing circuit 218n comprises star-connected resistors for obtaining the neutral-point voltage Vn. The position signals cu, cv and cw correspond to a third rotor rotation position and more specifically, position data Dp5 from which unnecessary pulses have been eliminated becomes a signal corresponding to the signal corresponding to the third rotor rotation position, as will be described later.

The position signals cu, cv and cw are supplied to the 120-degree energization signal forming circuit 218, which delivers pulse-width modulated energization signals u2, v2, w2, x2, y2 and z2. The 120-degree energization signal forming circuit 218 comprises a waveform shaping circuit 222a, a timing circuit 222x incorporated with counters 222b and 222c and a PWM circuit 222d. The waveform shaping circuit 222a eliminates pulses at the time of energization switching from the position signals cu, cv and cw, delivering 6-resolution position data Dp5 (a third rotor rotation position). The timing circuit 222x delivers signals so1 to so6 (second energization signals).

The voltage control circuit 223 comprises a subtracter obtaining the difference between the externally supplied voltage command vc and the voltage amplitude signal va detected by the amplitude detecting circuit 210 and a proportional controller delivering an output voltage signal vo which is a proportional signal of voltage deviation delivered by the subtracter. A proportional integrating controller may be employed, instead of the proportional controller.

The triangular wave forming circuit 224 delivers the current detection timing signal s1 to the latch circuit 209b of the current detecting circuit 209. The triangular wave forming circuit 224 also delivers the triangular wave signal ss to both PWM circuit 225 and PWM circuit 221c of the sinusoidal wave forming circuit 221. The triangular wave signal ss and the current detection timing signal s1 are in synchronization with each other. The PWM circuit 225 delivers the PWM signal sa to the PWM circuit 222d of the 120-degree energization signal forming circuit 222.

To a sequence control circuit 226 are supplied externally supplied operation command signals Mode 1, Mode 2 and Mode 3, rotation signals sp1, sp2 and sp3 produced in the control circuit 206 and a rotational direction signal sh. The sequence control circuit 226 incorporates a rotation determining circuit 226a, stop-start sequence circuit 226b, a normal rotation start sequence circuit 226c, a reverse rotation start sequence circuit 226d and a rotation signal forming circuit 226x. The sequence control circuit 226 produces a rotation signal rot1 and a rotational direction signal rot2 both delivered externally, a selection signal sto delivered to an energization signal selecting circuit 227, and a direction signal mcw, a positioning signal mci and a forced commutation signal mcf all delivered to the 120-degree energization signal forming circuit 222.

While the selection signal sto is OFF, the rotation determining circuit 226a detects a rotational speed and a rotational direction of the motor 205 based on the rotation signal sp1 in synchronization with the position data Dp1 delivered by the comparing circuit 220a or the rotation signal sp3 in synchronization with the position signals cu, cv and cw delivered by the waveform shaping circuit 222a.

An energization signal selecting circuit 227 selects and delivers either energization signals u1, v1, w1, x1, y1 and z1 or energization signals u2, v2, w2, x2, y2 and z2 according to the selection signal st1. Furthermore, when the selection signal sto is OFF, output of the energization signal is stopped. Still furthermore, a dead time forming circuit 228 sets dead time for an energization signal. The set dead time is delivered as a final energization signal to the gate drive circuit 202. The dead time forming circuit 228, the gate drive circuit 202 and switching circuits 203a, 203b and 203c constitute an energization circuit 229.

Figure 31A:
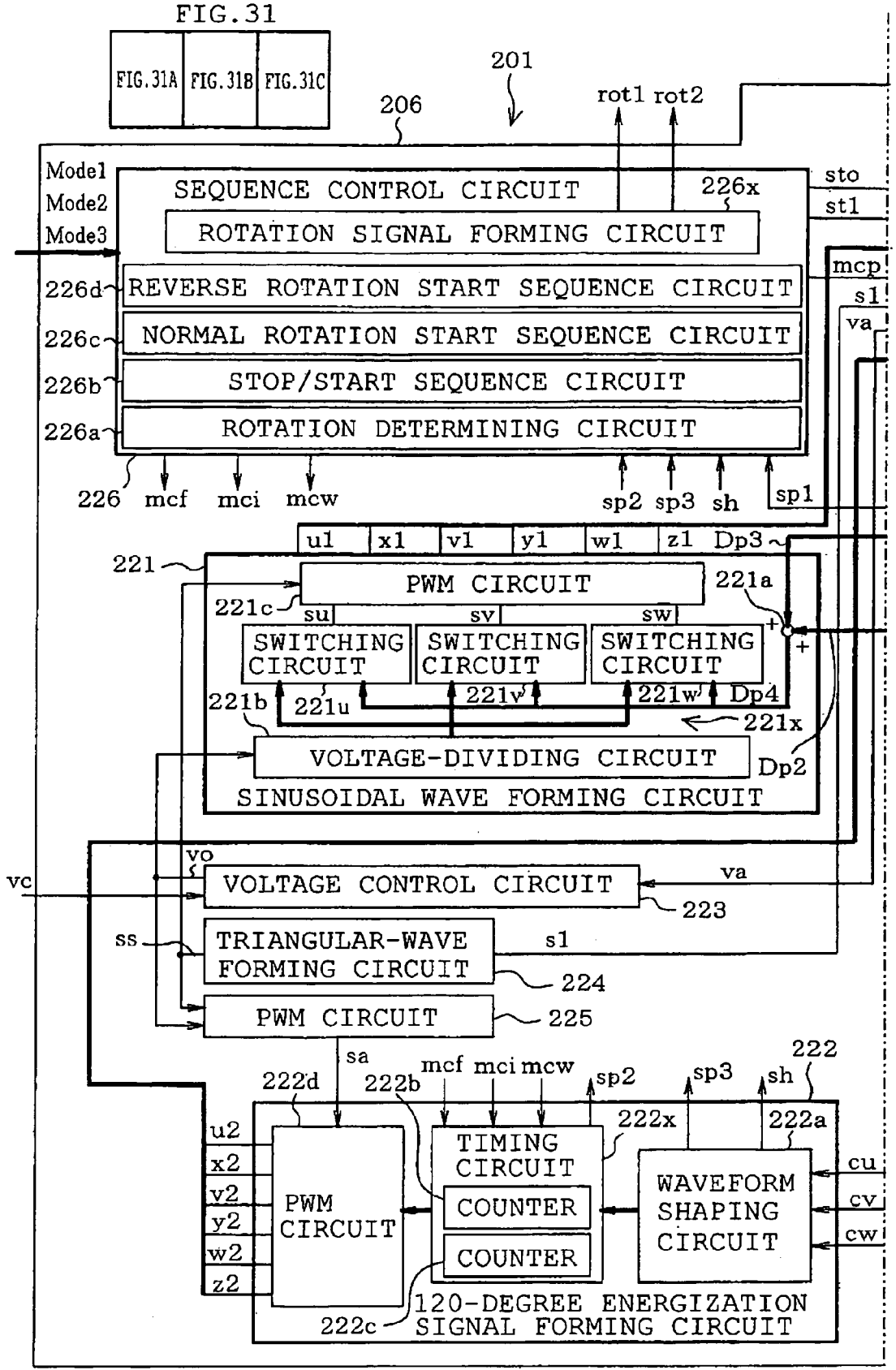
FIGS. 31A, 31B and 31C are similar to FIGS. 1A and 1B, showing an eighth illustrative example of the invention.

The operation of the motor control device will now be described with reference to FIGS. 32A to 36 as well as to FIGS. 31A, 31B and 31C. Firstly, the operation in relation to the formation of the first energization signal will be described with reference to the timing chart of FIGS. 32A to 32I. FIGS. 32A to 32I show the voltage signals vu, vv and vw, current signals iu, iv and iw, the current phase signal si, the induced voltage signals eu, ev and ew, the rotation signal sp1, the multiplying signal sk, the position data Dp2, energization angle data Dp4 and signals su, sv and sw.

When voltage is applied to the windings of the motor 205 by the PWM-controlled phase switching circuits 203a, 203b and 203c, current flows into the resistors 208a, 208b and 208c in synchronization with on-timing of the lower arm side IGBT 203n. Signals converted to voltage by the resistors 208a-208c are further converted to respective current signals iu, iv and iw on the basis of the reference voltage Vr by the amplifying circuit 209a of the current detecting circuit 209. The current signals iu, iv and iw are sampled and held in synchronization with the current detection timing signal s1 by the latch circuit 209b.

On the other hand, terminal voltages Vu, Vv and Vw of the motor 205 are divided into, for example, hundredth voltage by the voltage dividing circuit 217 and further smoothed by the filter circuit 219 (219a, 219b and 219c), thereafter converted to respective voltage signals vu, vv and vw from which PWM waveform components and which have substantially sinusoidal waveforms. In the induced voltage computing circuit 215, the inverting circuits 215x, 215y and 215z invert the voltage signals vu, vv and vw under the bias condition of the reference voltage Vr. The computing unit 215n produces non-inverting voltage (imaginary neutral-point voltage) vn from the voltage signals vu, vv and vw. The non-inverting voltage vn corresponds to the neutral point voltage Vn of the motor 205.

Figure 31B:
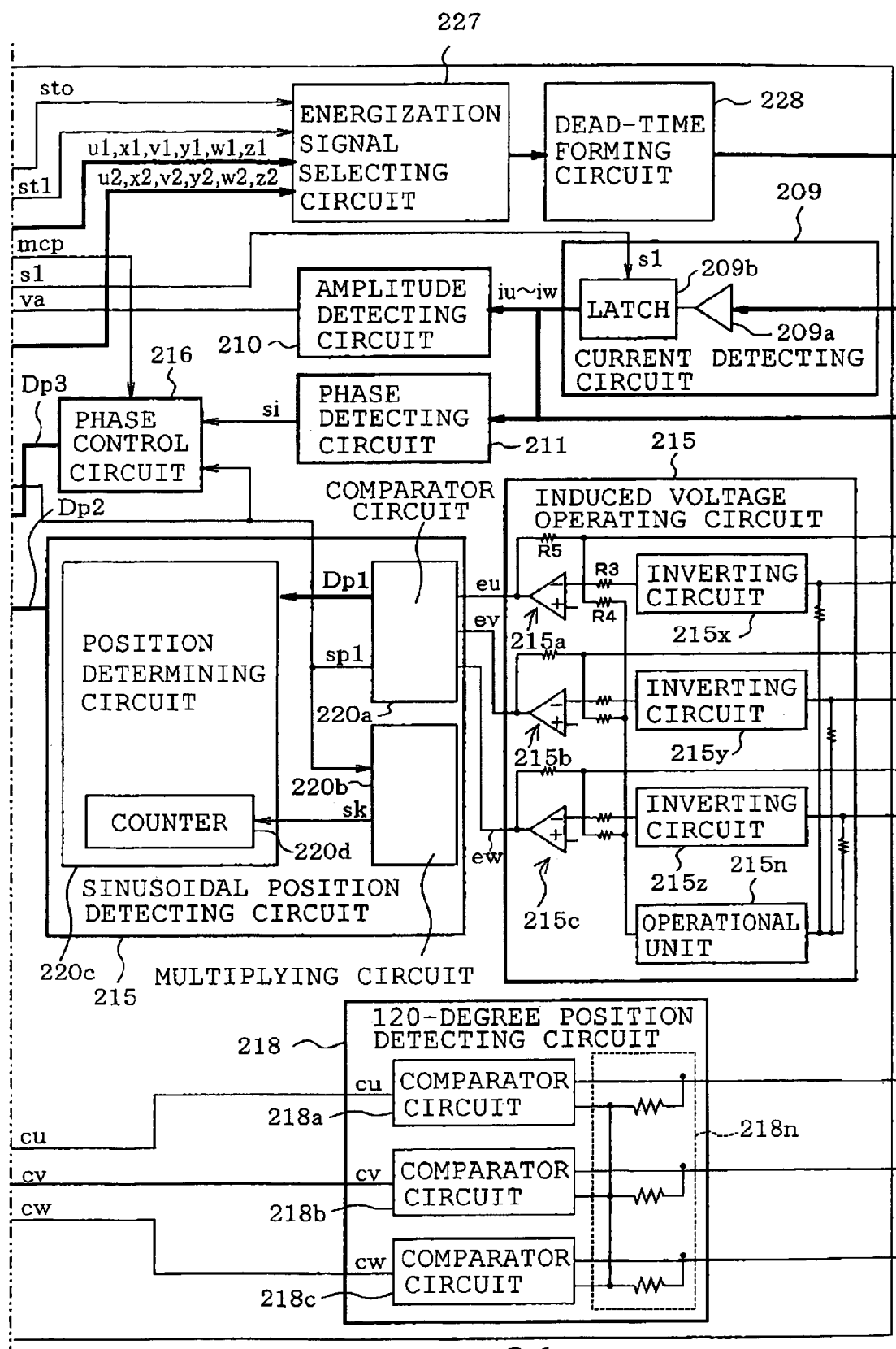
Figure 31C:
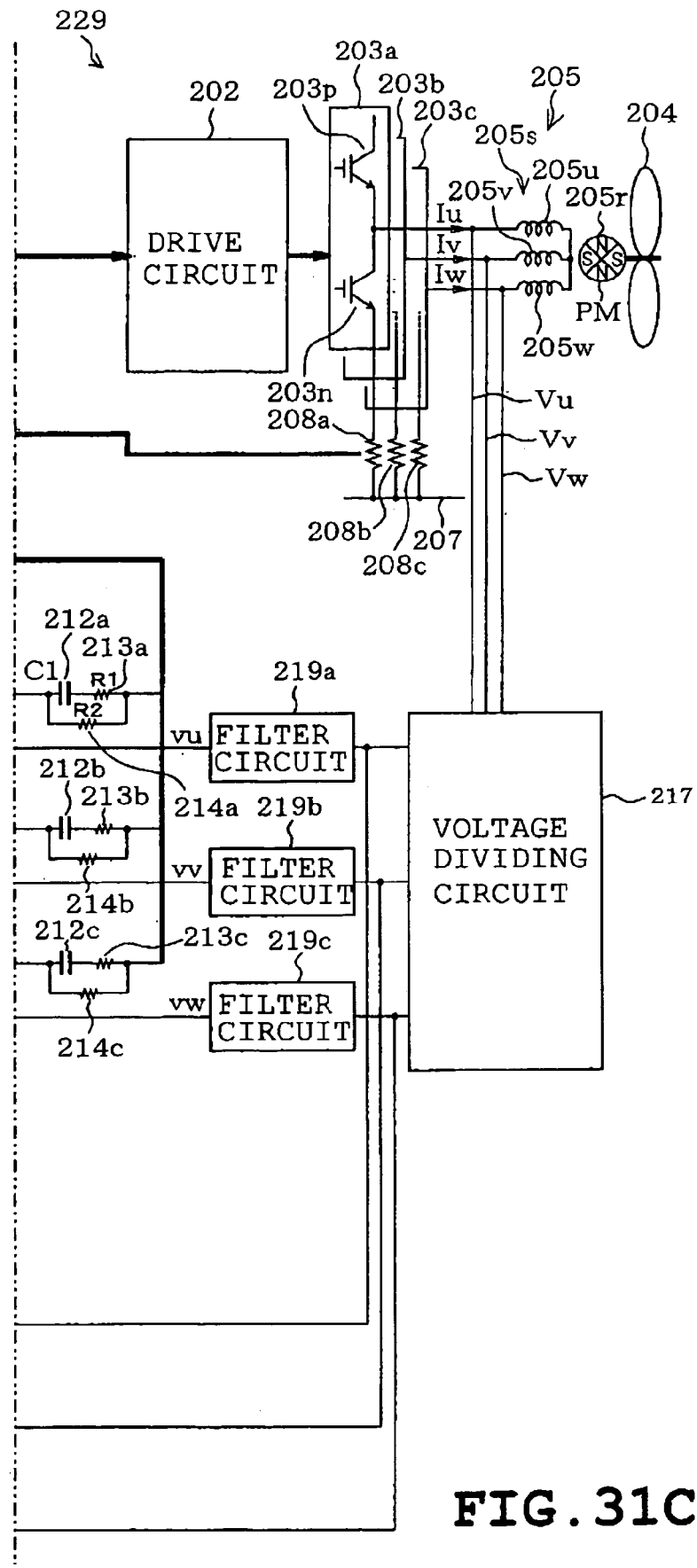

Based on the current signals iu, iv and iw, inverting signals of the voltage signals vu, vv and vw and non-inverting signal vn corresponding to the imaginary neutral-point voltage, the adding circuits 215a, 215b and 215c carry out the following operation using equations (5) and (6):

$$eu = -R5 \cdot C1 \cdot diu/dt - (R5/R2)iu + (R5/R3)vu - (R5/R4)vn \quad (5)$$

$$vn = (vu + vv + vw)/3 \quad (6)$$

where R2 to R5 are resistance values of each element and C1 is a capacity value of each element as shown in FIG. 31B. Equation (5) is similar to equation (2) in the first illustrative example. The same equations are obtained regarding each of phases V and W.

As obvious from comparison of an equivalent circuit of motor 205 as shown in FIG. 9 with equation (5), a first term of the right side of the equation (5) corresponds to voltage L·dIu/dt of inductance L, a second term corresponds to voltage R·Iu of winding 205u, a third term corresponds to terminal voltage Vu, and a fourth term corresponds to the neutral-point voltage Vn. Accordingly, the induced voltage signals eu, ev and ew can be obtained by operation when the resistance values R2 to R5 and the capacity value C1 of the capacitor 212 are set so as to correspond to a resistance value R of the used motor winding and inductance L. Further, the resistors 213a to 213c and 214a to 214c and the capacitors 212a to 212c are provided outside the control circuit 206 as described above. The reason for this is that the resistance values R1 and R2 and capacity value C1 can be adjusted according to a motor constant.

The sinusoidal wave position detecting circuit 220 produces position data Dp2 indicative of rotational position of the rotor 205r based on the induced voltage signals eu, ev and ew. The counter 220d of the position determining circuit 220c counts the multiplying signal sk and resets the count when each change-point is reached in six position data composing the position data Dp1. The following data corresponds to each change-point and serves as reference data:

ew≧eu≧ev⇒Reference data "16" when ew≧eu≧ev eu≧ew≧ev⇒Reference data "48" when eu≧ew≧ev eu≧ev≧ew⇒Reference data "80" when eu≧ev≧ew ev≧eu≧ew⇒Reference data "112" when ev≧eu≧ew ev≧ew≧eu⇒Reference data "144" when ev≧ew≧eu ew≧ev≧eu⇒Reference data "176" when ew≧ev≧eu The phase control circuit 216 determines phase data Dp3 from correlation between the current phase signal si and the rotation signal sp1. More specifically, phase data Dp3 is increased when the current phase signal si lags behind the rotation signal sp1. On the other hand, the phase data Dp3 is decreased when the current phase signal si leads the rotation signal sp1. The phase data Dp3 is maintained when both signals correspond to each other. FIG. 32 shows a case where phase data Dp3 is positive.

The aforementioned position data Dp2 and the phase data Dp3 are added to each other by the adding circuit 221a thereby to be made into energization angle data Dp4. On the other hand, the voltage control circuit 223 carries out the proportional control with respect to the magnitude of voltage applied to the motor 205, delivering the output voltage signal vo which is necessitated so that the applied voltage corresponds to the voltage command vc. The voltage-dividing circuit 221b produces 96-resolution cosine data according to the output voltage signal vo. The following relationship of equation (7) holds between the resolution (=96 bit) of the cosine data and the resolution 6n (=192 bit) of the energization angle data Dp4:

$$\text{The resolution of cosine data} = 6n/m \quad (2)$$

where m=2.

Each of switch circuits 221u, 221v and 221w selects cosine data corresponding to the energization angle data Dp4. Consequently, three-phase sinusoidal signals su, sv and sw having a 120-degree phase difference from one another are produced.

As a result, the amplitude is controlled by the voltage control circuit 223, and the three-phase sinusoidal signals su, sv and sw with respective phases controlled by the phase control circuit 216. First energization signals u1, v1, w1, x1, y1 and z1 converted to PWM signals by the PWM circuit 221c are delivered to the energization signal selecting circuit 227.

Next, the operation with respect to formation of the second energization signals will now be described with the timing charts of FIGS. 33A to 33E. FIGS. 33A to 33E show voltages Vu, Vv, Vw, Vn, position signals cu, cv and cw, position data Dp5, counts of the counters 222b and 222c, and signals so1 to so6, respectively.

The comparing circuits 218a, 218b and 218c compare voltages Vu, Vv and Vw with neutral point voltage Vn, thereby producing position signals cu, cv and cw. Reflow diodes (not shown) connected in parallel to the IGBT's 203p and 203n of the switching circuits 203a, 203b and 203c are temporally turned on during commutation in the case of 120-degree energization. With this, narrow pulses appear so as to be superimposed on the position signals cu, cv and cw. The waveform shaping circuit 222a shapes the waveforms of the position signals cu, cv and cw in order to eliminate the narrow pulses, thereby producing 6-resolution position data Dp5.

The counter 222b of the timing circuit 222x repeatedly counts up clocks with a predetermined frequency with a change-point of the position data Dp5 serving as a reference point. The counter 222c obtains the count of the counter 222b at the change-point of the position data Dp5, thereby counting down clocks with a predetermined frequency.

The timing circuit 222x produces signals so1 to so6 changing in synchronization with reach of the count of the counter 222c to zero. The PWM circuit 222d delivers energization signals u2, v2, w2, x2, y2 and z2 obtained by converting the signals so1 to so6 to PWM signals. Since the PWM signal sa supplied to the PWM circuit 222d is composed of the output voltage signal vo and the triangular wave signal ss, duty ratios of the energization signals u2, v2, w2, x2, y2 and z2 are controlled by the voltage control circuit 223.

Next, the operation of the sequence control circuit 226 will be described. Externally supplied operation command signals Mode 1, Mode 2 and Mode 3 represent the following command contents in combination:

(Mode 1, Mode 2, Mode 3)=(0, 0, 0): "stop, output off"

(Mode 1, Mode 2, Mode 3)=(1, 0, 0): "output off and detection of rotation"

(Mode 1, Mode 2, Mode 3)=(1, 0, 1): "start-up from stop"

(Mode 1, Mode 2, Mode 3)=(1, 1, 0): "start-up from normal rotation"

(Mode 1, Mode 2, Mode 3)=(1, 1, 1): "start-up from reverse rotation"

In the case of "stop, output off," the sequence control circuit 226 turns OFF the selection signal sto to be delivered to the energization signal selecting circuit 227. As a result, the energization signal selecting circuit 227 selects "OFF" as an energization signal, whereby the gate drive circuit 202 is turned off such that energization to the motor is not carried out. Furthermore, an on-off signal mcp to be delivered to the phase control circuit 216 is also set to OFF. A direction signal mcw, a position signal mci and forced commutation signal mcf all to be delivered to the 120-degree energization signal forming circuit 222 are also set to OFF.

In the case of "output off and detection of rotation," the sequence control circuit 226 controls the rotation determining circuit 226a so that an OFF signal is delivered to each processing, and the rotation signal forming circuit 226x is turned on. The rotation signal forming circuit 226x selects the rotation signal sp3 and externally delivers the selected rotation signal sp3 as a rotation signal rot1 and a rotational direction signal sh as a rotational direction signal rot2. As a result, rotation or non-rotation and rotational direction are transmitted to an external microcomputer, for example. The external microcomputer supplies corresponding operation command signals Mode 1, Mode 2 and Mode 3.

Figure 34:
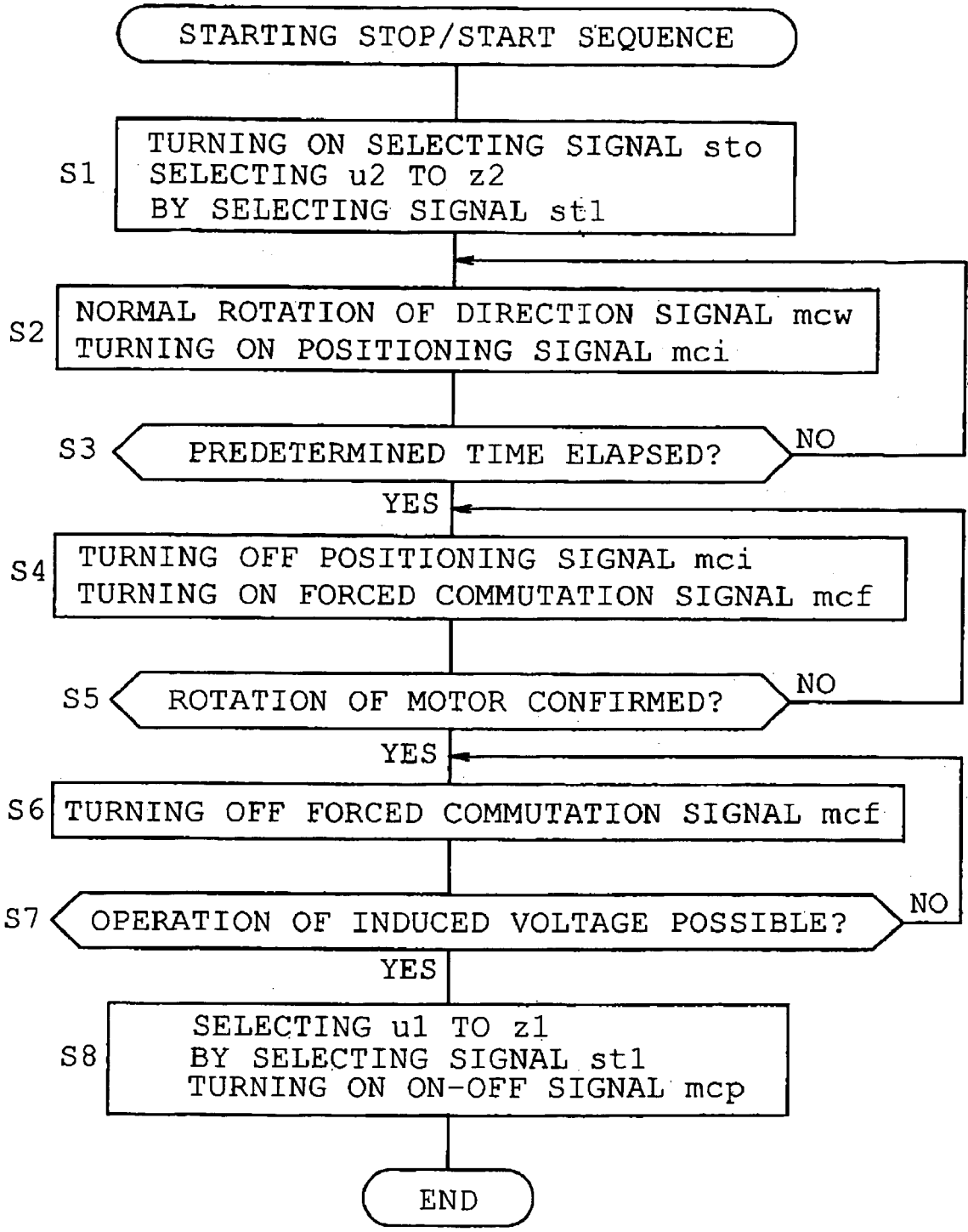
FIG. 34 is a flowchart showing a stop-start-up sequence.

FIG. 34 is a flowchart showing a sequence of starting the motor 205 in a stopped state. In the case of "start-up from stop," the sequence control circuit 226 turns the selection signal sto to be delivered to the energization signal selecting circuit 227 ON by the operation of the stop-start sequence circuit 226b and selects the energization signals u2, v2, w2, x2, y2 and z2 as the selection signal st1, that is, the second energization signal (step S1).

Furthermore, the direction signal mcw to be delivered to the 120-degree energization signal forming circuit 222 is set to "NORMAL ROTATION" and the positioning signal mci is set to "ON" (step S2). As a result, the 120-degree energization signal forming circuit 222 turns off clocks of the counters 222b and 222c and continues to deliver the energization signals u2, v2, w2, x2, y2 and z2 for energization to a predetermined phase winding of the motor 205. Consequently, energization to the motor 205 is carried out for positioning without commutation.

Subsequently, the stop-start sequence circuit 226b executes determination processing at step S3 and is on standby until a predetermined time period for the positioning elapses. Upon lapse of the predetermined time period, the stop-start sequence circuit 226b sets the positioning signal mci to "OFF" and forced commutation signal mcf to "ON" (step S4). As a result, the 120-degree energization signal forming circuit 222 turns on clocks of the counters 222b and 222c to produce energization signals u2, v2, w2, x2, y2 and z2 commutating at intervals of predetermined period. Consequently, the motor 205 is energized in a forced commutation state thereby to be rotated.

When monitoring the rotation signal sp3 to confirm rotation of the motor 205 (step S5), the stop-start sequence circuit 226b sets the forced commutation signal mcf to "OFF" (step S6). As a result, energization is carried out in the relationship shown in FIGS. 33A-33E so as to correspond to the position data Dp5, whereby the motor 205 is accelerated.

The stop-start sequence circuit 226b monitors the rotation signal sp1 to determine whether the rotational speed has reached a value at which the operation is executable by the induced voltage computing circuit 215 (step S7). When determining in the affirmative (YES), the stop-start sequence circuit 226b selects the energization signals u1, v1, w1, x1, y1 and z1 as the selection signal st1, that is, the first energization signal (step S8). Consequently, sinusoidal energization initiates as shown in the timing charts of FIG. 32 and control of the energized phase is carried out.

Figure 35:
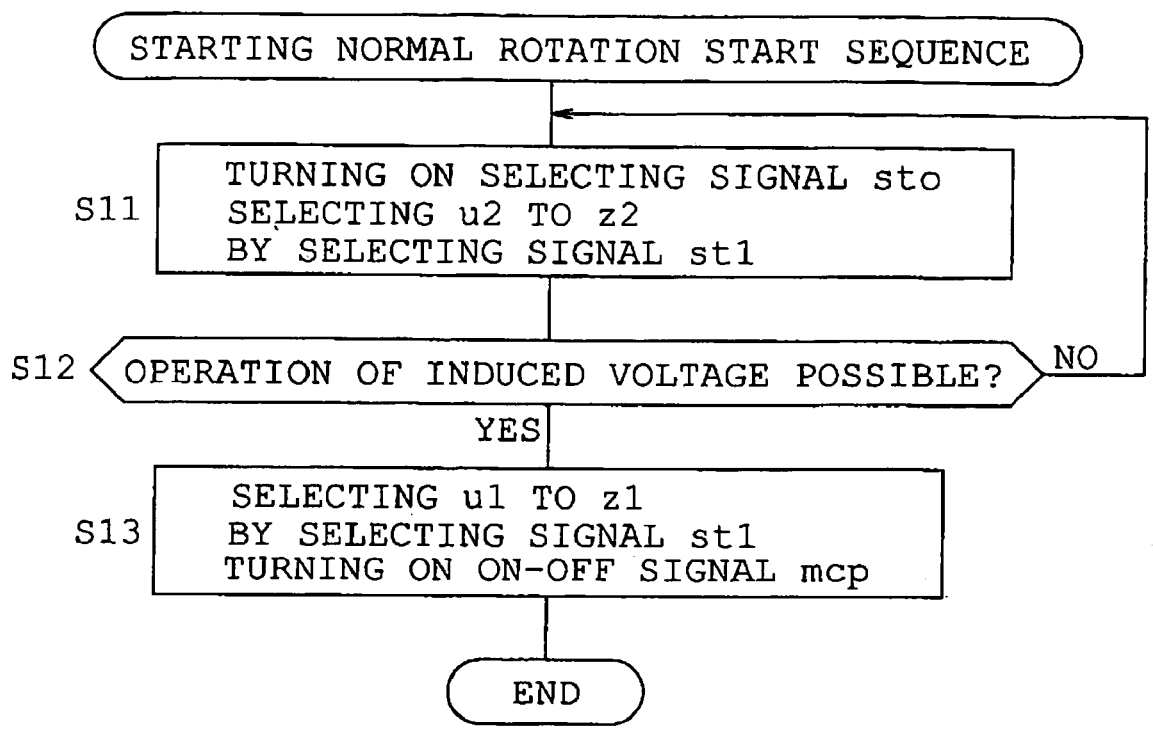
FIG. 35 is a flowchart showing a start-up sequence under normal rotation.

FIG. 35 is a flowchart showing the starting sequence in which the motor 205 under rotation in the normal direction in subjection to external wind against the fan 204 is started up. In the case of "start-up from normal rotation," the sequence control circuit 226 sets the selection signal sto to be delivered to the selecting circuit 227 to "ON", that is, selects the second energization signal as the selection signal st1 (step S11).

Successively, the sequence control circuit 226 monitors the rotation signal sp1 to determine whether the rotational speed has reached a value at which the operation is executable by the induced voltage computing circuit 215 (step S12). When determining in the affirmative (YES), the stop-start sequence circuit 226b selects the first energization signal as the selection signal st1 and the on-off signal mcp to be delivered to the phase control circuit 216 is set to "ON" (step S13). On the other hand, when determining in the negative (NO), the stop-start sequence circuit 226b selects the second energization signal as the selection signal st1. As a result, the motor 205 under rotation in the normal direction in subjection to external wind or the like can be started.

Figure 36:
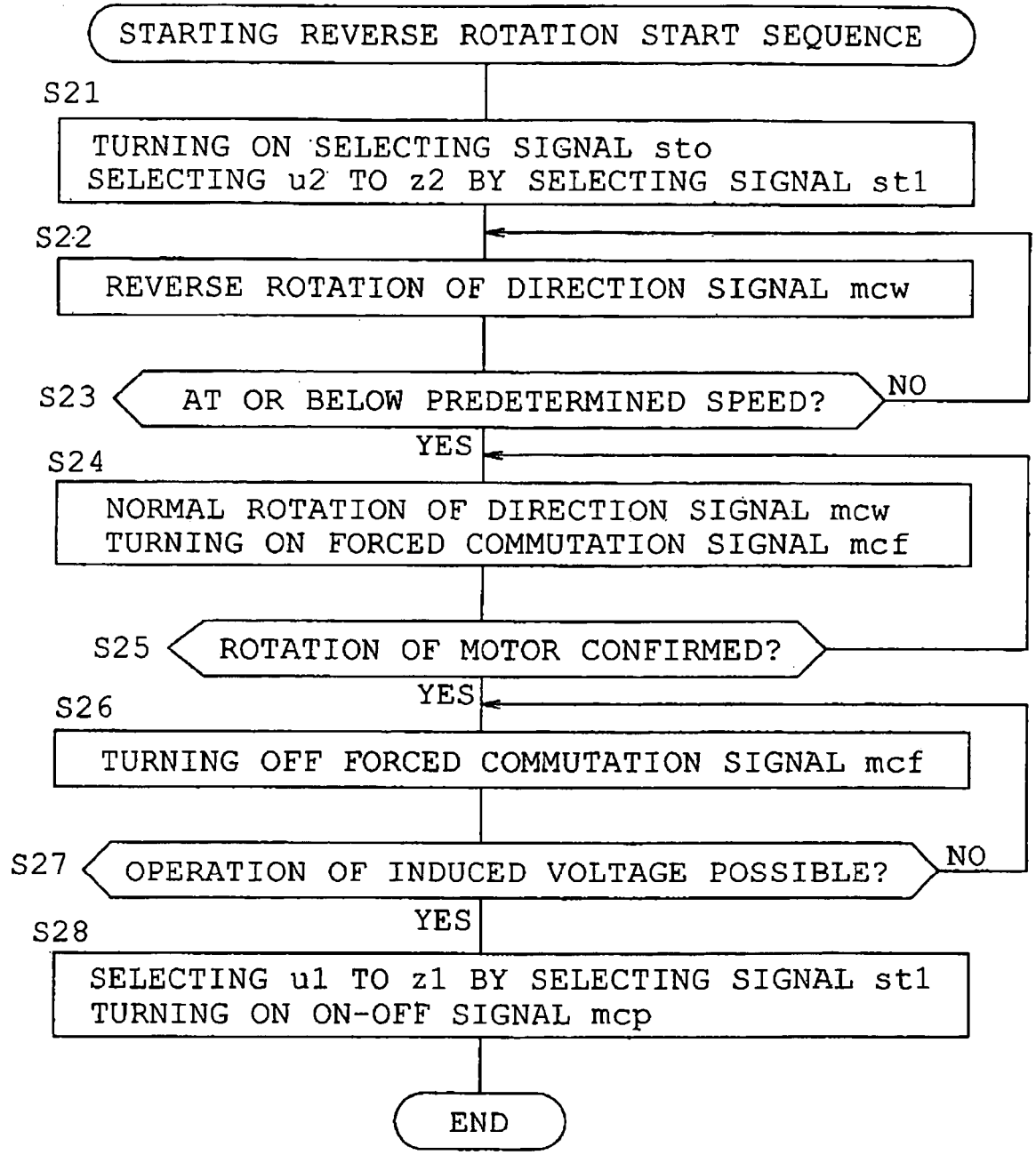
FIG. 36 is a flowchart showing a start-up sequence under reverse rotation.

FIG. 36 is a flowchart showing the starting sequence in which the motor 205 under rotation in the reverse direction in subjection to external wind against the fan 204 is started up in the normal direction. In the case of "start-up from reverse rotation," the sequence control circuit 226 sets the selection signal sto to be delivered to the selecting circuit 227 to "ON", that is, selects the second energization signal as the selection signal st1 (step S21). Furthermore, the direction signal mcw to be delivered to the 120-degree energization signal forming circuit 222 is set to "REVERSE ROTATION" (step S22). As a result, the 120-degree energization signal forming circuit 222 changes upper and lower energization signals upside down in each phase, whereupon energization is carried out in the reverse direction. Consequently, the motor 205 is decelerated since brake torque is generated in the motor 205.

The reverse rotation start sequence circuit 226d monitors the rotation signal sp3 and determines whether the motor 205 has been decelerated to such a rotational speed that cannot be detected by the 120-degree position detecting circuit 218 (step S23). When determining in the affirmative (YES), the reverse rotation start sequence circuit 226d sets the direction signal mcw to "NORMAL ROTATION" and the forced commutation signal mcf to "ON" (step S24). Successively, when further monitoring the rotation signal sp3 and confirming rotation of the motor 205 (step S25), the reverse rotation start sequence circuit 226d sets the forced commutation signal mcf to "OFF" (step S26). As a result, the motor 205 starts to rotate in the normal direction as in the start-up from the stopped state. Subsequent steps S27 and S28 are the same as the steps S7 and S8 in the starting sequence from the stopped state respectively. Finally, the phase-controlled sinusoidal energization is carried out.

The rotation determining circuit 226a forms the rotation signal sp1 when the first energization signal is selected and the rotation signal rot1 from the rotation signal sp3 when the second energization signal is selected, delivering the formed signals externally.

According to the above-described arrangement, the induced voltage signals eu, ev and ew obtained in compliance with the phase voltage equation are compared with one another so that 6-resolution position data Dp1 is detected. 192-resolution (multiplication by 32) position data Dp2 is obtained from the multiplying signal sk of the position data Dp1 (actually, rotational signal sp1) and position data Dp1, whereby the energization signals u1, v1, w1, x1, y1 and z1 are generated. AS a result, sinusoidal wave drive with high resolution according to the multiplying number can be realized. Furthermore, the number of comparators constituting the comparator further constituting the comparing circuit 220a can be reduced such that the arrangement can be simplified and produced at lower costs.

In this case, the phase data Dp3 which is a phase command is obtained from the current phase signal si further obtained by comparison of the current signals iu, iv and iw with one another and the rotation signal sp1 obtained by comparison of the induced voltage signals eu, ev and ew. Since the position data Dp2 is compensated by the obtained phase data Dp3, the rotational position of the rotor 205r and current phase are automatically adjusted. Consequently, the driving efficiency of the motor 205 can be improved.

When the rotational speed of the motor 205 is low, the position data Dp2 cannot be obtained since the induced voltage signals eu, ev and ew cannot be computed accurately. On the other hand, the 120-degree position detecting circuit 218 can detect the position signals cu, cv and cw even when the rotational speed is extremely low and accordingly the induced voltage is extremely small. In the foregoing embodiment, the energization signals u2, v2, w2, x2, y2 and z2 which are based on the position data Dp5 are selected in the extremely low speed range where the induced voltage signals eu, ev and ew cannot be computed accurately. The energization signals u1, v1, w1, x1, y1 and w1 which are based on the position data Dp2 are selected in a speed range where the induced voltage signals eu, ev and ew can be computed accurately. As a result, the sensorless drive can be carried out in a wide rotational speed range from the extremely low speed to the extremely high speed. Furthermore, the sinusoidal drive is carried out in a middle and high speed range in which vibration or oscillation and noise of the motor 205 constitute the problem. Consequently, the vibration or oscillation and noise can be reduced.

The fan 204 sometimes rotates in the reverse direction in subjection to external wind when the motor 205 is in the stopped state or output power to the motor 205 is OFF. However, since the sequence control circuit 226 is provided with the reverse rotation start sequence circuit 226d, the motor 205 can be started in the normal direction even while the motor is in rotation in the reverse direction.

The above-described example may be modified or expanded as follows. The 120-degree position detecting circuit 218, 120-degree energization signal forming circuit 222, PWM circuit 225 and energization signal selecting circuit 227 may be eliminated in the control circuit 206. A start-up control circuit may be provided for energization by forced commutation. Furthermore, the phase detecting circuit 211, phase control circuit 216 and adding circuit 221a may be eliminated from the control circuit 206.

The voltage-dividing circuit 221b comprises the ladder resistor which delivers the cosine value of 180-degree sinusoidal wave with the precision of 96-resolution. However, waveform data obtained by binary phase shift keying may be delivered with a predetermined resolution, instead of the sinusoidal wave. In this arrangement, output voltage applied to the motor 205 can be increased, whereupon the motor 205 can be driven to a higher rotational speed. Furthermore, when m=1 or m=4 in equation (7), the resolution of cosine data may be 192-bit or 48-resolution. Still furthermore, 6n-resolution of position data Dp2 (energization angle data Dp4) may be changed within a range of n (multiplying number)=2, 3, 4 . . . .

An actual neutral-point voltage Vn of the motor 205 may be supplied to the induced voltage computing circuit 215, instead of the non-inverting voltage (imaginary neutral-point voltage) vn made by the computing unit 215n, as in the second example. In this case, the fourth term of equation (5) becomes $-(R5/R4)Vn$.

As in the third example, the signals su, sv and sw delivered by the respective switch circuits 221u, 221v and 221w may be supplied to the induced voltage computing circuit 215, instead of the voltage signals vu, vv and vw. In this case, (R5/R3) and (R5/R4) as shown in FIG. 31 and equation (5) are set so as to be equal to $(1/\alpha)$ when symbol $\alpha$ designates an amplitude ratio of input voltage (signal su) of the switching circuit 203a to the output voltage Vu of the switching circuit 203a.

Although the current signals iu, iv and iw are directly detected in the current detecting circuit 209, two phase winding currents may be detected and the other phase winding current may be computed from the detected current signals, instead.

Although the induced voltage signals eu, ev and ew are directly obtained in the induced voltage computing circuit 215, two phase induced voltage signals may be computed and the other phase signal may be obtained from the two induced voltage signals, instead.

Although the signals su, sv and sw are directly produced in the three switch circuits 221u, 221v and 221w respectively, two phase signals may be computed and the other phase signal may be obtained from the two signals.

A leading phase control may be carried out in which leading phase is established as a rotational speed of the motor 205 is increased.

Although the drive control device for the three-phase permanent magnet motor is described, the drive control device may be applied to a permanent magnet motor of a plurality of phases other than three phases. Furthermore, the drive control device should not be limited to the application to the fan motor but may be applied to household appliance, information appliance or the like.

Figure 37:
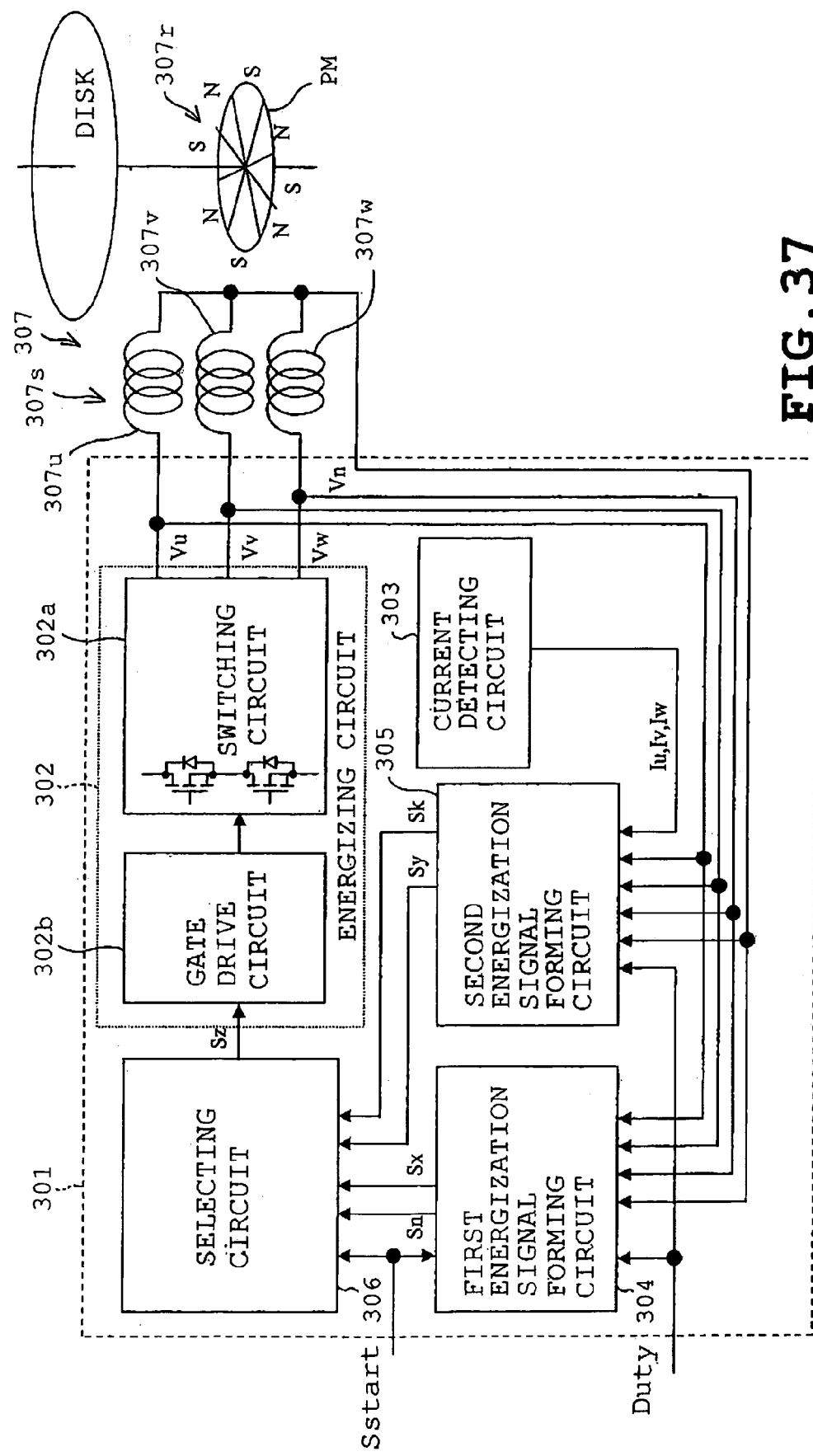
FIG. 37 is a view similar to FIG. 1, showing a ninth illustrative example of the invention.

FIGS. 37 to 41 illustrate a ninth embodiment. FIG. 37 is a block diagram showing an overall arrangement of the motor control device 301. The energizing circuit 302 comprises an inverter. More specifically, the energizing circuit 302 comprises a switching circuit 302a with three arms and a gate drive circuit 302b. The switching circuit 302a includes two field effect transistors (FET's) serially connected between, for example, an externally supplied 12-V power supply $V_{cc}$ and ground (GND). The switching circuit 302a delivers neutral-point voltage as output voltages Vu, Vv and Vw. The gate drive circuit 302b supplies an energization signal to each of gates of the FET'S.

A brushless motor 307 is a spindle motor which rotates a recording medium or disc in a disc storage device. The brushless motor 307 is also a permanent magnet motor comprising a rotor 307r with permanent magnets PM and a stator 307s with three-phase windings 307u, 307v and 307w. The energizing circuit 302 has three-phase terminals connected to the windings 307u, 307v and 307w respectively. A neutral point of the windings 307u, 307v and 307w is connected to an input terminal of the motor control device 301. Neutral-point voltage Vn and the output voltages Vu, Vv and Vw are supplied to first and second energization signal forming circuits 304 and 305.

To a current detecting circuit 303 is supplied voltage between both ends of either shunt resistor between the energizing circuit 302 and windings 307u, 307v and 307w or the FET's of the switching circuit 302a or shunt resistor connected in series to the FET's. The current detecting circuit 303 delivers, to a second energization signal forming circuit 305, signals Iu, Iv and Iw proportional to currents flowing into the windings 307u, 307v and 307w respectively. When the voltage between both ends of the negative FET or between both ends of the shunt resistor connected in series to the FET is supplied, input voltage is amplified and sampled and held in synchronization with turn-on of the negative FET.

A voltage command Duty and a start signal $S_{start}$ are supplied to the first energization signal forming circuit 304. The first energization signal forming circuit 304 delivers a first energization signal Sx and a rotational speed signal Sn to a selecting circuit 306. The voltage command Duty is supplied to the second energization signal forming circuit 305, which then delivers a second energization signal Sy and a stabilization signal Sk to the selecting circuit 306. The start signal $S_{start}$ is also supplied to the selecting circuit 306. The selecting circuit 306 delivers an energization signal Sz to the energizing circuit 302. The motor control device 301 is arranged as described above.

Figure 38:
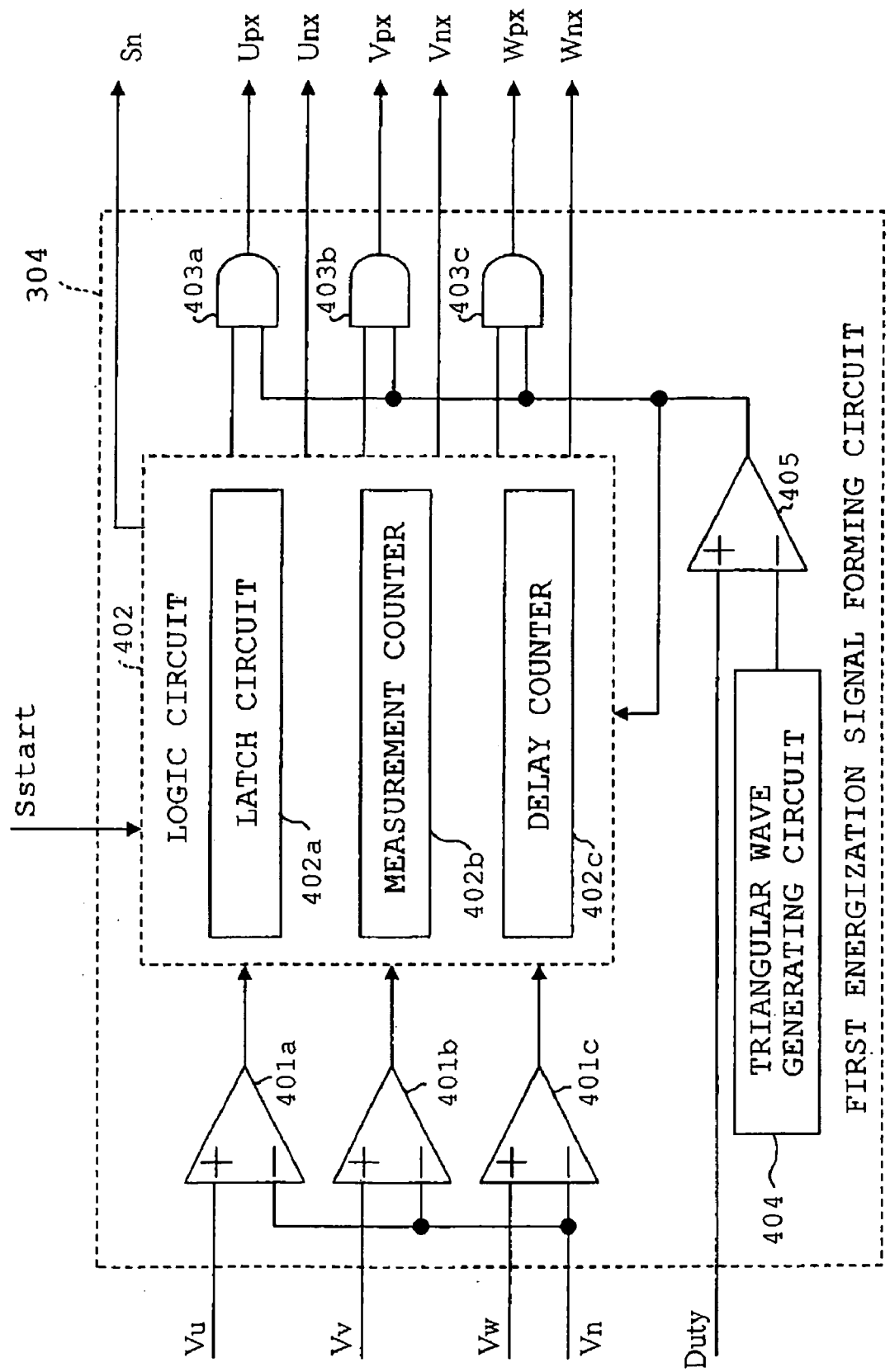
FIG. 38 is a block diagram of the first energization signal forming circuit.

FIG. 38 shows an arrangement of the first energization signal forming circuit 304. Comparators 401a, 401b and 401c have non-inverting input terminals to which output voltages Vu, Vv and Vw are applied respectively. The comparators 401a, 401b and 401c also have inverting input terminals to which the neutral-point voltage Vn is applied in common. The comparators 401a, 401b and 401c further have output terminals connected to a logic circuit 402. The logic circuit 402 comprises a latch circuit 402a, a measuring counter 402b and a delay counter 402c.

A comparator 405 has a non-inverting input terminal to which the voltage command $D_{uty}$ is supplied. The comparator 405 further has an inverting input terminal to which a triangular wave signal (carrier wave signal) delivered by a triangular wave generating circuit 404 is supplied. The comparator 405 delivers an output signal which is supplied to the logic circuit 402 and AND circuits 403a, 403b and 403c. The start signal $S_{start}$ is supplied to the logic circuit 402, which then delivers the rotational speed signal Sn and signals Upx, Unx, Vpx, Vnx, Wpx and Wnx all serving as a first energization signal Sx. The signals Upx, Vpx and Wpx corresponding to the negative side are delivered via the AND circuits 403a, 403b and 403c respectively.

Figure 39B:
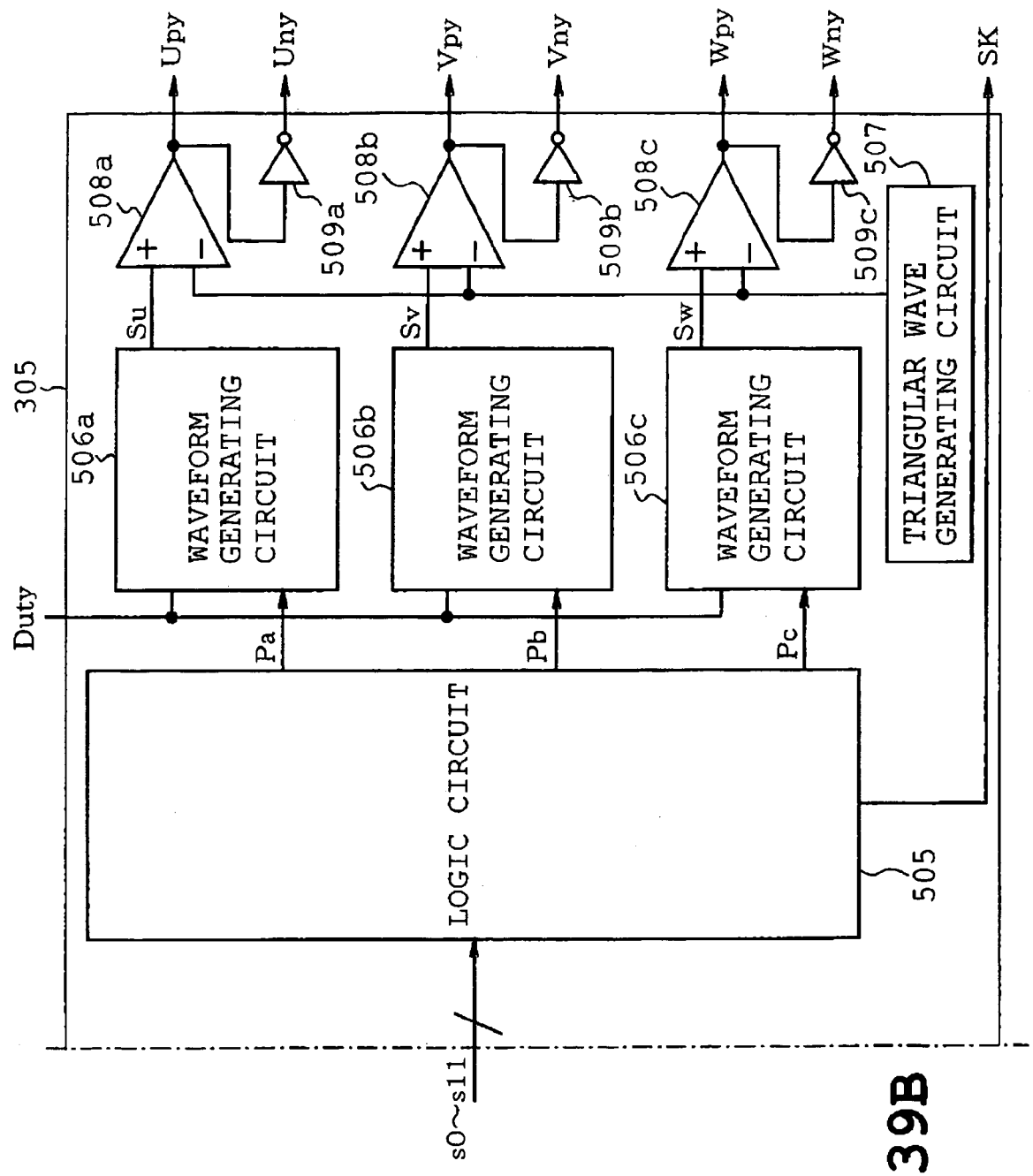

FIGS. 39A and 39B show an arrangement of the second energization signal forming circuit 305. The output voltage Vu and current signal Iu are supplied via a filter circuit 501a to a phase U computing circuit 502a. The neutral-point voltage Vn is supplied via a filter circuit 501d to the phase U computing circuit 502a. The phase U computing circuit 502a then delivers an induced voltage signal eu to a comparing circuit 504. Filter circuits 501b and 501c, computing circuits 502b and 502c and voltage-dividing circuits 503b and 503c in the respective phases V and W are arranged in the same manner as those of phase U.

Six signals delivered by the computing circuits 502a, 502b and 502c are supplied to the comparing circuit 504. A reference potential Vr set at one half of the power supply voltage, for example, is also supplied to the comparing circuit 504. The comparing circuit 504 then delivers twelve signals s0 to s11. The comparing circuit 504 delivers the signals s0 to s11 to a logic circuit 505. Based on the signals s0-s11, the logic circuit 505 generates energized phase signals Pa, Pb and Pc, which are supplied to a waveform generating circuits 506a, 506b and 506c respectively. The voltage command $D_{uty}$ is supplied to the waveform generating circuits 506a, 506b and 506c, which deliver respective phase waveform signals Su, Sv and Sw.

The phase waveform signals Su, Sv and Sw are supplied to the non-inverting input terminals of the comparators 508a, 508b and 508c respectively. The triangular wave signals (carrier signals) delivered by a triangular wave generating circuit 507 are supplied to the inverting input terminals of the comparators 508a, 508b and 508c respectively. The comparators 508a, 508b and 508c deliver signals Upy, Vpy and Wpy serving as a second energization signal. The signals Upy, Vpy and Wpy are directly delivered and also via inverting circuits 509a, 509b and 509c so as to serve as signals Uny, Vny and Wny, respectively.

Figure 40:
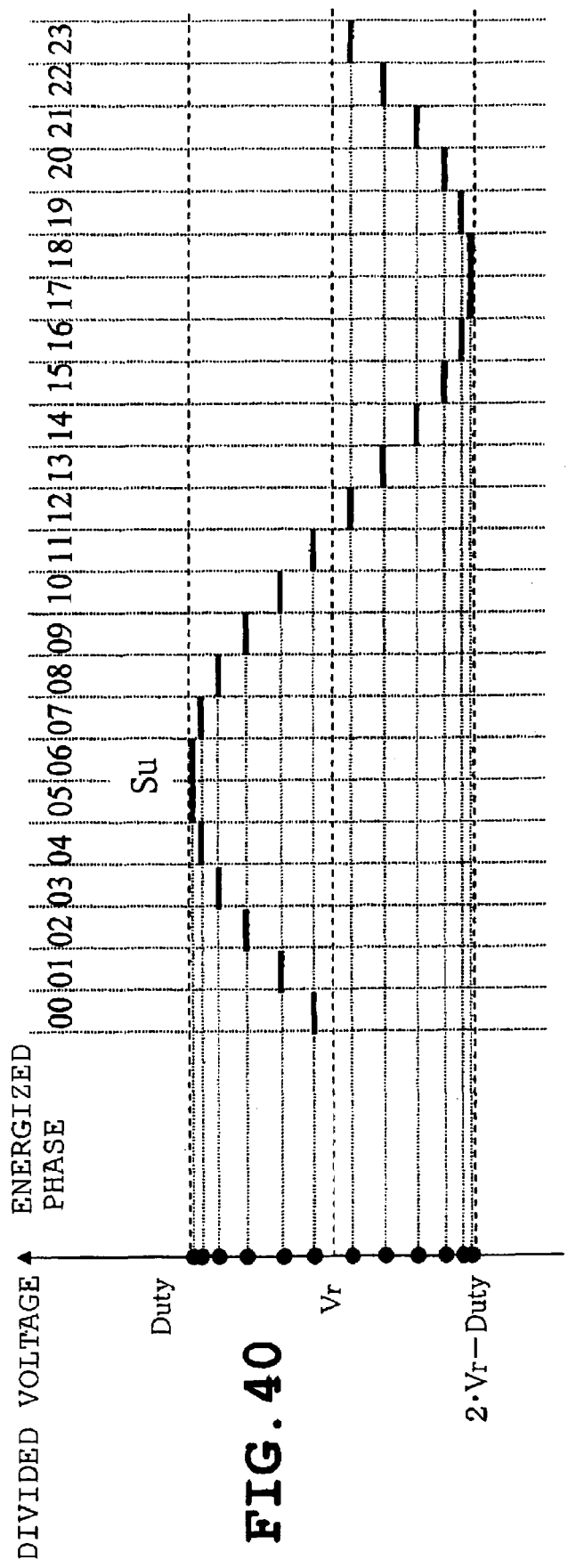
FIG. 40 is a graph showing the relationship among divided voltage in a waveform shaping circuit, energization phase and generated waveform signal.

Next, the operation of the second energization signal forming circuit 305 will be described with reference to FIG. 40 as well as FIGS. 39A and 39B. The output voltages Vu, Vv and Vw with PWM waveform and neutral-point voltage Vn are integrated, for example, by filter circuits 501a, 501b, 501c and 501d to be supplied to computing circuits 502a, 502b and 502c of respective phases. Each filter circuit comprises a resistor and a capacitor. The computing circuit 502a includes resistors Ra, Rb and Rc all of which has the same resistance value and are connected to an operational amplifier AMP1. The operational amplifier AMP1 delivers the difference between the output voltage Vu and the neutral-point voltage Vn on the basis of the reference potential Vr. More specifically, output of the operational amplifier AMP1 is expressed by the following equation (8):

$$VAMP1=-(Vu-Vn)+Vr \quad (8)$$

Furthermore, output of an operational amplifier AMP2 is expressed by the following equation (9) using circuit constants as shown in FIG. 39A:

$$VAMP2=(R3/R1)(Vu-Vn)-R3\cdot C1\cdot dIu/dt-(R3/R2)Iu+Vr \quad (9)$$

Assume that the term, $R3\cdot C1$ takes a value obtained by multiplying inductance L of one phase of the motor 307 by an inverse number of magnification of the current detecting circuit 303. Also assume that the term, (R3/R2) takes a value obtained by multiplying inductance R of one phase of the motor 307 by an inverse number of magnification of the current detecting circuit 303. Further assume that the term, (R3/R1) is set at 1. Then, output (=Eu) of the operational amplifier AMP2 is expressed by the following equation (10) (phase voltage equation):

$$Eu=Vu-Vn-L\cdot dIu/dt-R\cdot Iu+Vr \quad (10)$$

When being collated with an equivalent circuit (see FIG. 9) of the motor 307, the equation corresponds with the induced voltage Eu. This is also applied to the other phases. The induced voltages Eu, Ev and Ew of the motor 307 are delivered as induced voltage signals eu, ev and ew on the basis of the reference potential Vr. A resistor R4 is provided for preventing oscillation.

The signals s0-s11 delivered by the comparing circuit 504 are the same as shown in the previous example in FIG. 11. When the induced voltage signals eu, ev and ew are sinusoidal signals, one period is divided by the signals s0-s11 into twenty-four regions. The signals s0-s11 are obtained by the following results of comparison of input signals:

TABLE 1

| Compared signal | Comparison |
| --- | --- |
| s0 | eu > ew |
| s1 | ev > eu |
| s2 | ew > ev |
| s3 | eu > Vr |
| s4 | ev > Vr |
| s5 | ew > Vr |
| s6 | eu > ew' |
| s7 | ev > eu' |
| s8 | ew > ev' |
| s9 | eu > ev' |
| s10 | ev > ew' |
| s11 | ew > eu' | where eu', ev' and ew' designate divided 0.366-fold induced voltage signals respectively.

An electrical period is divided by high level and low level of each of the signals s0-s11 into two parts. Since the signals s0-s11 have output timings different from one another, one electrical period is divided by combination of high level and low level into twenty-four parts each of which has 15 degrees (rotation positions "00" to "23").

A division ratio of the voltage dividing circuits 503a, 503b and 503c is set at 0.366 in order that the aforementioned signals s0-s11 may be obtained. As described in the first example, when m designates the division ratio, a phase angle holding the relationship of eu=eu' is eu=15°, eu'=45°. Then, determination is made as follows:

$$m\cdot \sin 45°=\sin 15°$$

$$m=\sin 15°/\sin 45°=0.366 \quad (11)$$

A waveform shaping circuit (506a, 506b and 506c) is similar to the arrangement as shown in FIG. 8. In this example, however, the voltage signal sV corresponds to the voltage command $D_{uty}$ and the energization signals vru, vrv and vrw correspond to waveform signals Su, Sv and Sw respectively. FIG. 40 shows the relationship among the divided voltages generated by a divider circuit 94, energized phase and generated waveform signal Su. Three-phase substantially sinusoidal waveform signals Su, Sv and Sw are compared by the comparators 508a-508c with a triangular waveform delivered by the triangular wave generating circuit 507 thereby to be generated into a PWM signal (signals Upy, Vpy, Wpy, Uny, Vny and Wny).

The operation of the motor control device will now be described with reference to FIGS. 41A-41E as well as FIGS. 39A, 39B and 40. When the start signal $S_{start}$ is inactive (stop), the selecting circuit 306 delivers, as the energization signal Sx, signals which turn off six FET's constituting the switching circuit 302a. When the start signal $S_{start}$ is rendered active (start), the selecting circuit 306 selects and delivers the first energization signal Sx as the energization signal Sz. The first energization signal forming circuit 304 initiates its operation upon receipt of the start signal $S_{start}$. The measuring counter 402b and the delay counter 402c are operated in a predetermined period as shown in FIGS. 41A and 41B.

The logic circuit 402 generates 120-degree energization waveform upon receipt of a timing signal formed by the delay counter 402c. Of the generated signals, the signal corresponding to an on-off signal of the positive FET in the switching circuit 302a is synthesized with the PWM signal delivered by the comparator 405 in the AND circuits 403a, 403b and 403c thereby to be formed into a PWM waveform as shown in FIG. 41C. By the above-described operation, energization is carried out at a predetermined frequency (1 Hz, for example) in a predetermined sequence of phases according to a PWM signal with a duty depending upon the voltage command $D_{uty}$. Consequently, the motor 307 synchronously starts rotating.

When rotation of the motor 307 produces induced voltages in the windings 307u, 307v and 307w, the output voltages Vu, Vv and Vw represent waveforms as shown in FIG. 41D. Since the comparator 401a is supplied with the output voltage Vu and the neutral-point voltage Vn for operation, the comparator 401a starts delivering signals corresponding to positive and negative of voltage between both ends of the winding 307u including the induced voltage (see symbol A in FIG. 41D). Output signals of the comparators 401a, 401b and 401c are latched by the latch circuit 402a in synchronization with the change of PWM signal from ON to OFF (trailing edge) into signals as shown in FIG. 41E. Change timings of these signals (see symbol B in FIGS. 41A and 41E) are zero-cross timings of the induced voltages and serve as a starting point of the measuring counter 402b in the logic circuit 402.

The measuring counter 402b continues measuring a period of the zero-cross timing of the induced voltage. The delay counter 402c carries out time count corresponding to one half of the result of measurement with a terminal point of the measuring counter 402b serving as a starting point thereof. Thus, the counters 402b and 402c start operating in correspondence with the induced voltage or the rotational position of the motor 307. Energization is carried out so as to correspond to the rotational position, so that the motor 307 is accelerated.

The motor 307 starts up as the result of the above-described operation and is driven by 120-degree energization. Regarding detection of the induced voltage corresponding to the position detection, the sensitivity in the first energization signal forming circuit 304 depends upon only the comparators 401a, 401b and 401c. Accordingly, when offset-adjusted elements are used for the comparator 401, high sensitive induced voltage detection can be performed. As a result, position detection can be realized even when the motor is rotated at extremely low speeds in which case the induced voltage is small. The first energization signal forming circuit 304 detects reach of a predetermined rotational speed by decease of the measuring counter 402b to or below a predetermined value, thereby delivering the rotational speed signal Sn to the selecting circuit 306.

The current detecting circuit 303 and the second energization signal forming circuit 305 are in operation even while the energization signals formed by the first energization signal forming circuit 304 is selected by the selecting circuit 306 and the motor 307 is under drive by the 120-degree energization. Furthermore, the current detecting circuit 303 delivers the signals Iu, Iv and iw proportional to the currents flowing into the respective windings 307u, 307v and 307w. The comparing circuit 504 delivers the signals s0 to s11. The logic circuit 505 recognizes status divided by the signals s0-s11 as rotational positions "00" to "23."

The induced voltage signals eu, ev and ew are not accurately computed when the rotational speed of the motor 307 is low so that the induced voltage is small. Accordingly, the rotational position is not always detected in the sequence as shown in FIG. 11. The induced voltage signals eu, ev and ew are detected in a predetermined sequence as the rotational speed of the motor 307 is increased. The logic circuit 505 determines the sequence of the rotational position. For example, when a predetermined sequence continues for one electrical period, the logic circuit 505 determines that the rotational position is detectable, delivering the stabilization signal Sk.

The selecting circuit 306 is supplied with the rotational speed signal Sn from the first energization signal forming circuit 304 and the stabilization signal Sk from the second energization signal forming circuit 305. When both rotational speed signal Sn and stabilization signal Sk are active, the selecting circuit 306 selects the second energization signal Sy instead of the first energization signal Sx, delivering the selected signal as the energization signal Sz.

In the second energization signal forming circuit 305, the logic circuit 505 delivers respective phase energization phase signals Pa, Pb and Pc according to the detected rotational position. In this case, the leading phase is desired as the rotational speed of the motor 307 is increased. The energization phase signals Pa-Pc are supplied to the respective waveform generating circuits 506a-506c, which then deliver substantially sinusoidal waveforms. As a result, the signals Upy, Vpy, Wpy, Uny, Vny and Wny are delivered as the second energization signal Sy. As the result of the above-described operation, the induced voltages are computed on the basis of the motor winding currents. The rotational position and energization phase are determined from the induced voltages. The sinusoidal waveforms are generated from the voltage commands and energization phases so that the motor windings are energized. Thus, the sensorless sinusoidal wave drive is realized.

According to the above-described example, the first energization signal forming circuit 304 zero-cross timings of the induced voltages generated in the windings 307u, 307v and 307w of the motor 307 based on the output voltage of the energizing circuit 302, thereby forming the first energization signal Sx with the 120-degree energization waveform. On the other hand, the second energization signal forming circuit 305 is supplied with the output current of the energizing circuit 302 and computes the induced voltage signals eu, ev and ew of the windings 307u, 307v and 307w of the motor 307 based on the phase voltage equation, thereby forming the substantially sinusoidal second energization signal Sy. The selecting circuit 306 selects either first or second energization signal Sx or Sy according to the predetermined condition. The energizing circuit 302 energizes the windings 307u, 307v and 307w of the motor 307 by the selected energization signal Sz.

Furthermore, the selecting circuit 306 selects the first energization signal Sx when the motor 307 starts up or is drive at low speeds. The selecting circuit 306 selects the second energization signal Sy when the motor 307 is drive at middle or high speed. More specifically, the above-described selection switching is carried out when the logic circuit 505 delivers the stabilization signal Sk.

Accordingly, the sensorless drive can be carried out which provides a wide range of rotational speed from a low speed to a high speed. Furthermore, since the sinusoidal wave drive is carried out in the middle or high speed range which results in oscillation and/or noise in the motor 307, the oscillation and noise can be reduced to the minimum. Still furthermore, since the rotational position is detected even in the low speed range, a time period required from start-up to high-speed rotation can be reduced as compared with the case where the motor is driven only by the second energization signal forming circuit 305. Additionally, the first energization signal forming circuit 304 is switched to the second energization signal forming circuit 305 when the rotational speed is at or above a predetermined value and it has been determined whether the position detection is possible by the second energization signal forming circuit 305. Consequently, occurrence of step-out or the like can be prevented and the switching can stably be carried out.

Figure 42A:
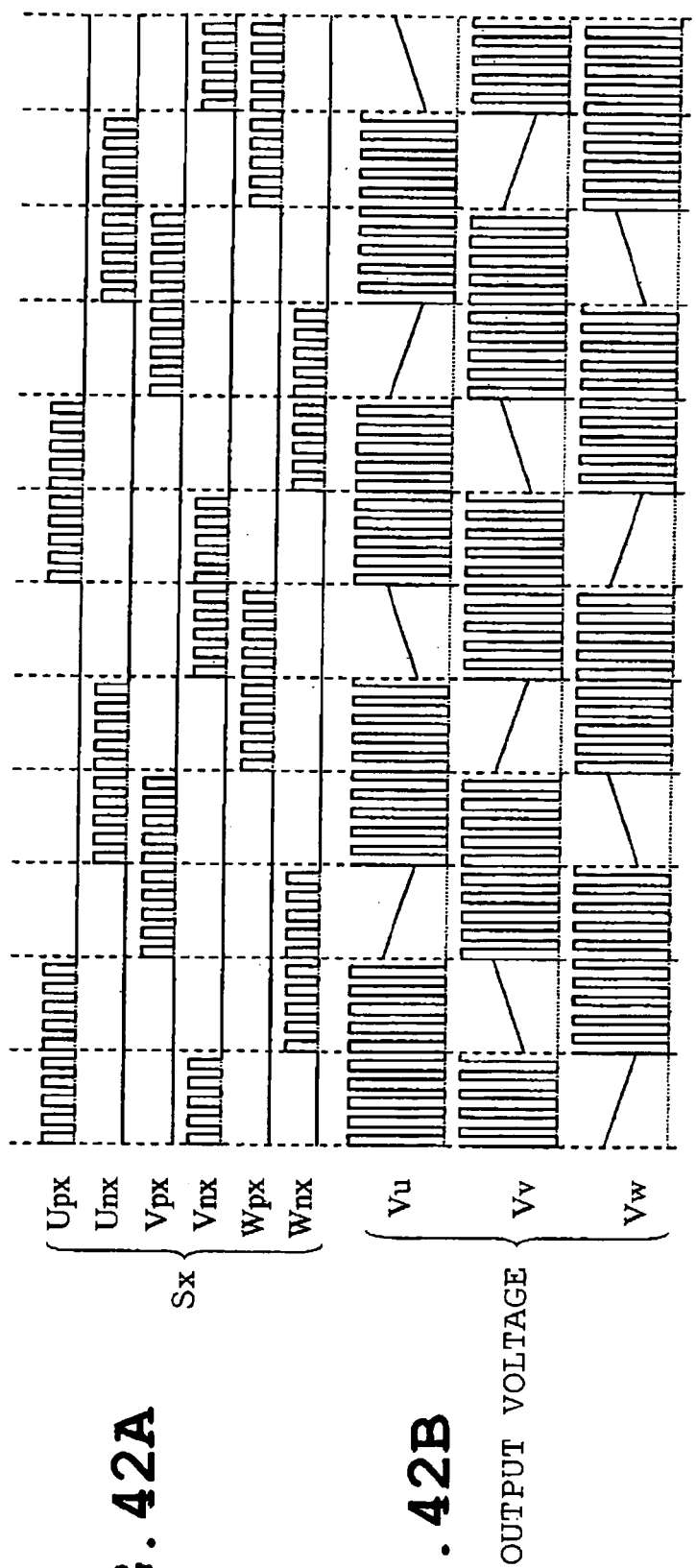

FIGS. 42 and 43 illustrate a tenth and eleventh examples respectively. In the tenth or eleventh example, identical or similar parts are labeled by the same reference symbols as those in the ninth example and description of these parts will be eliminated. Only the differences will be described.

In the ninth example, in synthesizing the PWM signal in the first energization signal forming circuit 304, the PWM control is applied only to the positive FET composing the switching circuit 302a (one-side PWM control).

In the tenth example, however, the PWM control is applied to both positive and negative FET's as shown in FIG. 42 (dual PWM control). In this case, the on-off duty is equivalent to zero output voltage when at 50%. Output of low voltage becomes possible by slight duty increase. Since an on time of the FET is near duty of 50%, the smallest on time need not be reduced. Furthermore, influences of delay time of the comparators 401a, 401b and 401c of the first energization signal forming circuit 304 can be reduced.

Furthermore, in the eleventh example shown in FIG. 43, the PWM signals of either positive or negative FET's of the arm corresponding to the same phase of the PWM control as shown in FIG. 42 are inversed.

According to the tenth and eleventh examples, the first energization signal forming circuit 304 forms and delivers the PWM signals corresponding to the respective positive and negative FET's constituting the switching circuit 302a. Consequently, high accurate control can be realized.

The ninth to eleventh examples may be modified or expanded as follows. Although the supply voltage to the motor 307 is determined according to the voltage command $D_{uty}$, a current command may be supplied and a current control loop may be configured so that voltage is determined by the comparison with the result of current detection.

Although the neutral-point voltage of the motor 307 is used, the imaginary neutral-point voltage obtained by synthesizing three-phase output voltages with resistance may be used, instead, as in the first example.

The first energization signal may be switched to the second energization signal when either one of the conditions hold: the condition of "at or above a predetermined rotational speed" or the condition of "the state where position detection is possible in the second energization signal forming circuit 305."

A low-speed and stable rotation is required when a disc is printed by laser using a digital versatile disc (DVD) apparatus. In the foregoing examples, the zero-cross timings of the induced voltages are detected at high sensitivity, whereby the position detection is realized. In addition, an extremely low duty PWM voltage needs to be supplied to the motor 307. For example, when low rotational speed is 30 rpm while a motor is rotated at a high speed exceeding 10,000 rpm, a rotational reduction of one three hundredth or below is required. The PWM duty also needs to be rendered extremely small. When PWM frequency is set at 100 kHz, a minimum on time of each FET of the energizing circuit 302 at the aforesaid low-speed rotation becomes several n sec. The design is practically difficult.

In the example, however, the triangular wave generating circuit 404 in the first energization signal forming circuit 304 and the triangular wave generating circuit 507 in the second energization signal forming circuit 305 are independent from each other. Accordingly, different PWM frequencies can be set. For example, the frequency of the triangular wave generating circuit 404 is set at 1 kHz, and the frequency of the triangular wave generating circuit 507 is set at 100 kHz. When the triangular wave generating circuits are configured as described above, current is extremely small since the duty is low in the case of low speed rotation, and noise is not produced even in the audible frequency range (1 kHz). Furthermore, a lower PWM frequency may be selected by a low-speed rotation command delivered by the DVD apparatus body.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A motor control device for controlling a permanent magnet motor including a rotor having a permanent magnet and a stator provided with three-phase windings, the motor control device comprising:

a current detector detecting current flowing through the three-phase windings;

an induced voltage computing unit obtaining voltage induced at each phase from the detected three-phase winding current based on a phase voltage equation, thereby delivering an induced voltage signal;

a position detector detecting a rotational position of the rotor from the induced voltage of each phase computed by the induced current computing unit, the rotational position of the rotor having a 6n resolution where n is an integer which is equal to or larger than 1;

an energization phase control unit determining a phase to be energized based on the rotational position of the rotor and a phase command;

an energization signal forming unit forming a 6n-resolution three-phase energization signal based on the phase to be energized and a voltage command; and an energizing unit which carries out PWM modulation for the three-phase energization signal, thereby supplying voltage according to the modulated three-phase energization signal to each of the three-phase windings.

2. A motor control device for controlling a permanent magnet motor including a rotor having a permanent magnet and a stator provided with three-phase windings, the motor control device comprising:

a current detector detecting current flowing through the three-phase windings;

an induced voltage computing unit obtaining voltage induced at each phase from the detected three-phase winding current based on a phase voltage equation, thereby delivering an induced voltage signal;

a first position detector detecting a 6-resolution first rotational position of the rotor by comparison of induced voltages of the respective phases;

a multiplier obtaining an n-fold multiplied signal based on the first rotational position of the rotor where n is an integer which is equal to or larger than 2;

a second position detector detecting a second rotational position of the rotor from the first rotational position of the rotor and the n-fold multiplied signal, the second rotational position having a 6n resolution;

an energization signal forming unit forming a 6n-resolution three-phase energization signal based on the second rotational position of the rotor; and an energizing unit which carries out PWM modulation for the three-phase energization signal, thereby supplying to the three-phase windings voltage according to the modulated three-phase energization signal.

3. The motor control device according to claim 2, further comprising a current phase detector which detects a current phase by comparison of the three-phase winding currents detected by the current detector and a phase controller determining a phase command from the first rotational position of the rotor and the current phase, wherein the energization signal forming unit forms a 6n-resolution three-phase energization signal based on the second rotational position of the rotor and the phase command.

4. The motor control device according to claim 1, wherein the induced current computing unit computes an induced voltage Eu from an equation:

$$Eu=(Vu-Vn)-R\cdot Iu-L\cdot dIu/dt$$

where reference symbol Vu designates output voltage of the energizing unit, reference symbol Vn designates a neutral-point voltage of the permanent magnet motor, reference symbol Iu designates winding current of the permanent magnet motor, reference symbol R designates winding resistance and reference symbol L designates winding inductance.

5. The motor control device according to claim 2, wherein the induced current computing unit computes an induced voltage Eu from an equation:

$$Eu=(Vu-Vn)-R\cdot Iu-L\cdot dIu/dt$$

where reference symbol Vu designates output voltage of the energizing unit, reference symbol Vn designates a neutral-point voltage of the permanent magnet motor, reference symbol Iu designates winding current of the permanent magnet motor, reference symbol R designates winding resistance and reference symbol L designates winding inductance.

6. The motor control device according to claim 1, wherein the induced voltage computing unit includes a neutral-point voltage forming unit that forms an imaginary neutral-point voltage Vn' of the permanent magnet motor from three-phase output voltage of the energizing unit, and the induced voltage computing unit computes an induced voltage Eu from an equation:

$$Eu=(Vu-Vn')-R\cdot Iu-L\cdot dIu/dt$$

where reference symbol Vu designates output voltage of the energizing unit, reference symbol Vn' designates a neutral-point voltage of the permanent magnet, reference symbol Iu designates winding current of the permanent magnet motor, reference symbol R designates winding resistance and reference symbol L designates winding inductance.

7. The motor control device according to claim 2, wherein the induced voltage computing unit includes a neutral-point voltage forming unit that forms an imaginary neutral-point voltage Vn' of the permanent magnet motor from three-phase output voltage of the energizing unit, and the induced voltage computing unit computes an induced voltage Eu from an equation:

$$Eu=(Vu-Vn')-R\cdot Iu-L\cdot dIu/dt$$

where reference symbol Vu designates output voltage of the energizing unit, reference symbol Vn' designates a neutral-point voltage of the permanent magnet, reference symbol Iu designates winding current of the permanent magnet motor, reference symbol R designates winding resistance and reference symbol L designates winding inductance.

8. The motor control device according to claim 1, wherein the induced current computing unit computes an induced voltage Eu from an equation:

$$Eu=Va/\alpha-R\cdot Iu-L\cdot dIu/dt$$

where reference symbol Va designates an energization signal formed by the energization signal forming unit, reference symbol α designates an amplitude ratio of the energization signal Va to an output voltage Vu of the energizing unit, reference symbol Iu designates winding current of the permanent magnet motor, reference symbol R designates winding resistance and L winding inductance.

9. The motor control device according to claim 2, wherein the induced current computing unit computes an induced voltage Eu from an equation:

$$Eu=Va/\alpha-R\cdot Iu-L\cdot dIu/dt$$

where reference symbol Va designates an energization signal formed by the energization signal forming unit, reference symbol α designates an amplitude ratio of the energization signal Va to an output voltage Vu of the energizing unit, reference symbol Iu designates winding current of the permanent magnet motor, reference symbol R designates winding resistance and L winding inductance.

10. The motor control device according to claim 1, wherein the position detector detects a 24-resolution rotational position of the rotor divided by an intersection of a reference potential and the induced voltage signal of each phase delivered from the induced voltage computing unit, an intersection of the induced voltage signals and an intersection of the induced voltage signal of each phase and a signal obtained by increasing the induced voltage signal of each phase by 0.366 times.

11. A motor control device for controlling a permanent magnet motor including a rotor having a permanent magnet and a stator provided with three-phase windings, the motor control device comprising:
- a current detector detecting current flowing through the three-phase windings;
- a first energization signal forming unit which detects a zero-cross timing of voltage induced in the three-phase windings based on three-phase winding voltage and forms a first energization signal with a 120-degree energization waveform based on the zero-cross timing;
- a second energization signal forming unit which computes an induced voltage waveform of each phase from the detected three-phase winding current based on a phase voltage equation, thereby forming a second energization signal having substantially a sinusoidal waveform;
- a selector which selects either one of the first and second energization signals on a predetermined condition; and
- an energizing unit which supplies to the three-phase windings of the permanent magnet motor the energization signal selected by the selector.

12. The motor control device according to claim 11, wherein the selector selects the first energization signal in a case of low-speed rotation of the permanent magnet motor including start-up thereof and the second energization signal in a case of middle- or high-speed rotation of the permanent magnet motor.

* * * * *